Figure 1:
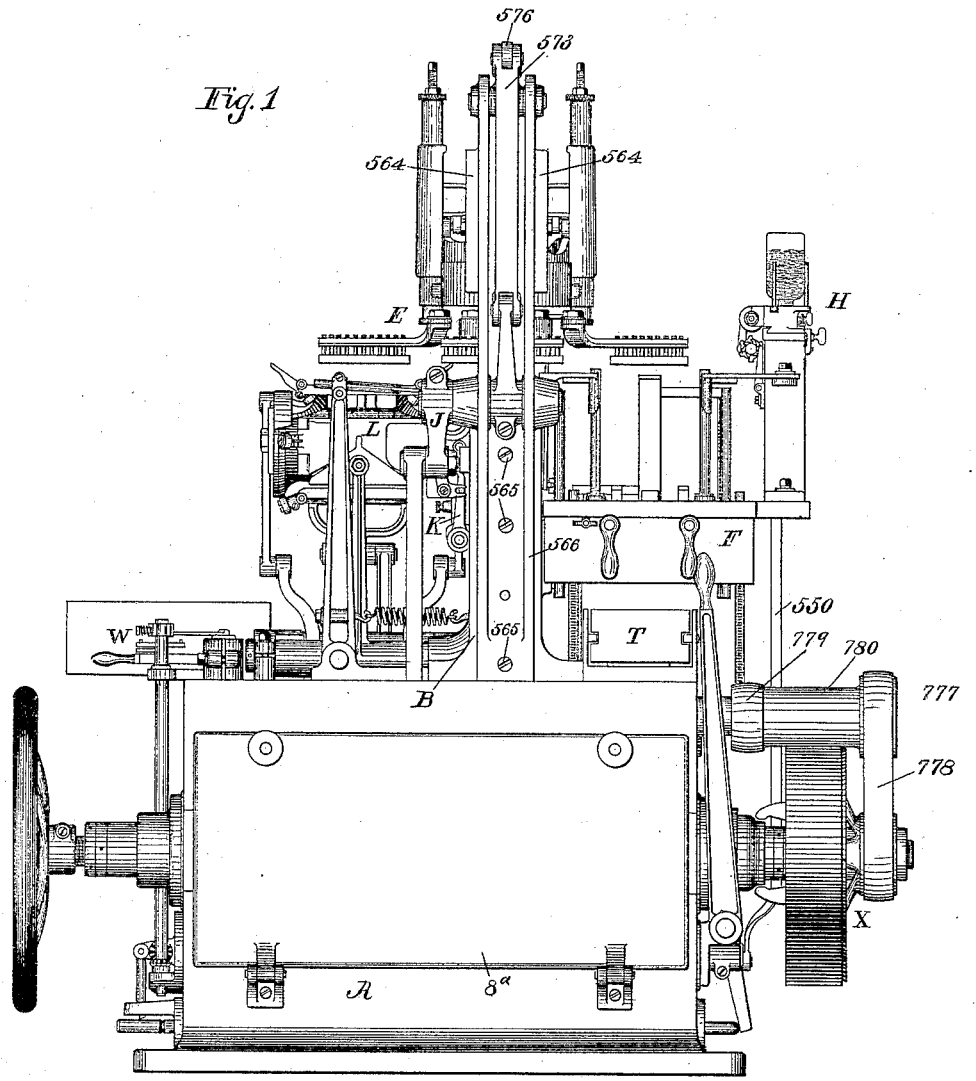

(No Model.)  45 Sheets—Sheet 1.

F. H. RICHARDS.
ENVELOPE MACHINE.

No. 444,852.  Patented Jan. 20, 1891.

Witnesses:  Inventor:

(No Model.)

F. H. RICHARDS.
ENVELOPE MACHINE.

No. 444,852.

45 Sheets—Sheet 3.

Patented Jan. 20, 1891.

Witnesses:
Henry L. Rickard.
W M Bjorkman

Inventor:
Francis H. Richards (No Model.) 45 Sheets—Sheet 4.

F. H. RICHARDS.
ENVELOPE MACHINE.

No. 444,852. Patented Jan. 20, 1891.

Witnesses:
Henry L. Rickard.
WM. Bjorkman.

Inventor:
Francis H. Richards

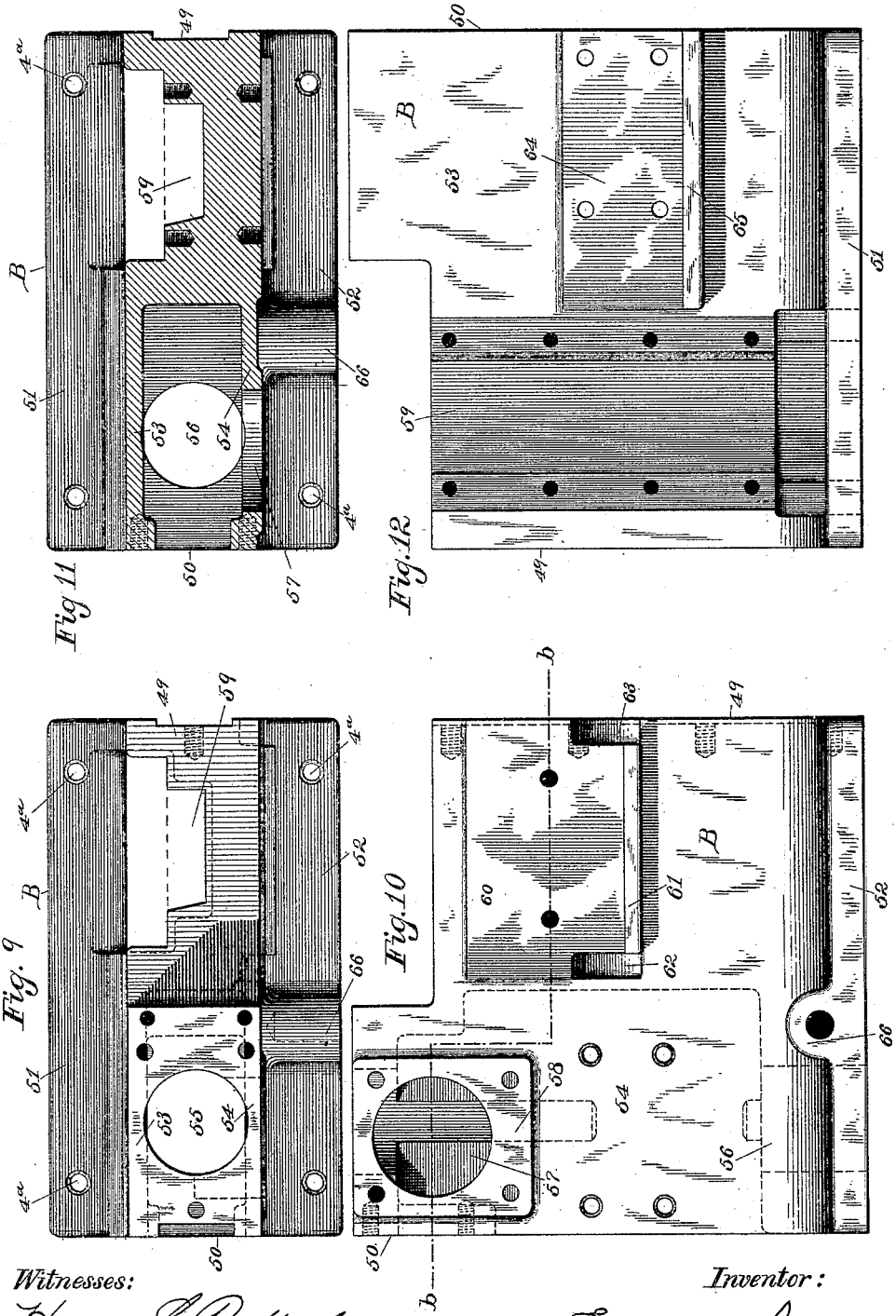

(No Model.)  45 Sheets—Sheet 6.

F. H. RICHARDS.
ENVELOPE MACHINE.

No. 444,852.  Patented Jan. 20, 1891.

Witnesses:
Henry L. Rickard.
W. M. Bjorkman.

Inventor:
Francis H. Richards

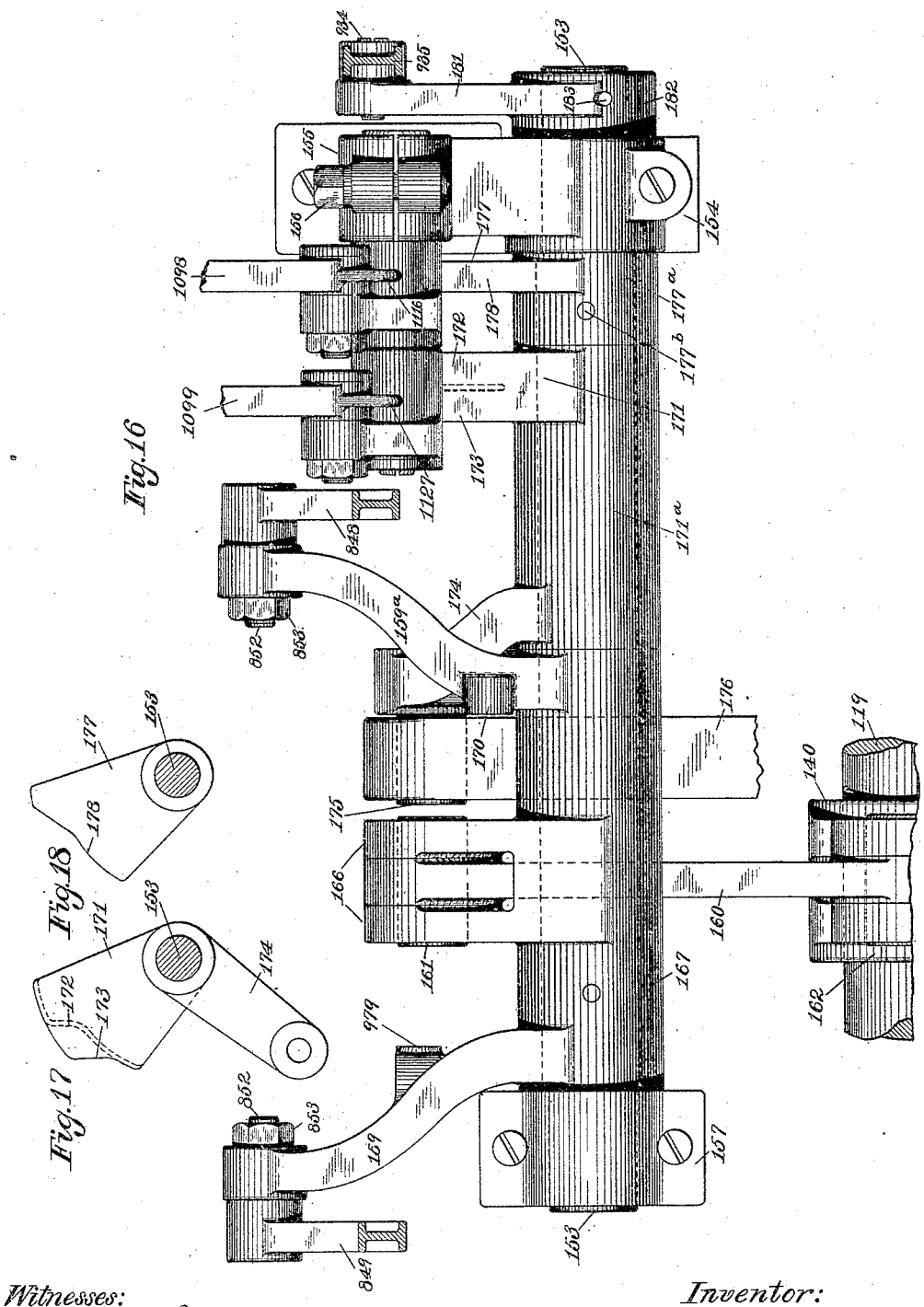

(No Model.)
F. H. RICHARDS.
ENVELOPE MACHINE.
No. 444,852.   Patented Jan. 20, 1891.
45 Sheets—Sheet 8.
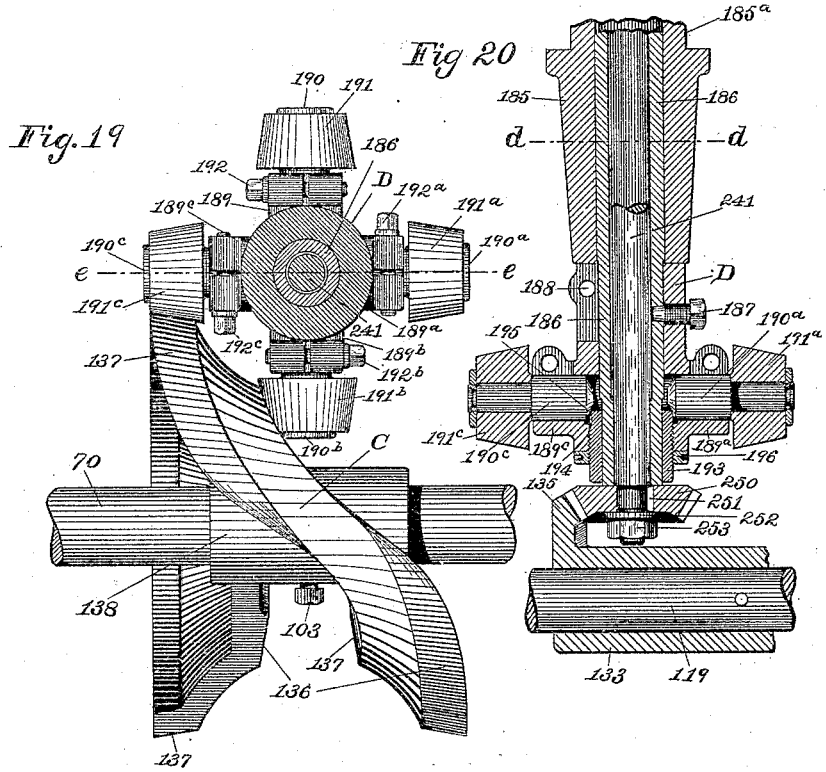
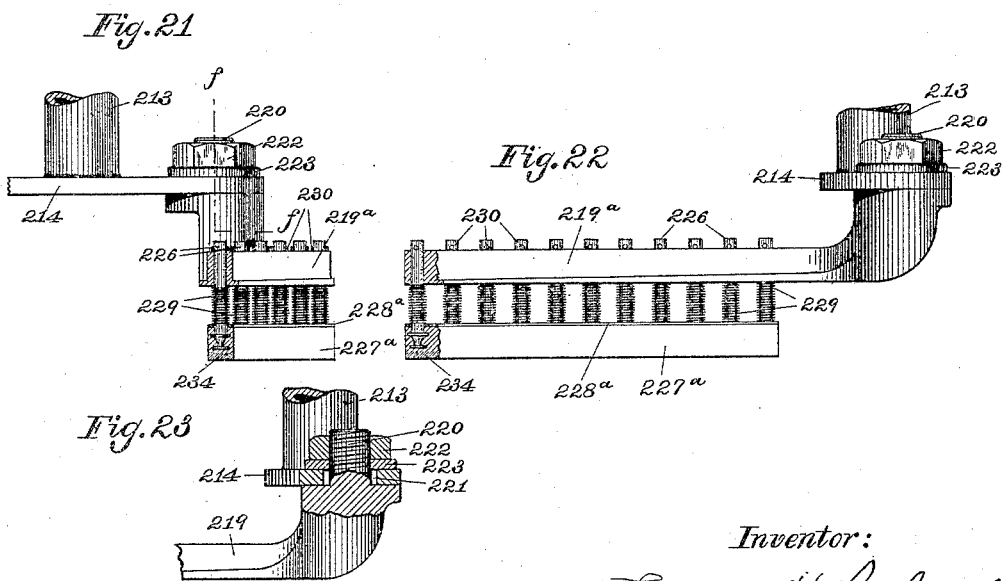
Witnesses: Henry L. Rickard, W. M. Bjorkman.
Inventor: Francis H. Richards (No Model.)

F. H. RICHARDS.
ENVELOPE MACHINE.

No. 444,852. Patented Jan. 20, 1891.

45 Sheets—Sheet 9.

Witnesses:
Henry L. Reckard.
W. M. Bjorkman.

Inventor:
Francis H. Richards (No Model.)　　　　　　　　　　　　　　　　　　　　45 Sheets—Sheet 10.
F. H. RICHARDS.
ENVELOPE MACHINE.
No. 444,852.　　　　　　　　　　　　　　Patented Jan. 20, 1891.
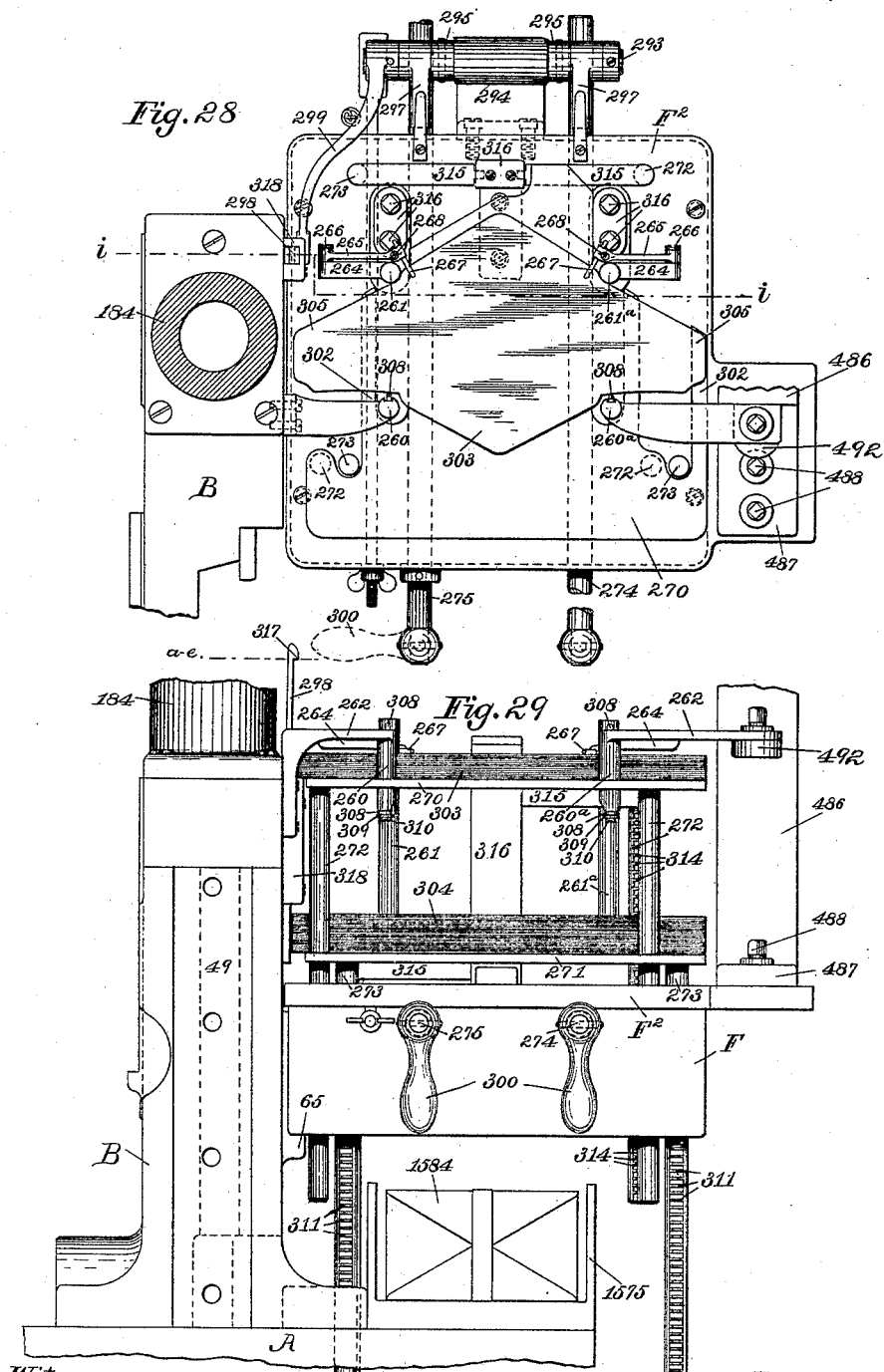
Witnesses:　　　　　　　　　　　　　　　　　Inventor:

(No Model.)  
45 Sheets—Sheet 11.
F. H. RICHARDS.
ENVELOPE MACHINE.
No. 444,852. Patented Jan. 20, 1891.
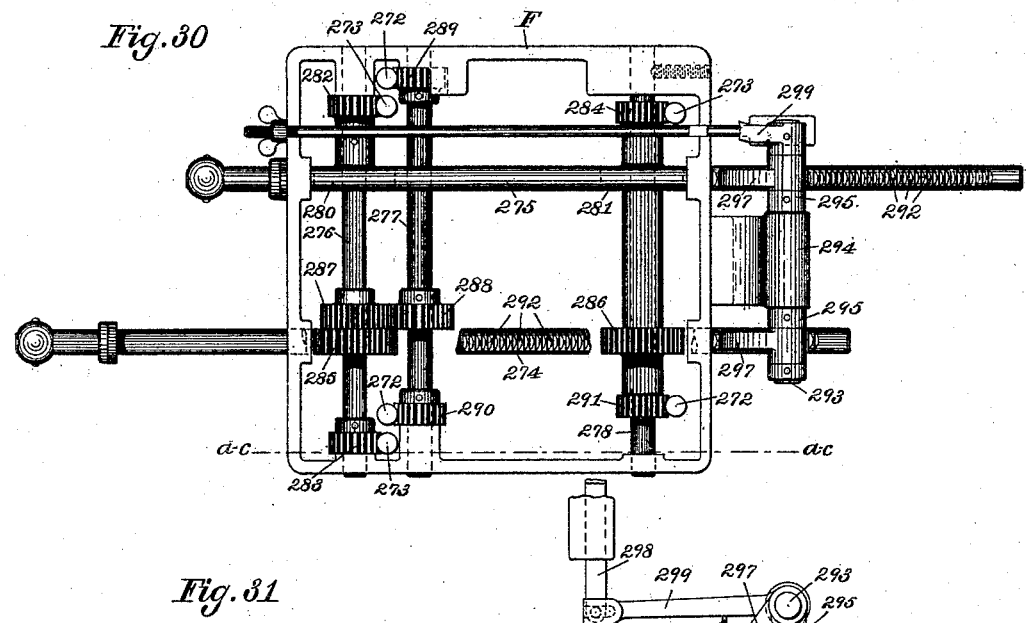
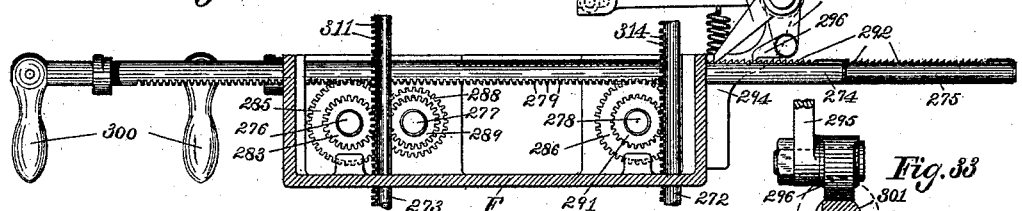
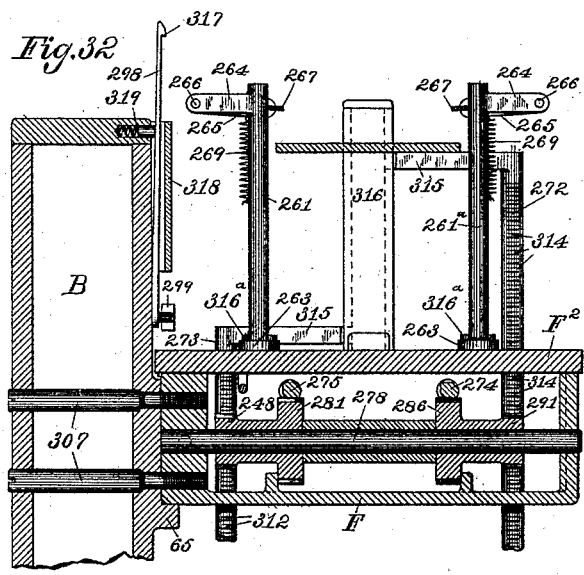
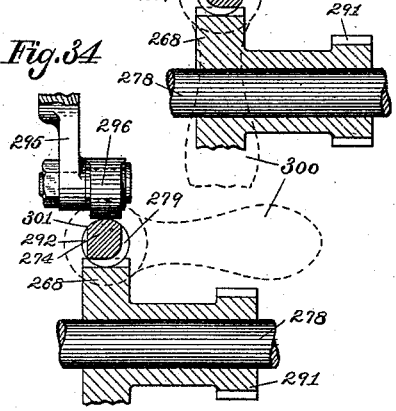
Inventor:
Francis H. Richards
Witnesses:
Henry L. Reckard
W. M. Bjorkman

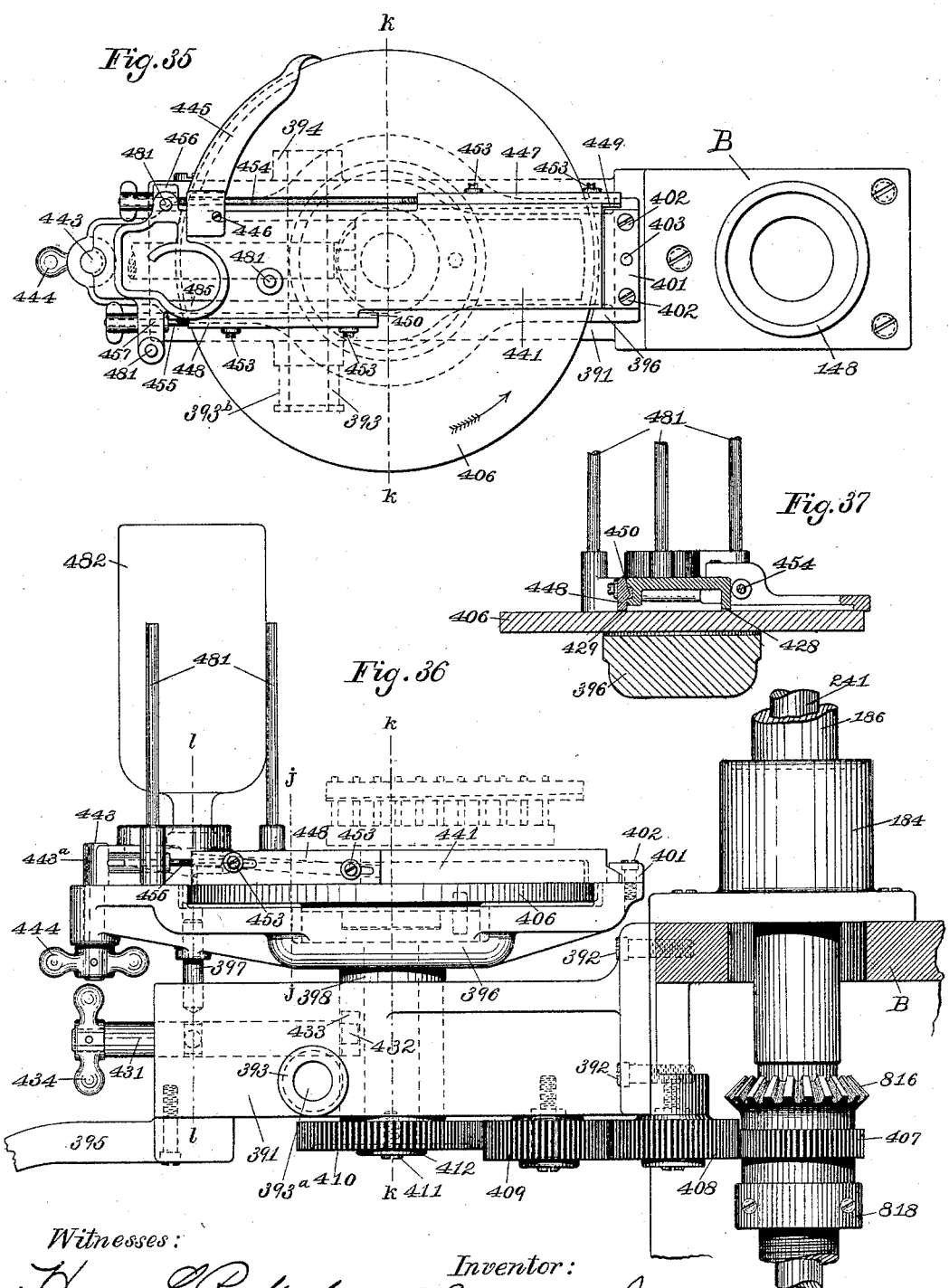
(No Model.) 45 Sheets—Sheet 12.
F. H. RICHARDS.
ENVELOPE MACHINE.
No. 444,852. Patented Jan. 20, 1891.

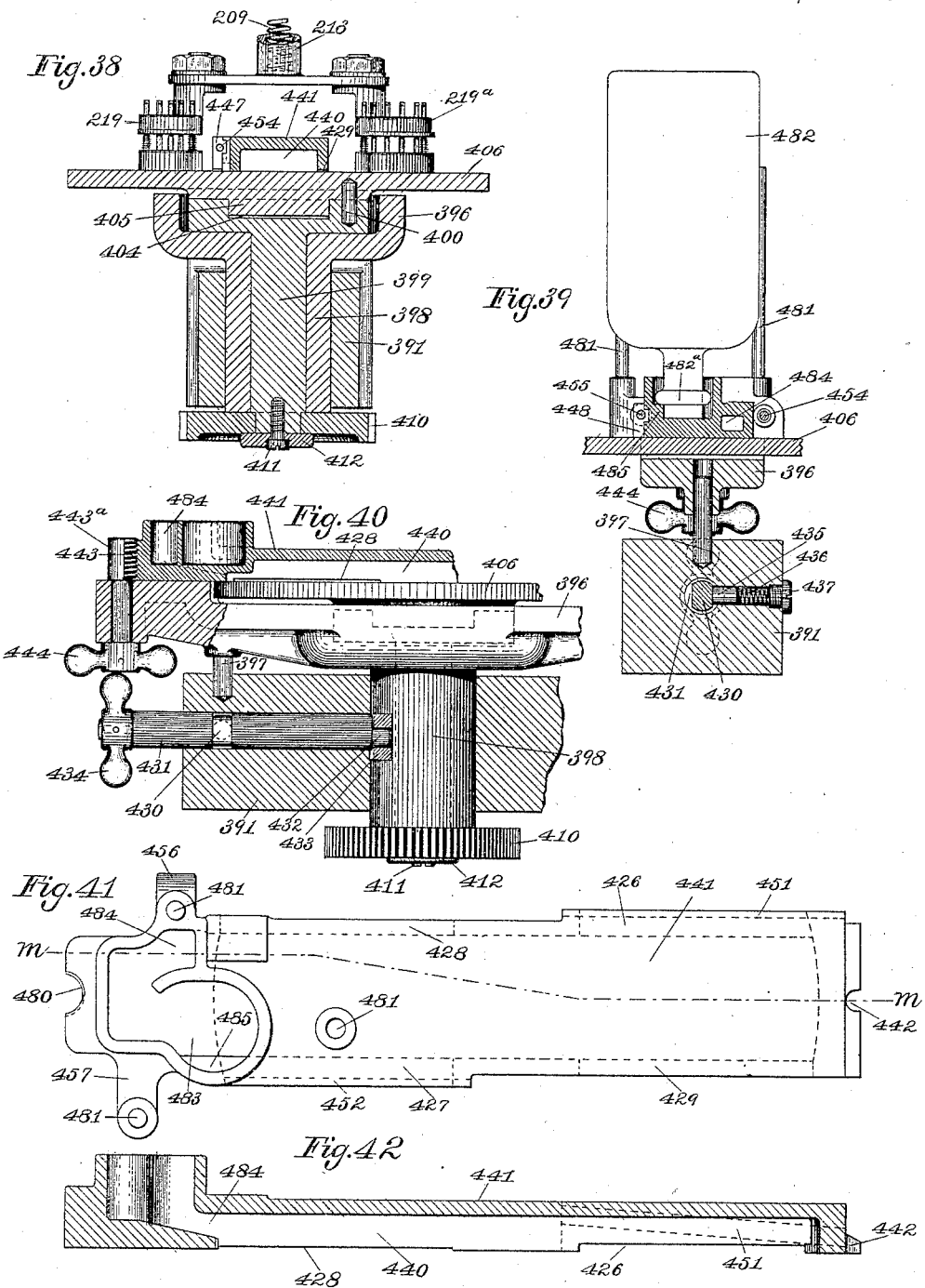

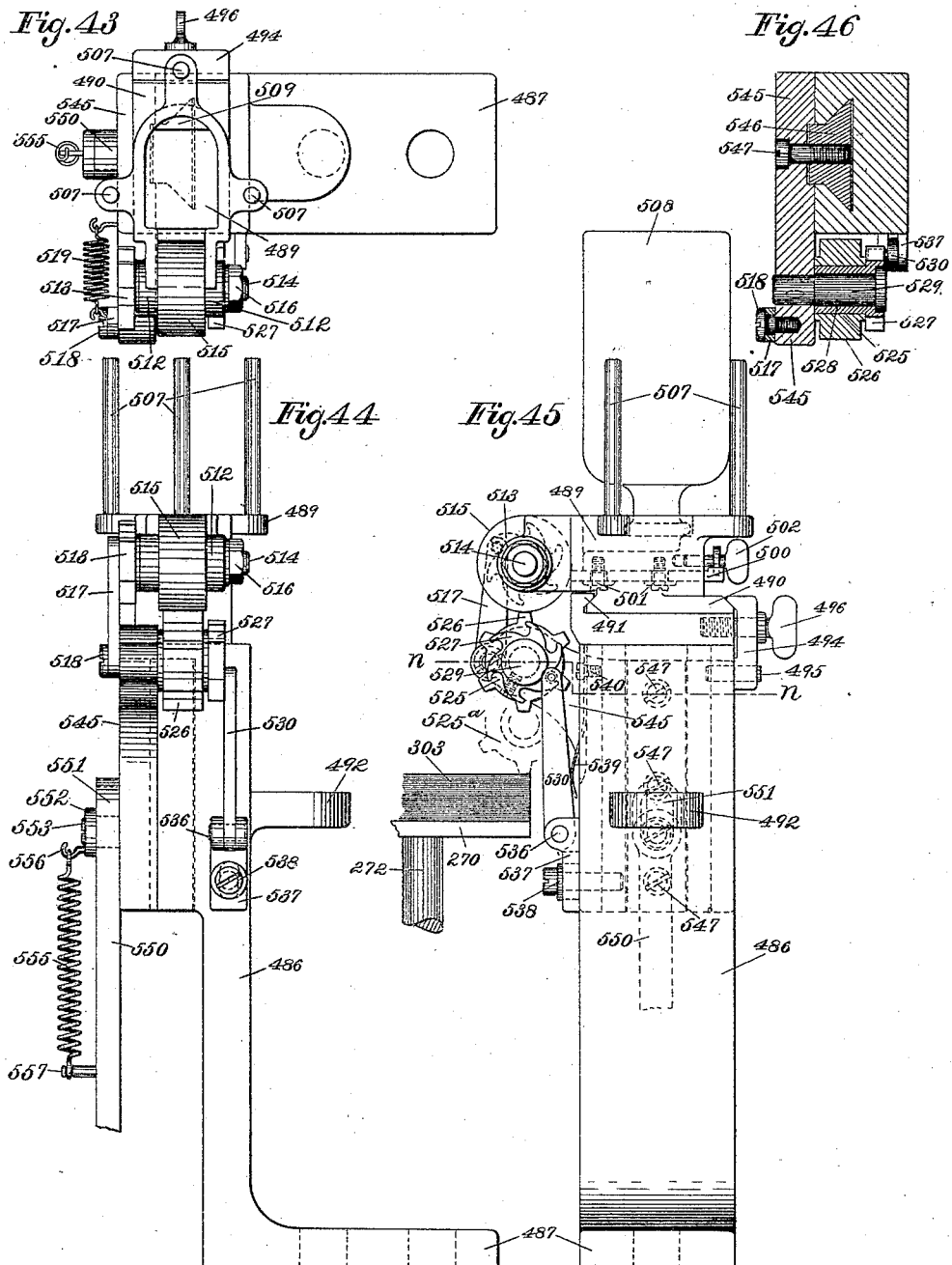

(No Model.)
F. H. RICHARDS.
ENVELOPE MACHINE.
No. 444,852.   Patented Jan. 20, 1891.
45 Sheets—Sheet 15.
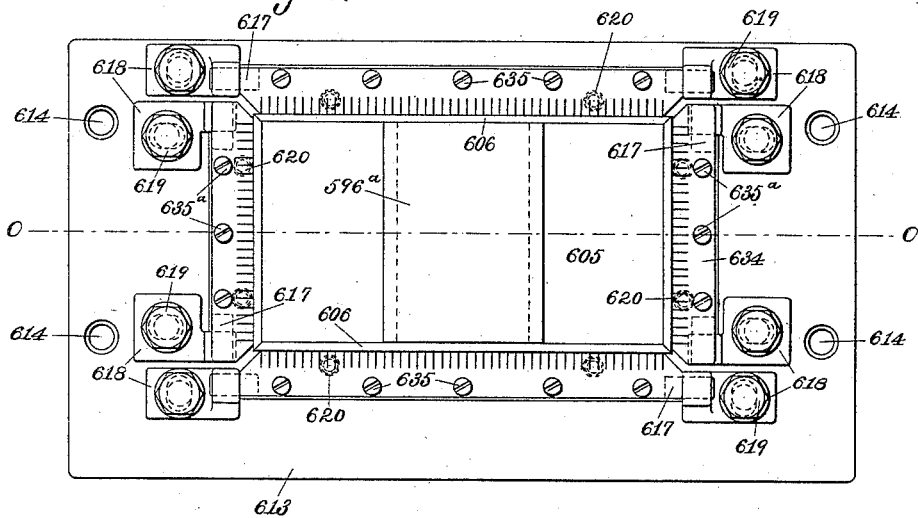
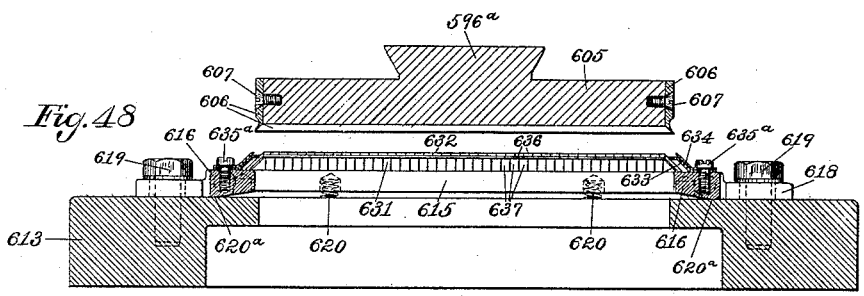
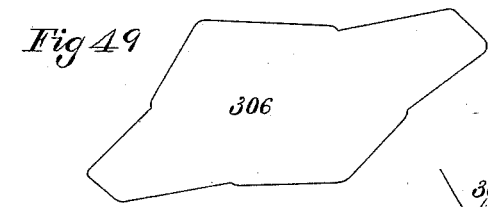
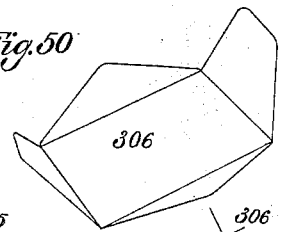
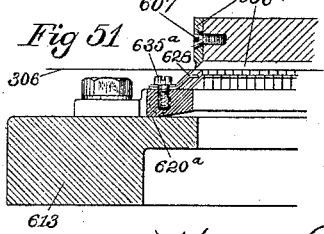
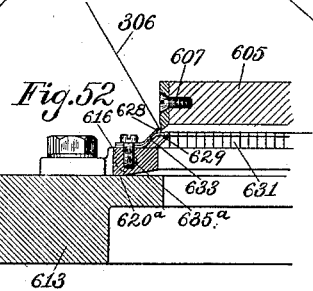
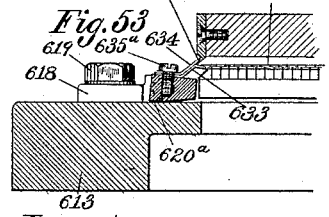
Witnesses: Henry L. Rickard. Wm. Bjorkman.
Inventor: Francis H. Richards (No Model.)
F. H. RICHARDS.
ENVELOPE MACHINE.
No. 444,852.
Patented Jan. 20, 1891.
45 Sheets—Sheet 16.
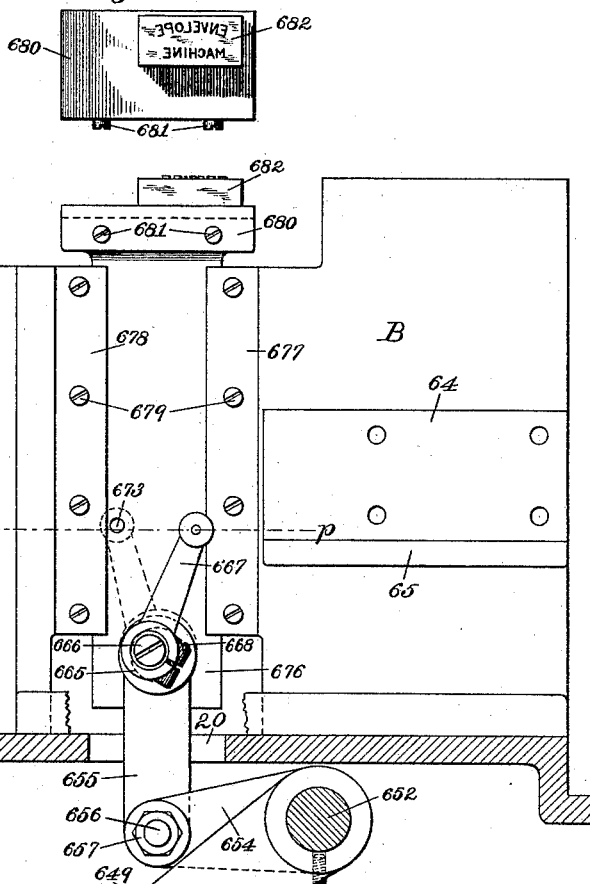
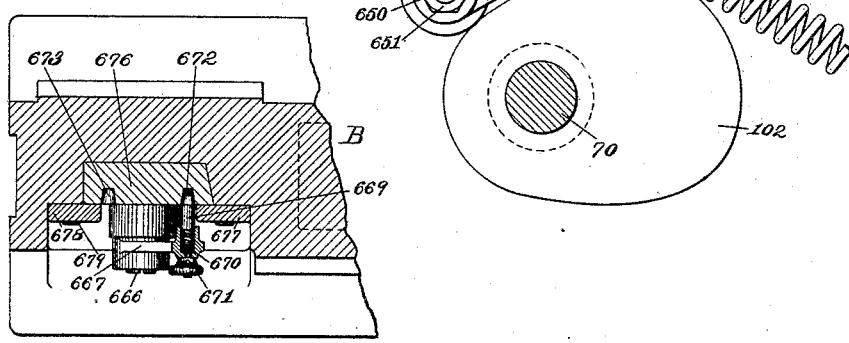
Witnesses:
Henry L. Rickard.
W. M. Bjorkman.
Inventor:
Francis H. Richards

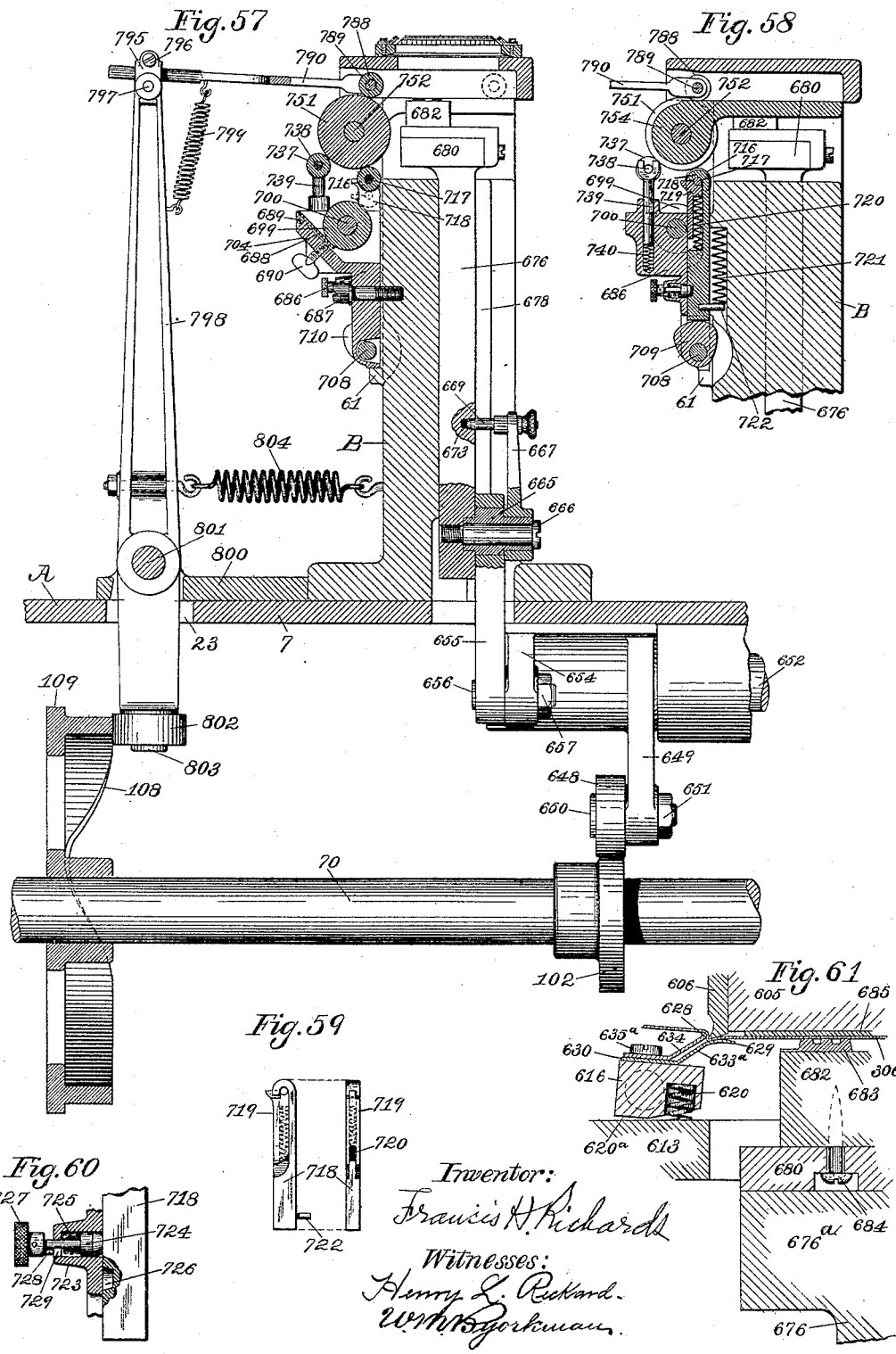

(No Model.)  45 Sheets—Sheet 18.
F. H. RICHARDS.
ENVELOPE MACHINE.
No. 444,852. Patented Jan. 20, 1891.
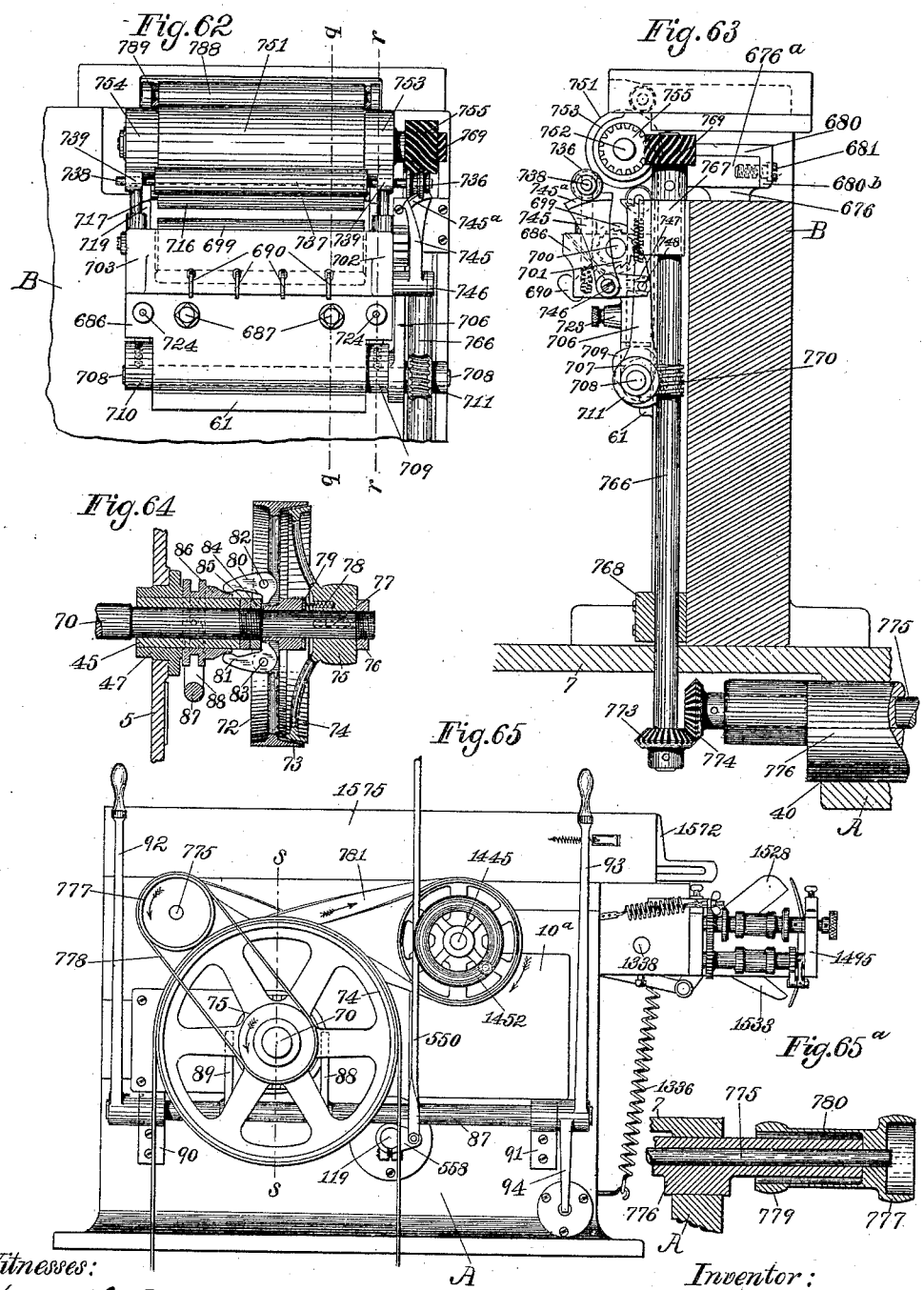
Witnesses:
Henry L. Reckard.
Wm. Bjorkman.
Inventor:
Francis H. Richards (No Model.)  45 Sheets—Sheet 19.

F. H. RICHARDS.
ENVELOPE MACHINE.

No. 444,852.  Patented Jan. 20, 1891.

Witnesses:
Henry L. Reckard.
W. H. Bjorkman.

Inventor:
Francis H. Richards (No Model.)

F. H. RICHARDS.
ENVELOPE MACHINE.

No. 444,852. Patented Jan. 20, 1891.

Inventor:
Francis H. Richards

Witnesses:
Henry L. Rickard
W. M. Bjorkman (No Model.)　　　　　　　　　　　　　　　　　　　45 Sheets—Sheet 22.
F. H. RICHARDS.
ENVELOPE MACHINE.
No. 444,852.　　　　　　　　　　　　　　Patented Jan. 20, 1891.
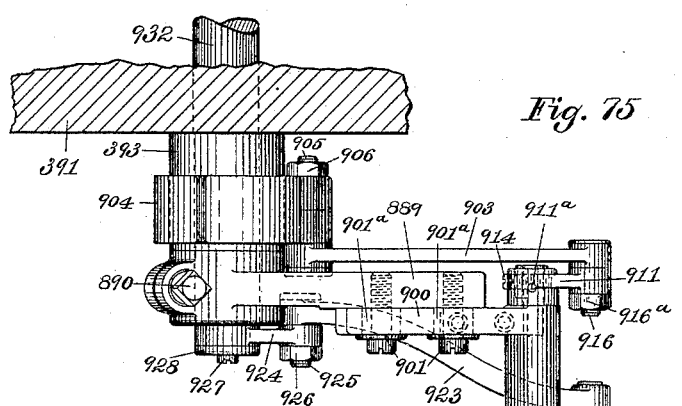
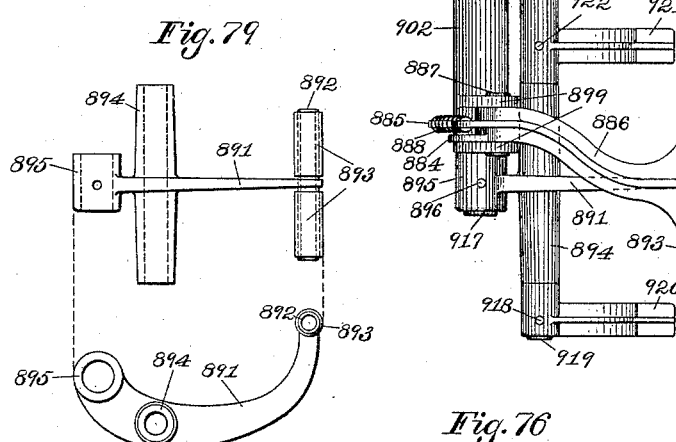
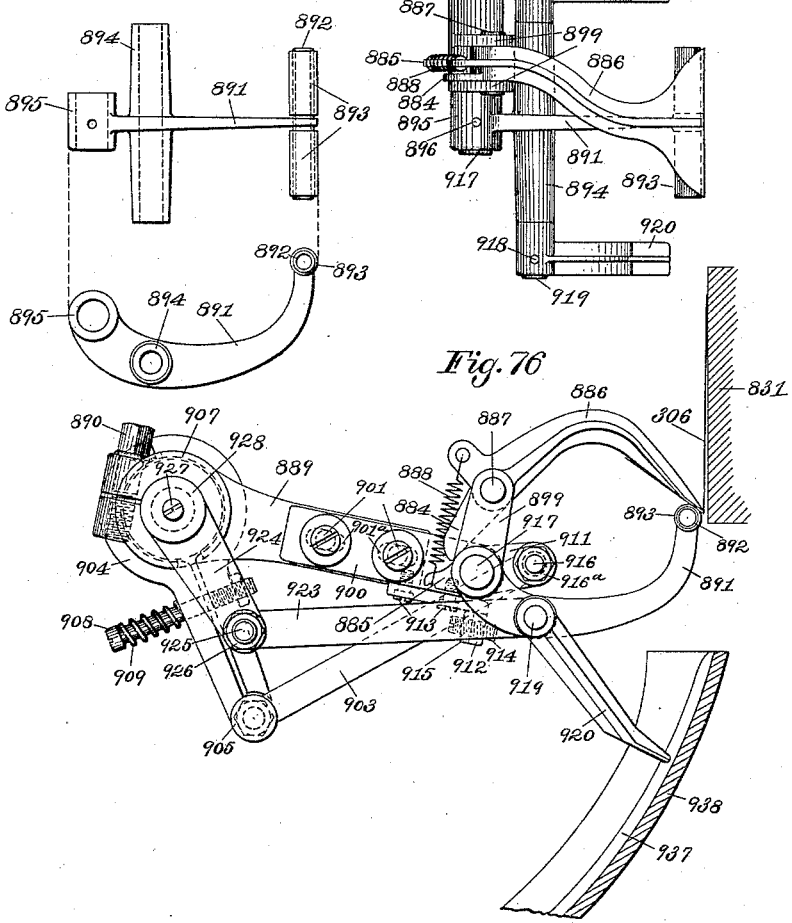
Witnesses:　　　　　　　　　　　　　　　　　Inventor:

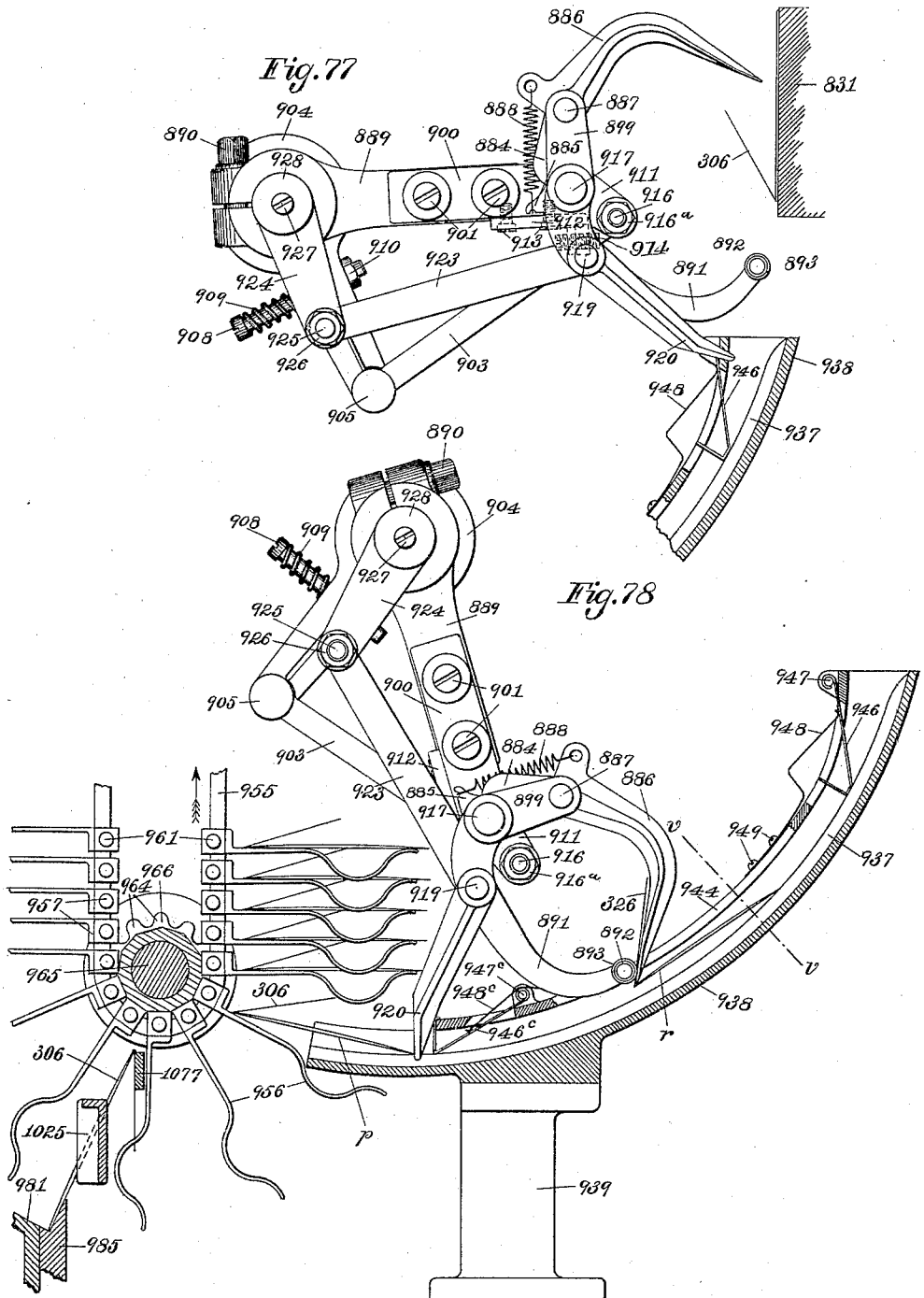

(No Model.)
F. H. RICHARDS.
ENVELOPE MACHINE.
No. 444,852.
45 Sheets—Sheet 24.
Patented Jan. 20, 1891.
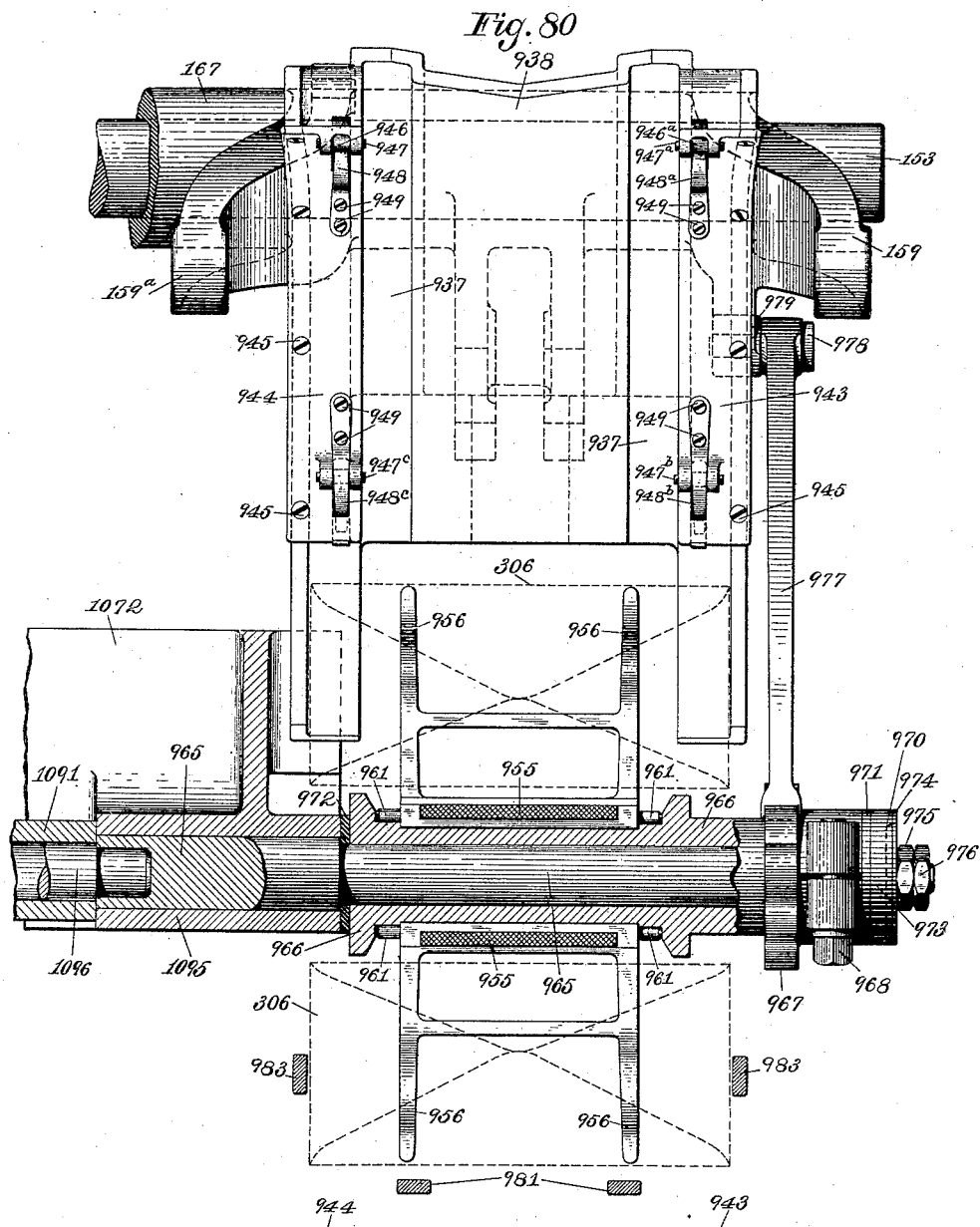
Witnesses:
Henry L. Rickard
Wm. B. Bjorkman
Inventor:
Francis H. Richards

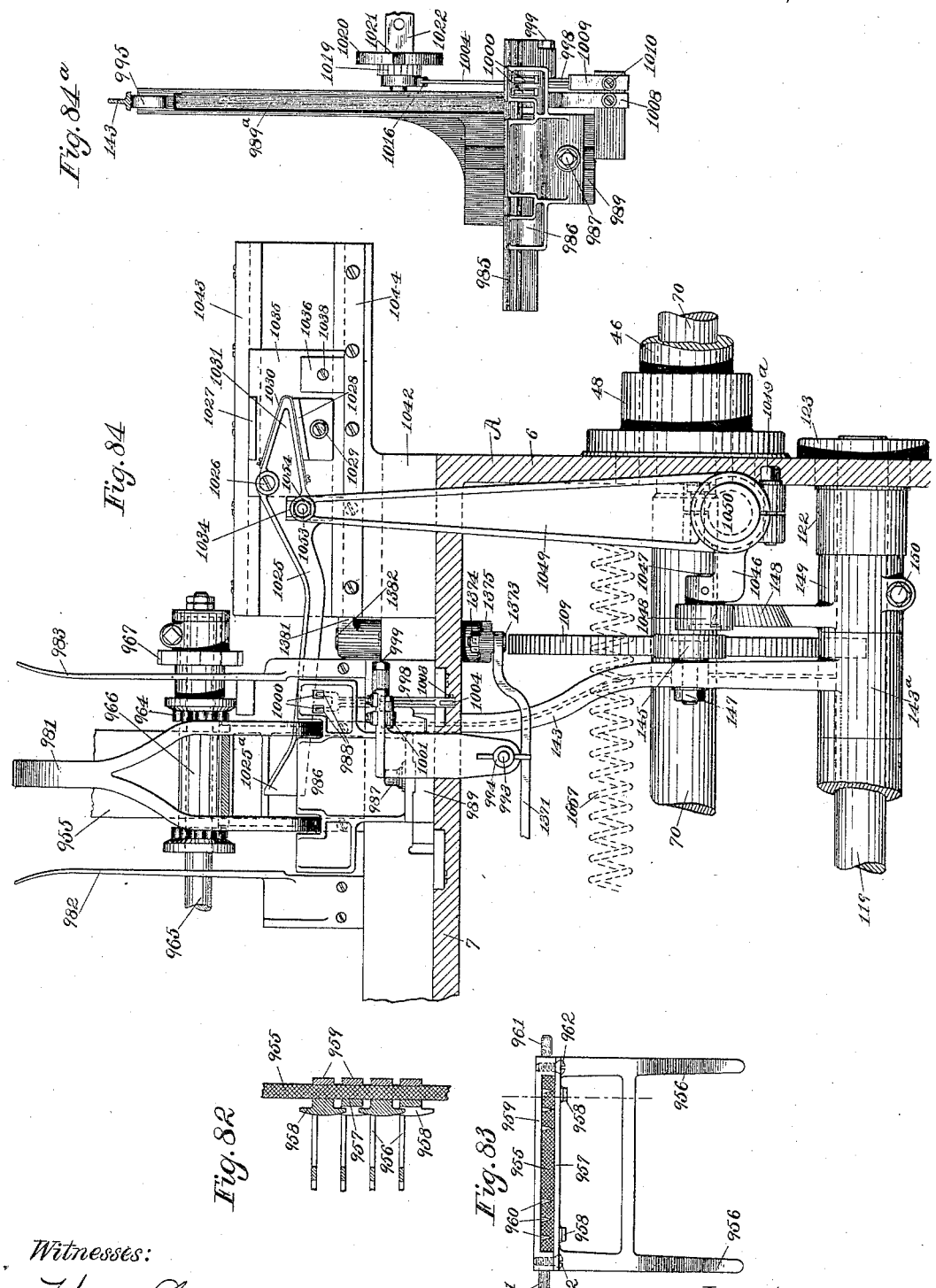

(No Model.)  
F. H. RICHARDS.  
ENVELOPE MACHINE.  
No. 444,852. Patented Jan. 20, 1891.
45 Sheets—Sheet 26.
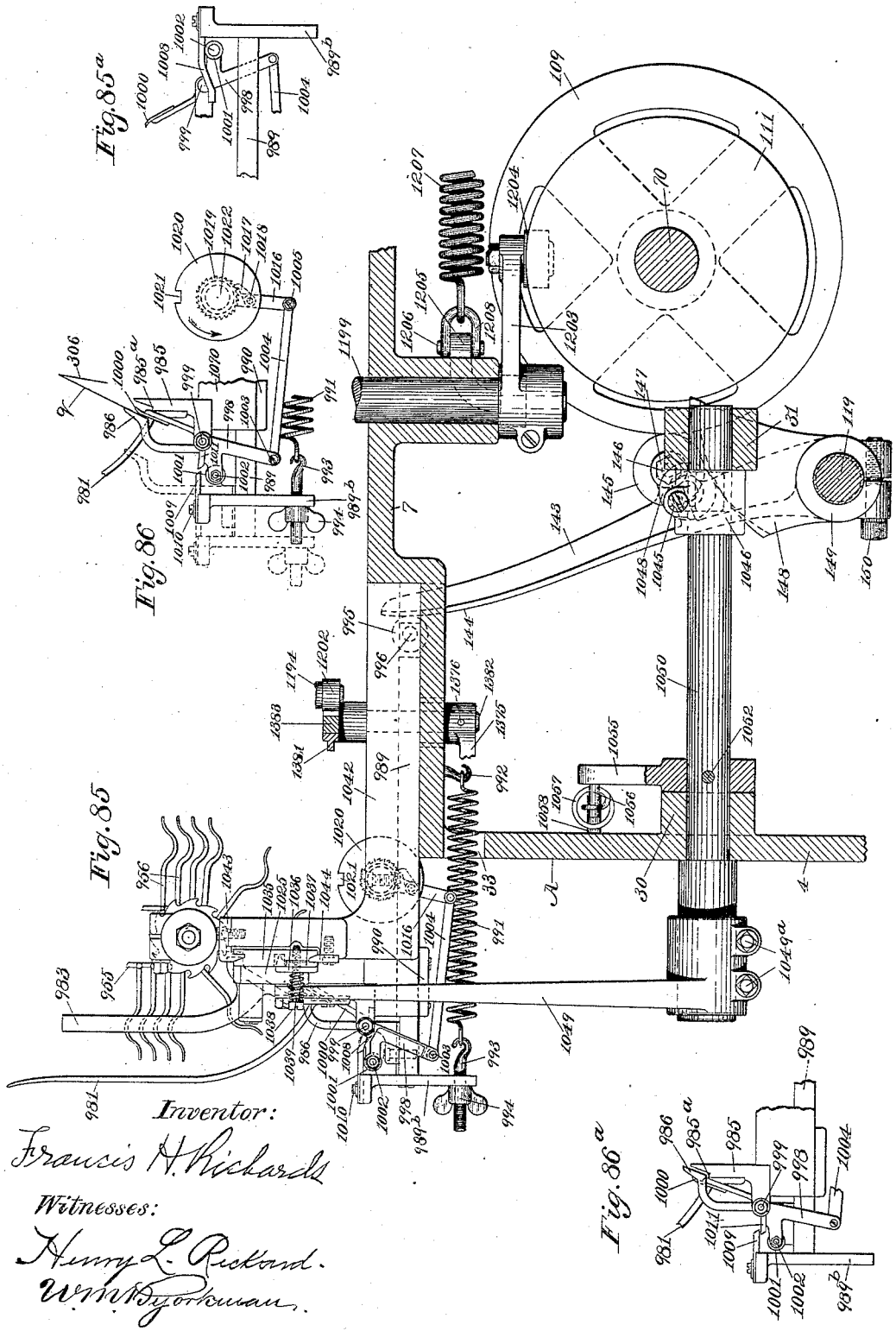
Inventor:
Francis H. Richards
Witnesses:
Henry L. Pickard
Wm. Bjorkman (No Model.)
F. H. RICHARDS.
ENVELOPE MACHINE.
No. 444,852.  Patented Jan. 20, 1891.
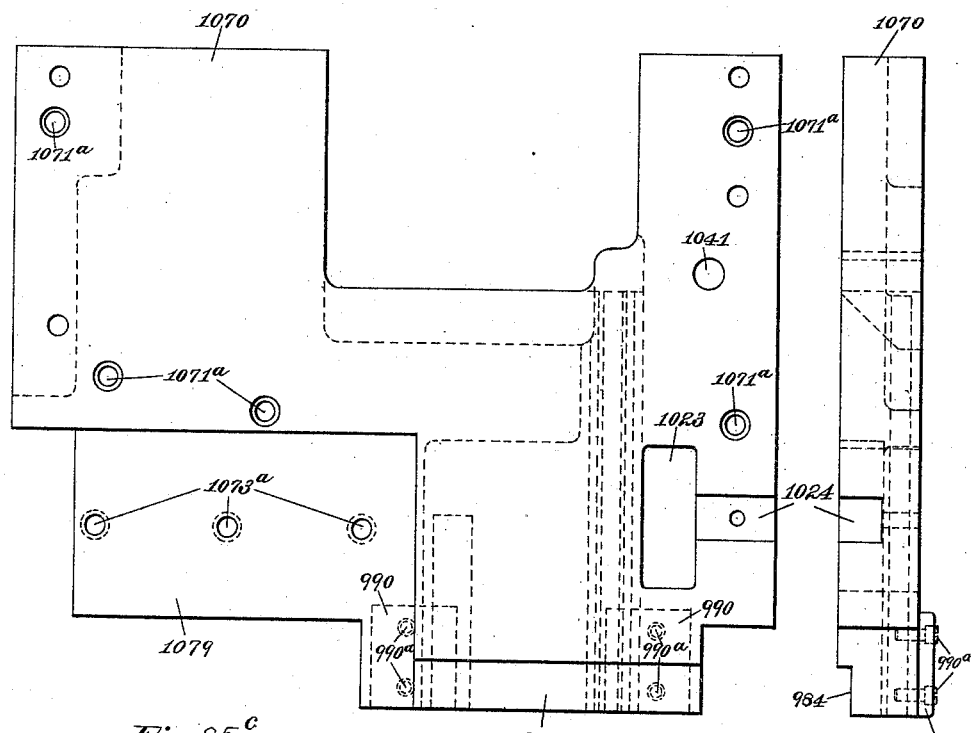
Fig. 85ᵇ    Fig. 85ᵃ
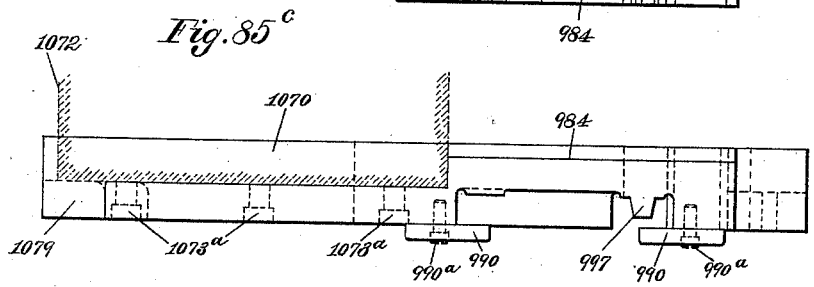
Fig. 85ᶜ
Witnesses:
Inventor:
Francis H. Richards (No Model.)                F. H. RICHARDS.                45 Sheets—Sheet 28.
                           ENVELOPE MACHINE.
No. 444,852.                                   Patented Jan. 20, 1891.

Witnesses:                                                Inventor:

(No Model.) 45 Sheets—Sheet 29.

F. H. RICHARDS.
ENVELOPE MACHINE.

No. 444,852. Patented Jan. 20, 1891.

Witnesses:
Henry L. Rickard
Wm. Bjorkman

Inventor:
Francis H. Richards (No Model.)
45 Sheets—Sheet 30.
F. H. RICHARDS.
ENVELOPE MACHINE.
No. 444,852. Patented Jan. 20, 1891.
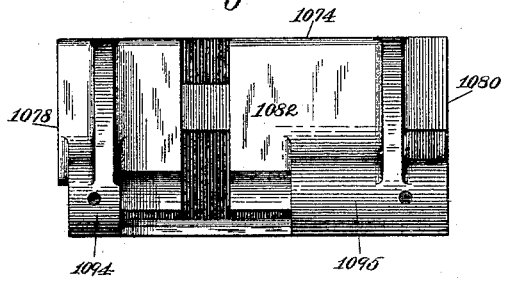
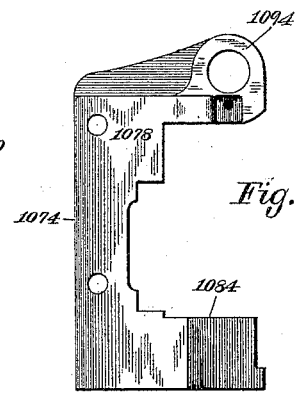
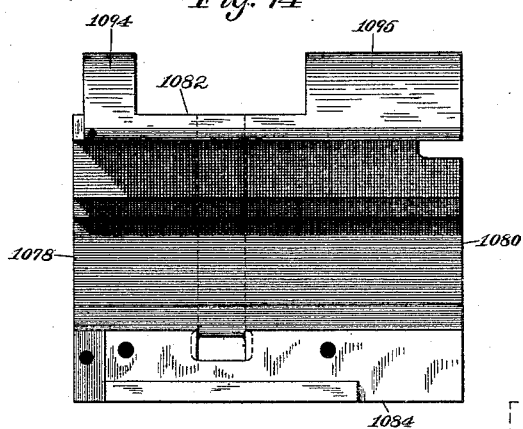
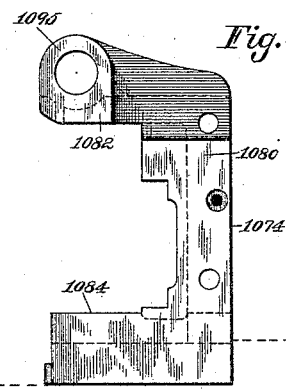
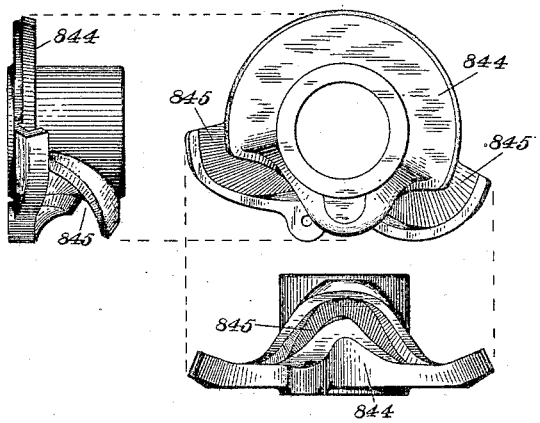
Witnesses:
Henry L. Rickard.
W. M. Bjorkman.
Inventor:
Francis H. Richards

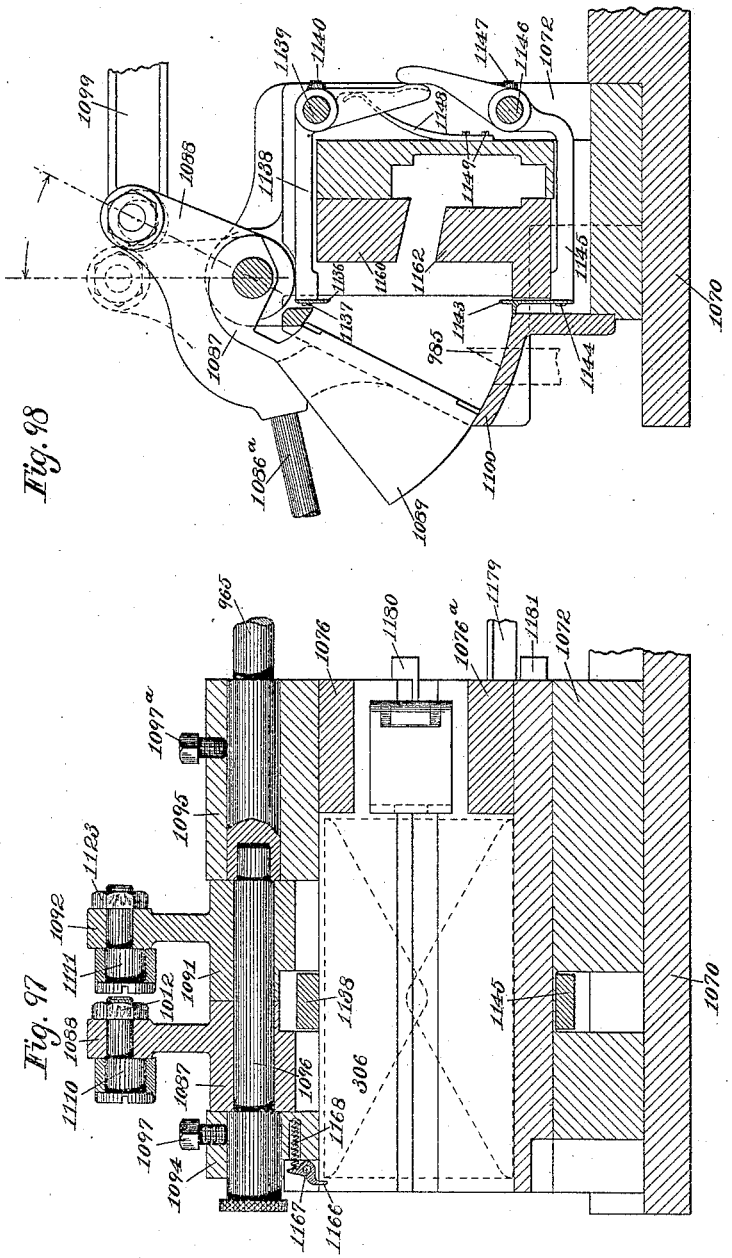

(No Model.)
F. H. RICHARDS.
ENVELOPE MACHINE.
No. 444,852. Patented Jan. 20, 1891.
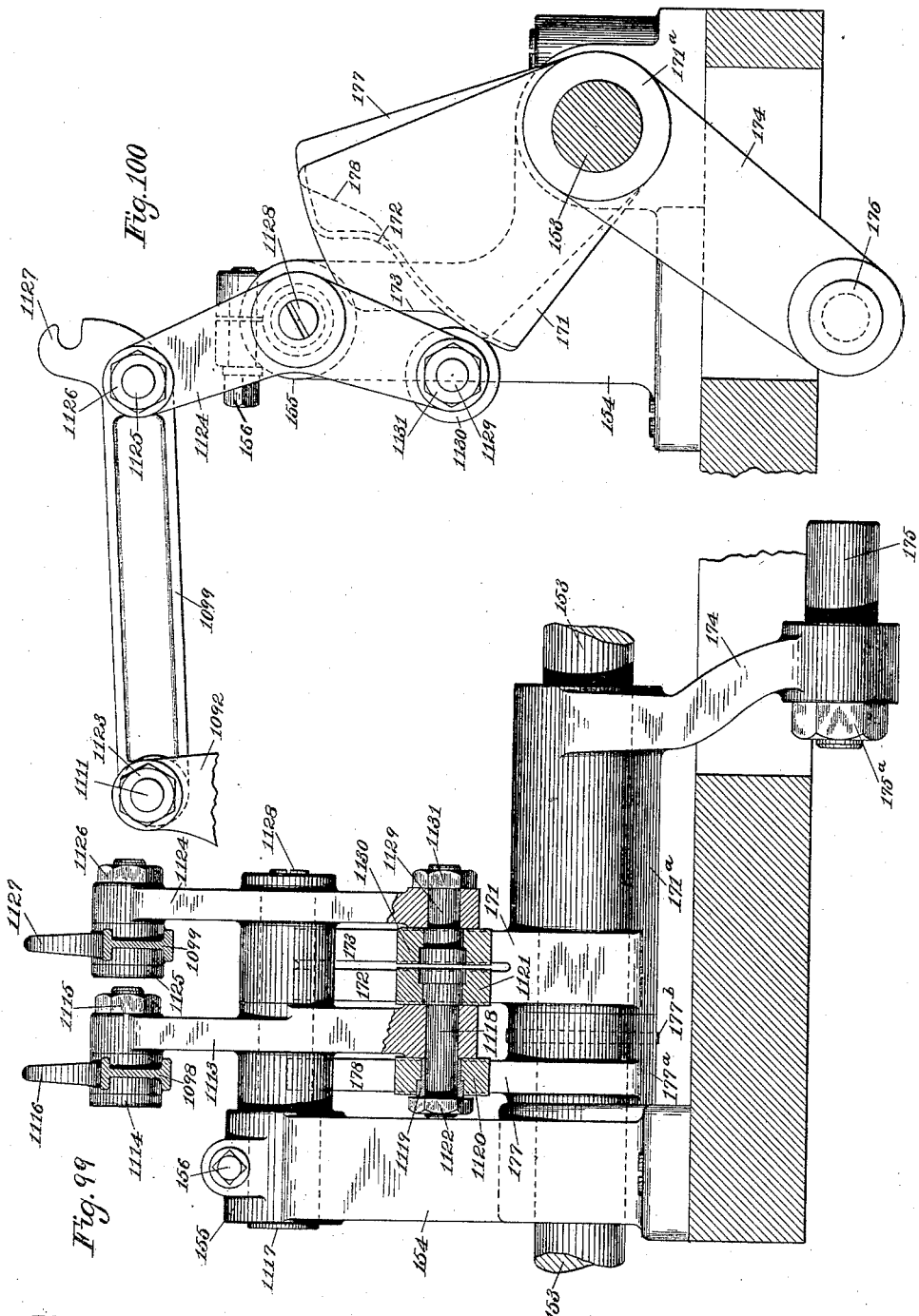
Witnesses:
Henry L. Reckard
Wm. Bjorkman
Inventor:
Francis H. Richards (No Model.)
45 Sheets—Sheet 33.
F. H. RICHARDS.
ENVELOPE MACHINE.
No. 444,852.
Patented Jan. 20, 1891.
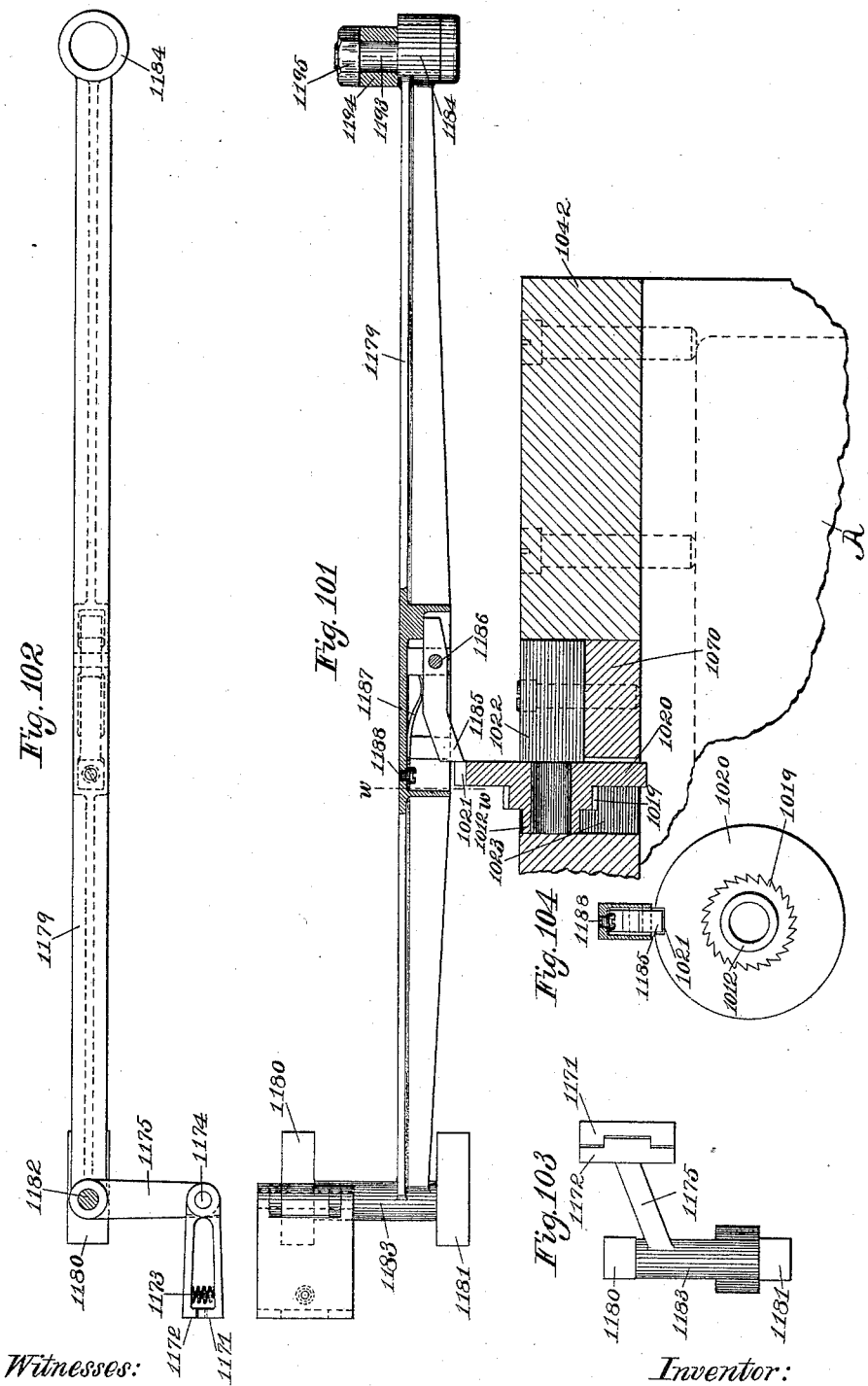
Witnesses:
Henry L. Rickard.
W. M. Bjorkman.
Inventor:
Francis H. Richards (No Model.)

45 Sheets—Sheet 34.

F. H. RICHARDS.
ENVELOPE MACHINE.

No. 444,852.

Patented Jan. 20, 1891.

Witnesses:
Henry L. Reckard
Wm. Bjorkman

Inventor:
Francis H. Richards (No Model.)  
45 Sheets—Sheet 35.
F. H. RICHARDS.
ENVELOPE MACHINE.
No. 444,852. Patented Jan. 20, 1891.
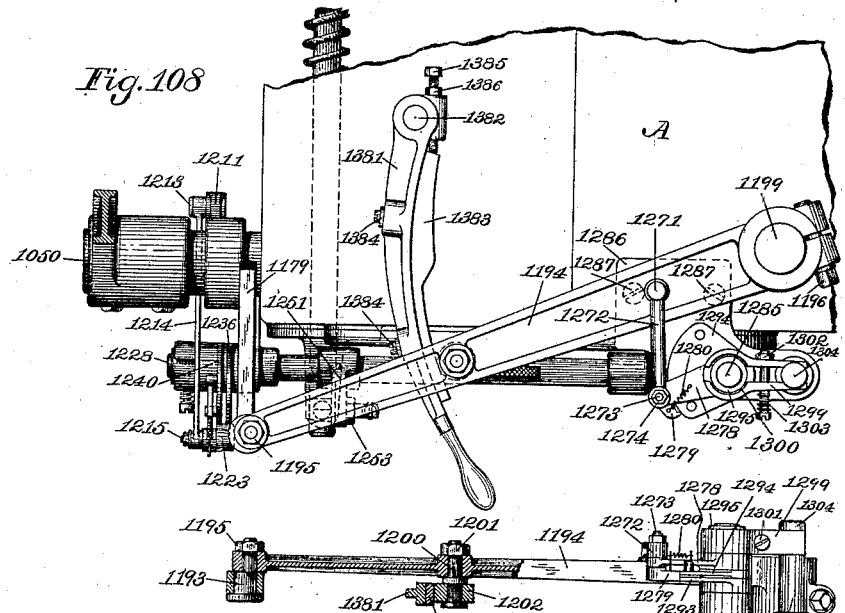
Fig. 108
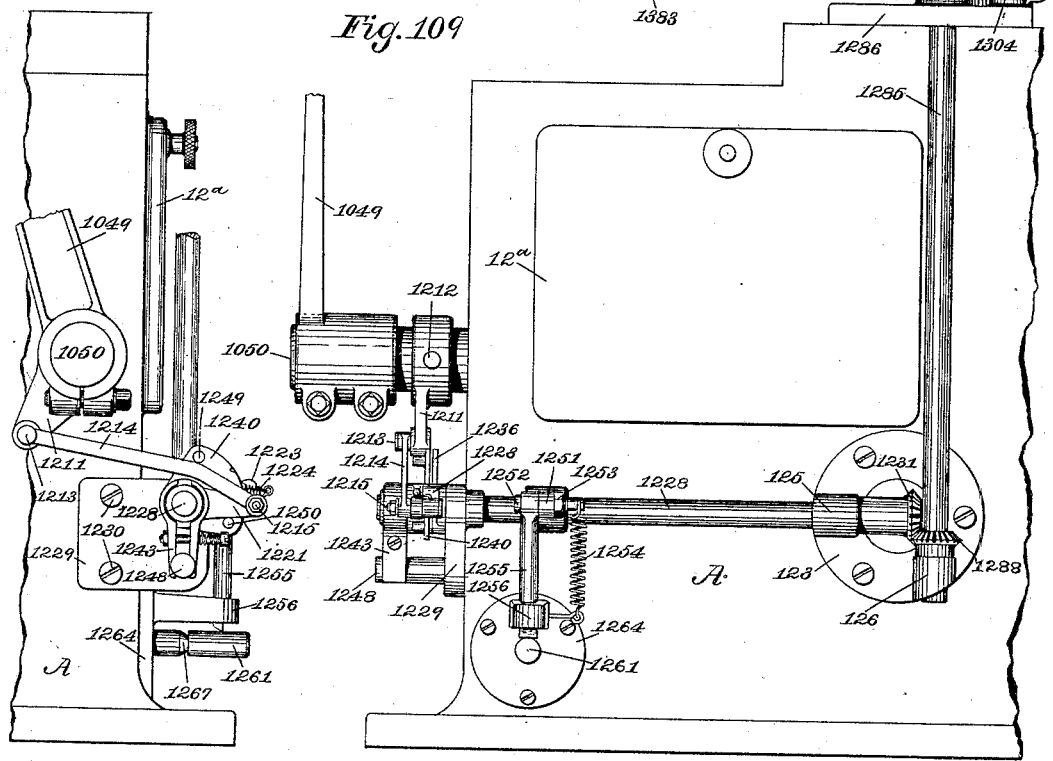
Fig. 110
Fig. 109
Witnesses:  
Henry L. Pickard.  
W. M. Bjorkman.
Inventor:  
Francis H. Richards (No Model.)  45 Sheets—Sheet 36.
F. H. RICHARDS.
ENVELOPE MACHINE.
No. 444,852.  Patented Jan. 20, 1891.
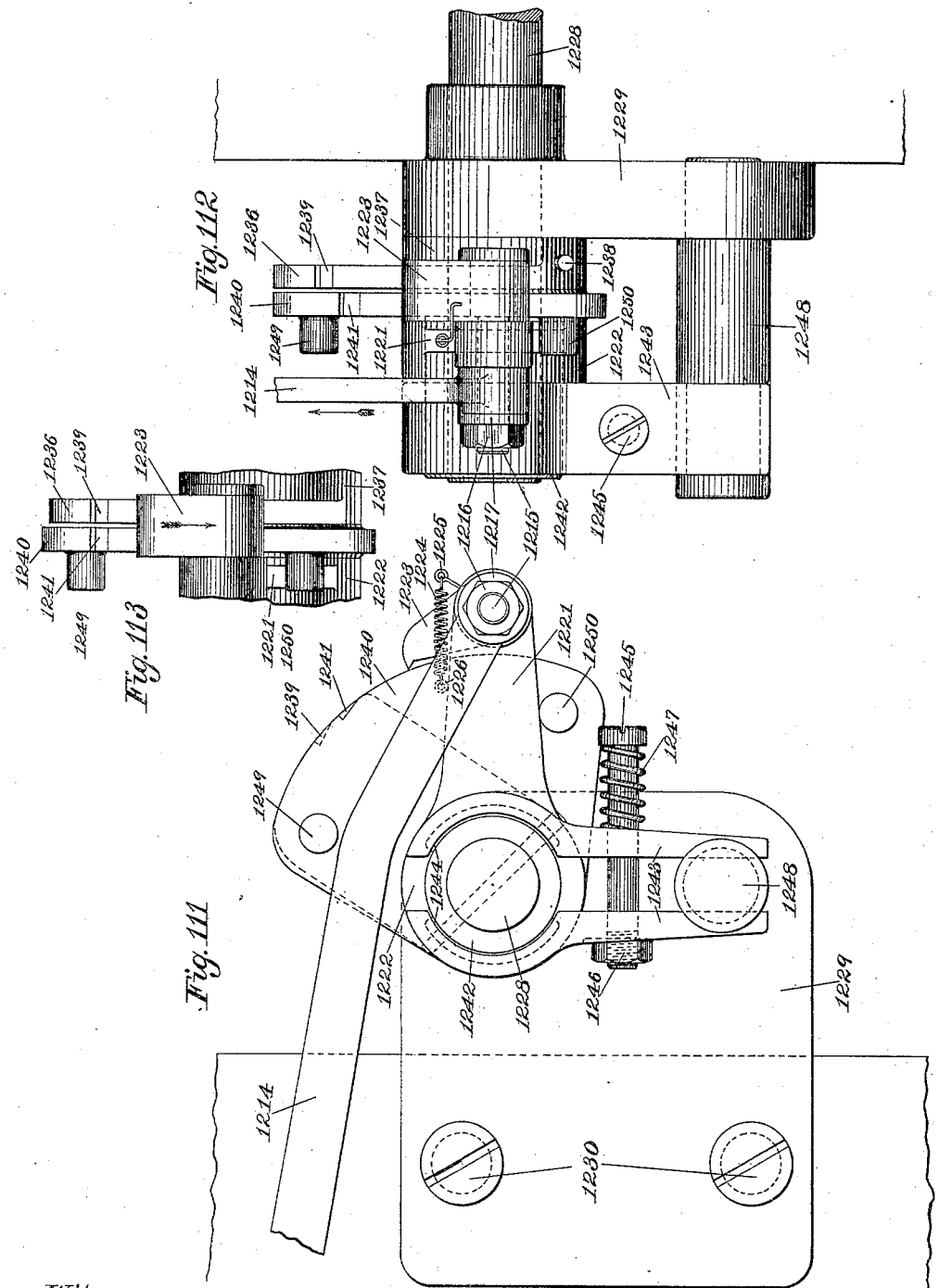
Witnesses:
Henry L. Rickard
Wm. Bjorkman
Inventor:
Francis H. Richards (No Model.)

45 Sheets—Sheet 37.

F. H. RICHARDS.
ENVELOPE MACHINE.

No. 444,852. Patented Jan. 20, 1891.

Witnesses:
Henry L. Rickard.
W. M. Bjorkman.

Inventor:
Francis H. Richards

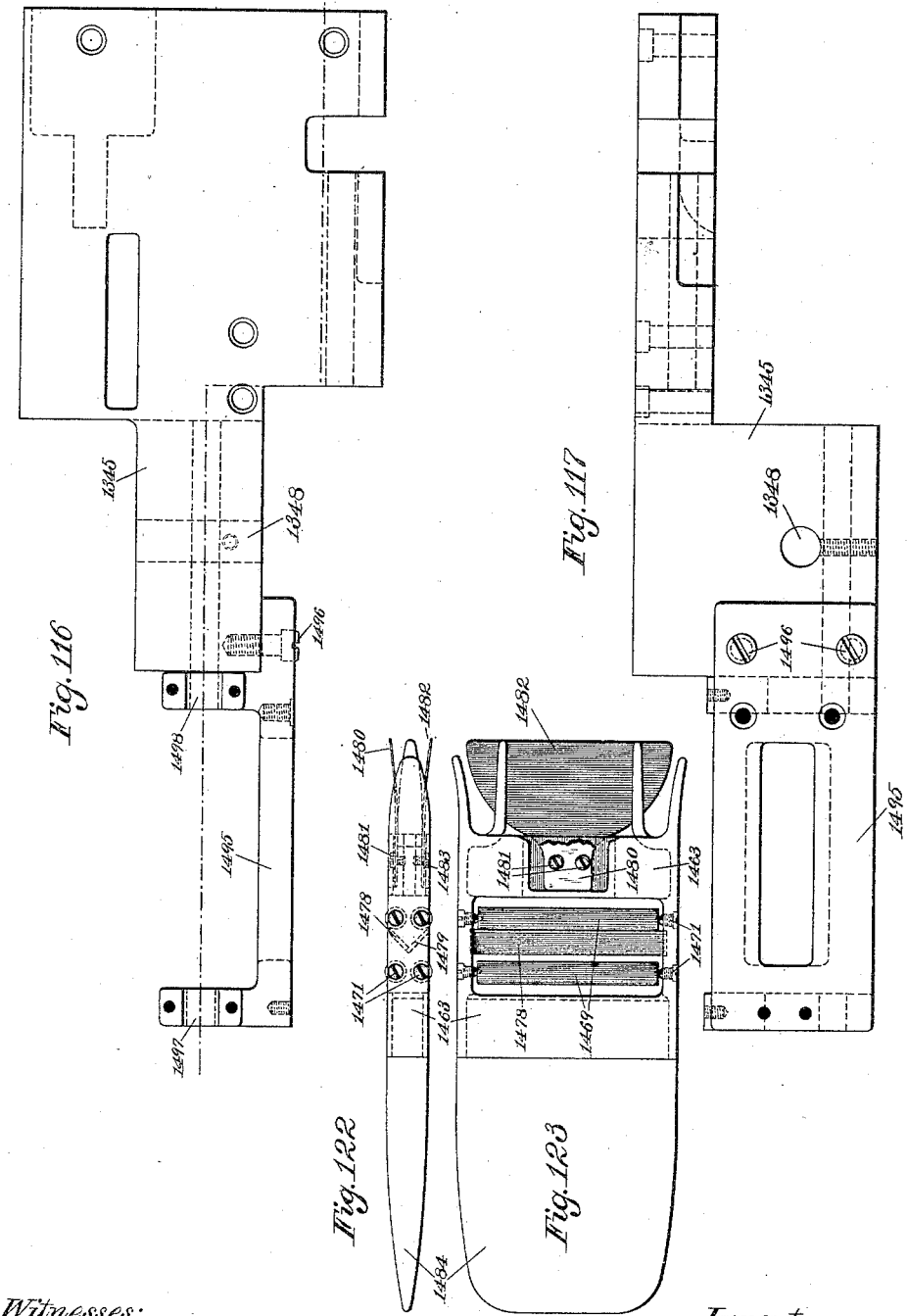

(No Model.)　　　　　　　　　　F. H. RICHARDS.　　　　　　　45 Sheets—Sheet 39.
ENVELOPE MACHINE.
No. 444,852.　　　　　　　　　　　　　　　　　　　　Patented Jan. 20, 1891.
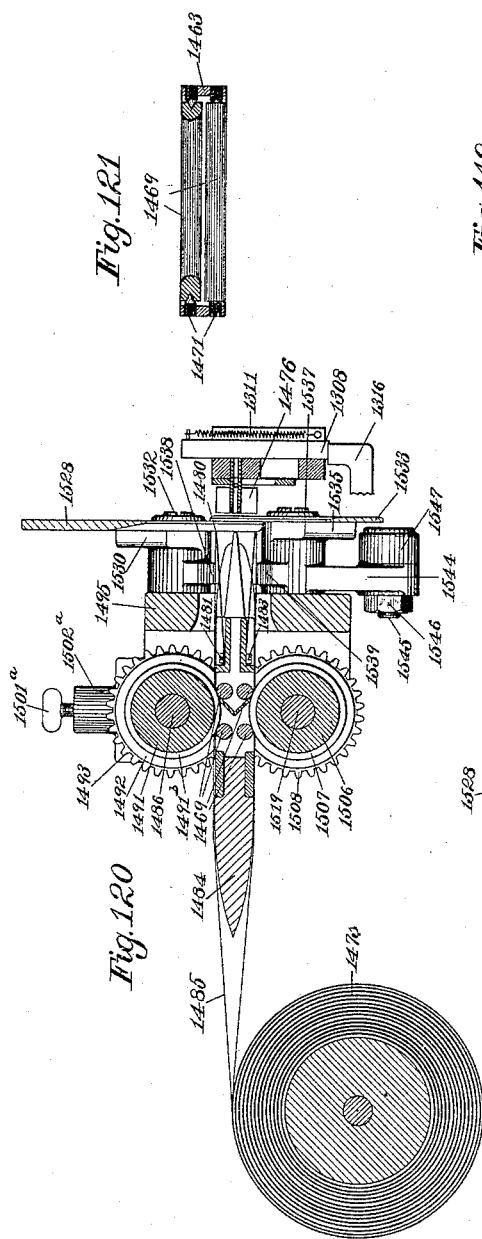
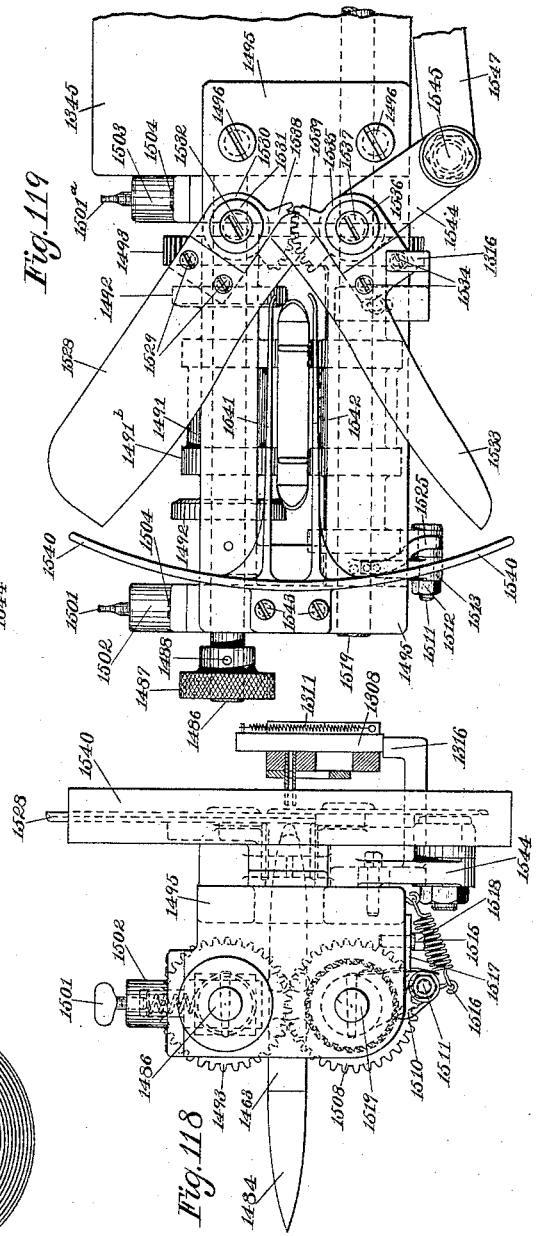
Witnesses:　　　　　　　　　　　　　　　　　　　　　　Inventor:

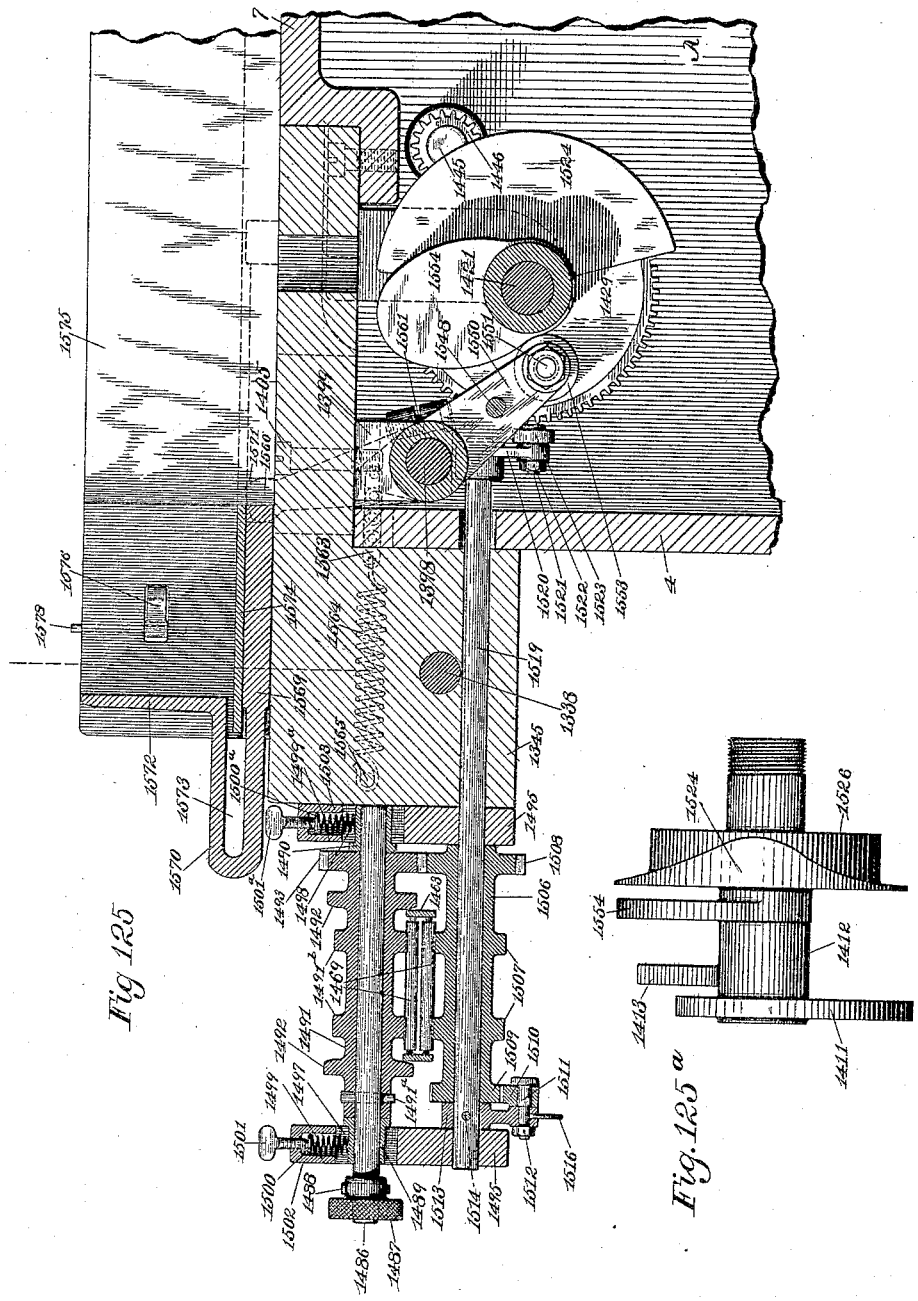

(No Model.)
F. H. RICHARDS.
ENVELOPE MACHINE.
No. 444,852. Patented Jan. 20, 1891.
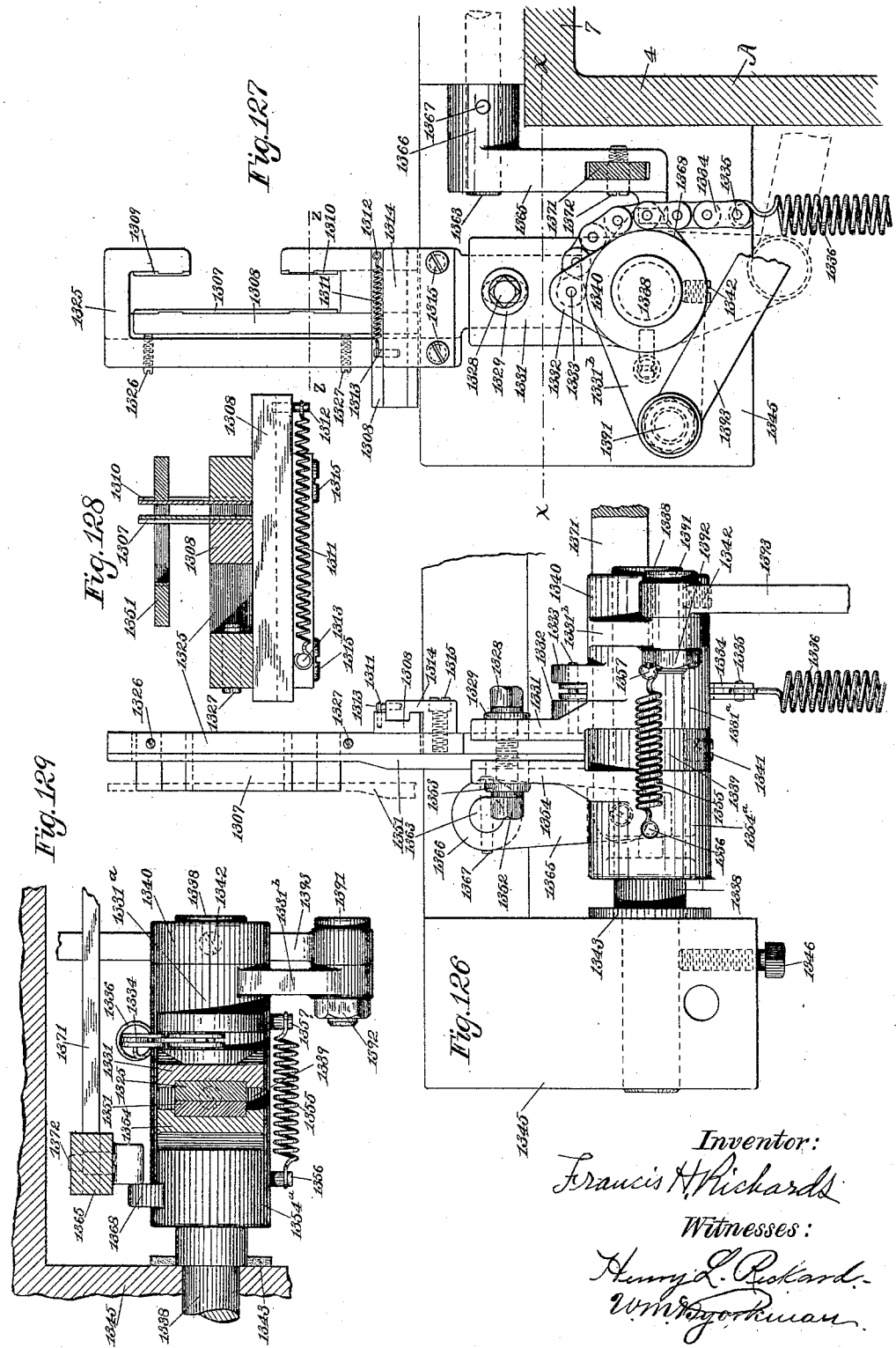
Inventor:
Francis H. Richards
Witnesses:
Henry L. Reckard
Wm. H. Bjorkman (No Model.)
45 Sheets—Sheet 42.

F. H. RICHARDS.
ENVELOPE MACHINE.

No. 444,852. Patented Jan. 20, 1891.

Witnesses:
Henry L. Reckard.
Wm. Bjorkman.

Inventor:
Francis H. Richards (No Model.)

45 Sheets—Sheet 43.

F. H. RICHARDS.
ENVELOPE MACHINE.

No. 444,852. Patented Jan. 20, 1891.

Witnesses: Henry L. Reckard, W. M. Bjorkman

Inventor: Francis H. Richards (No Model.)  
45 Sheets—Sheet 44.

F. H. RICHARDS.
ENVELOPE MACHINE.

No. 444,852. Patented Jan. 20, 1891.

Witnesses:  
Henry L. Reckard  
Wm B. Yorkman

Inventor:  
Francis H. Richards (No Model.) 45 Sheets—Sheet 45.

F. H. RICHARDS.
ENVELOPE MACHINE.

No. 444,852. Patented Jan. 20, 1891.

Witnesses:
Henry L. Reckard.
W. M. Bjorkman

Inventor:
Francis H. Richards

UNITED STATES PATENT OFFICE.

FRANCIS H. RICHARDS, OF HARTFORD, CONNECTICUT.

ENVELOPE-MACHINE.

SPECIFICATION forming part of Letters Patent No. 444,852, dated January 20, 1891.

Application filed May 7, 1890. Serial No. 350,923. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Envelope-Machines, of which the following is a specification.

This machine automatically manufactures printed envelopes from blanks previously cut to the required shape and delivers the completed envelopes in bunches of twenty-five counted and banded ready for boxing.

Figure 2:
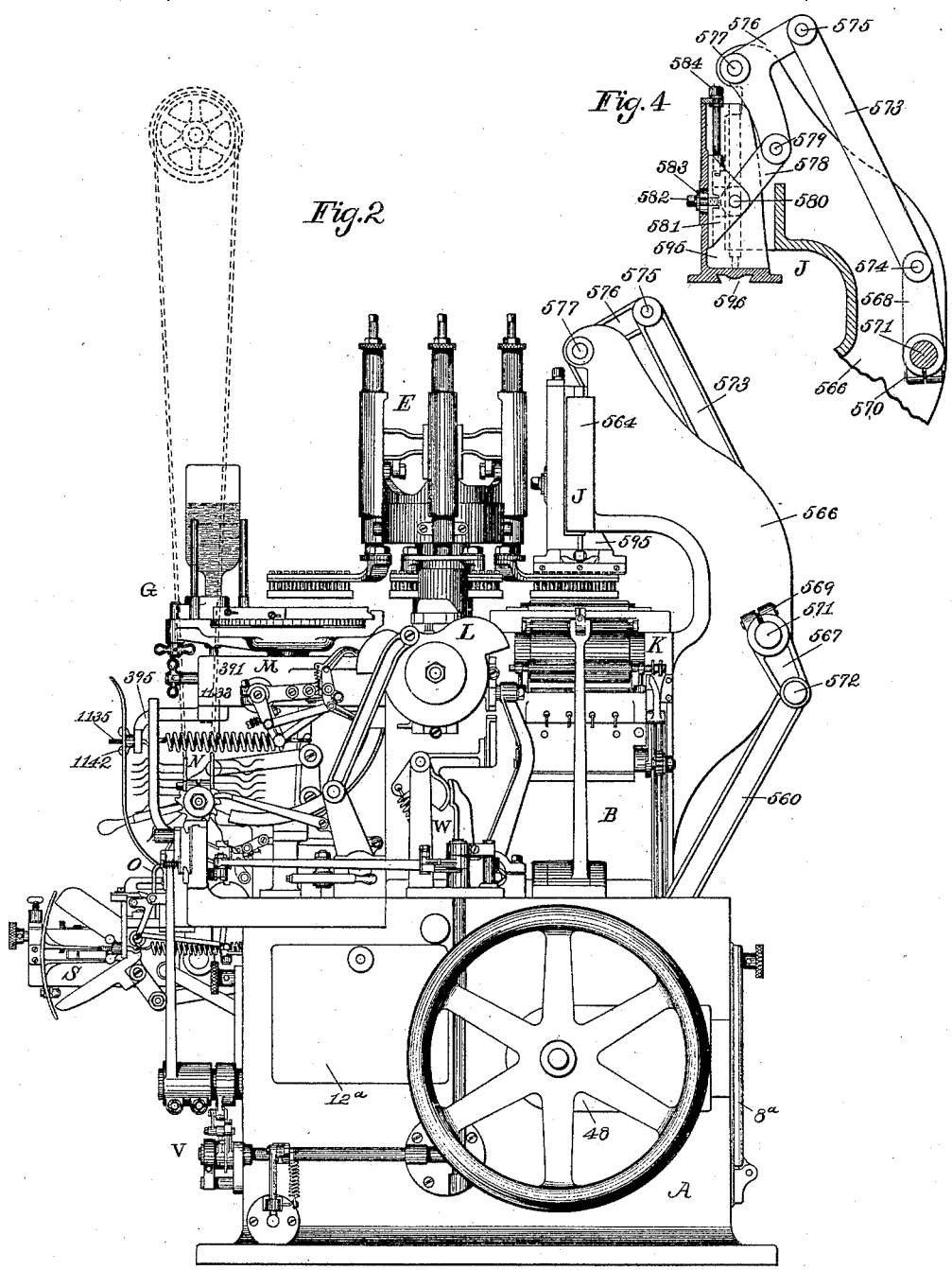
Figure 3:
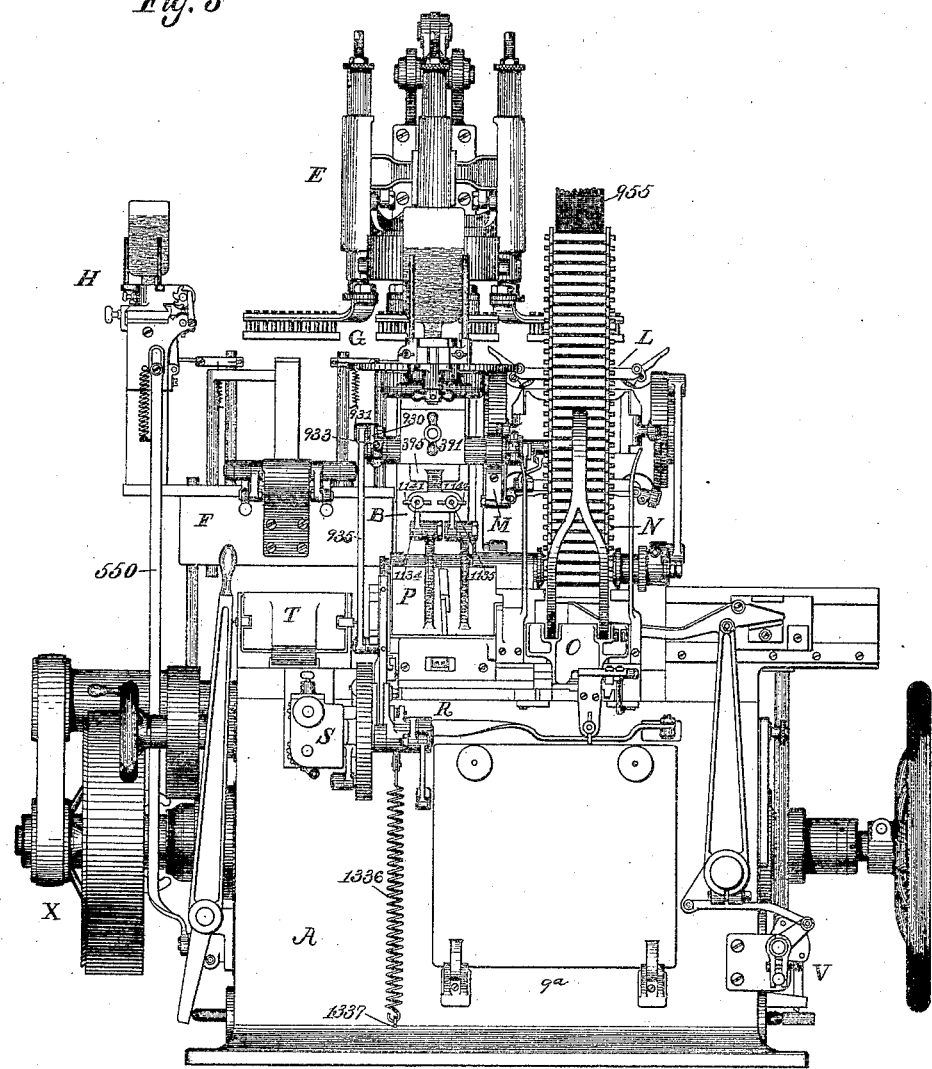
Figures 5, 6:
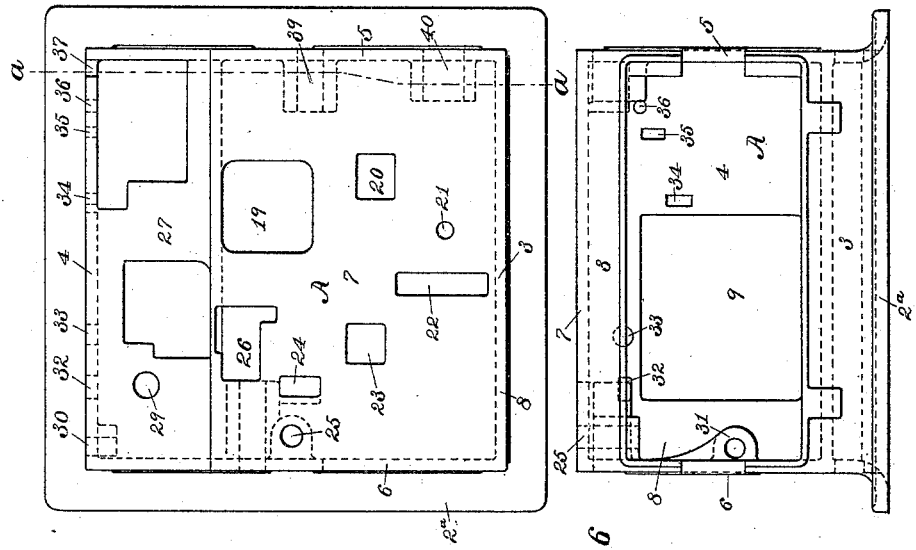
Figure 8:
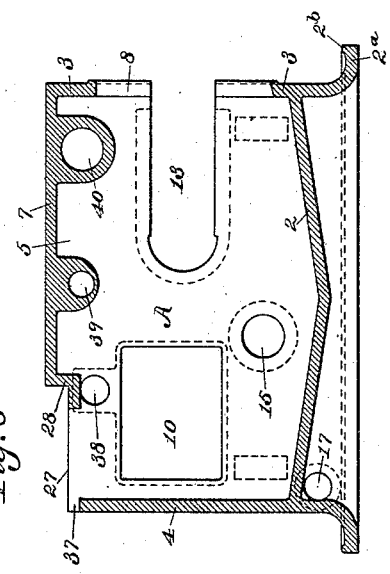
Figure 7:
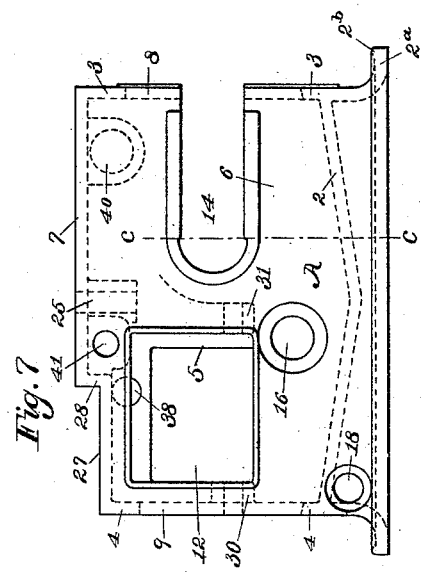
Figure 13:
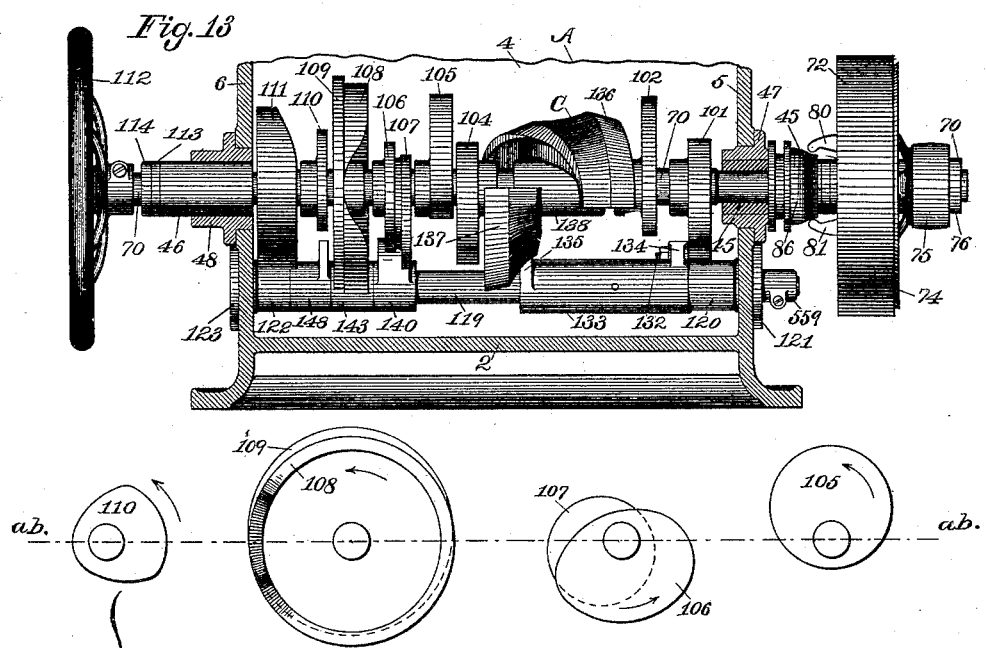
Figure 14:
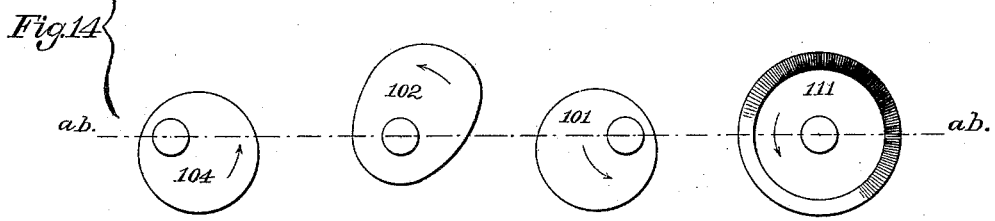
Figure 15:
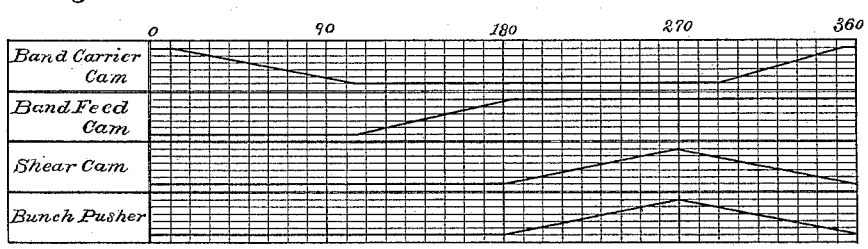
Figure 27:
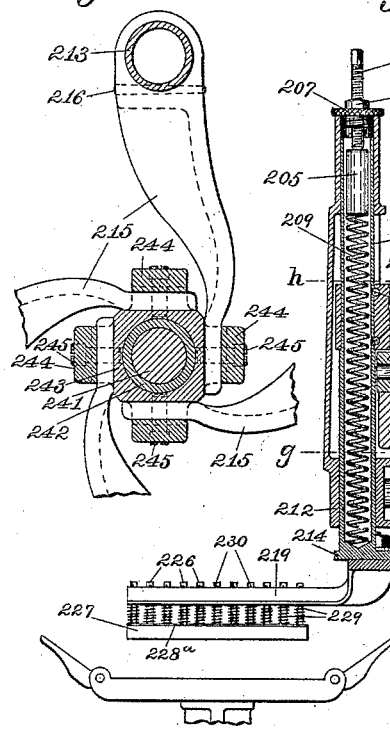
Figure 24:
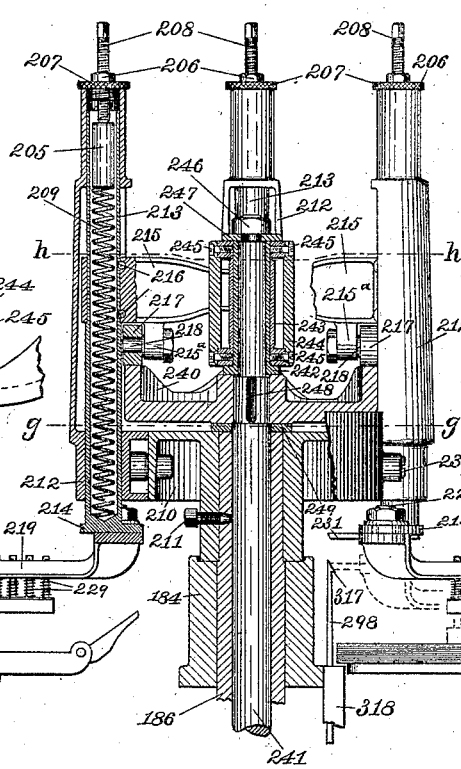
Figure 26:
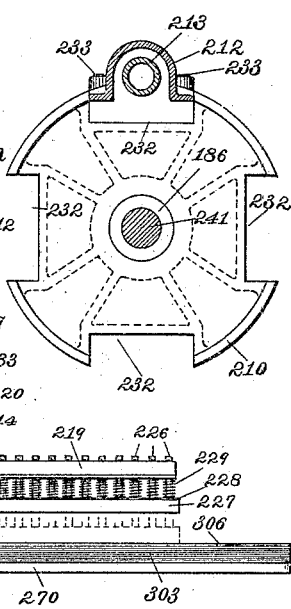
Figure 25:
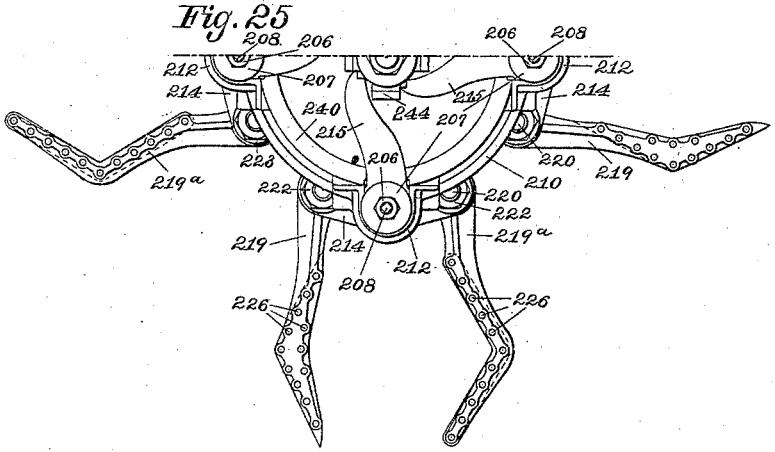
Figure 66:
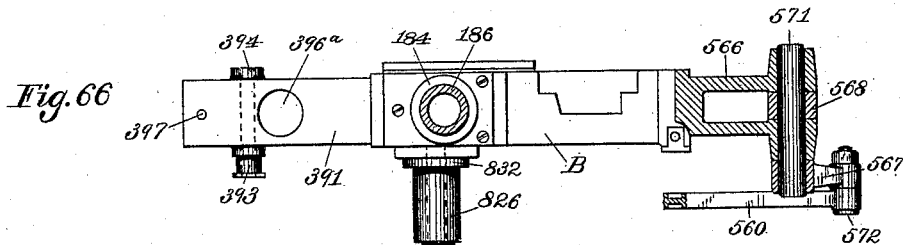
Figure 67:
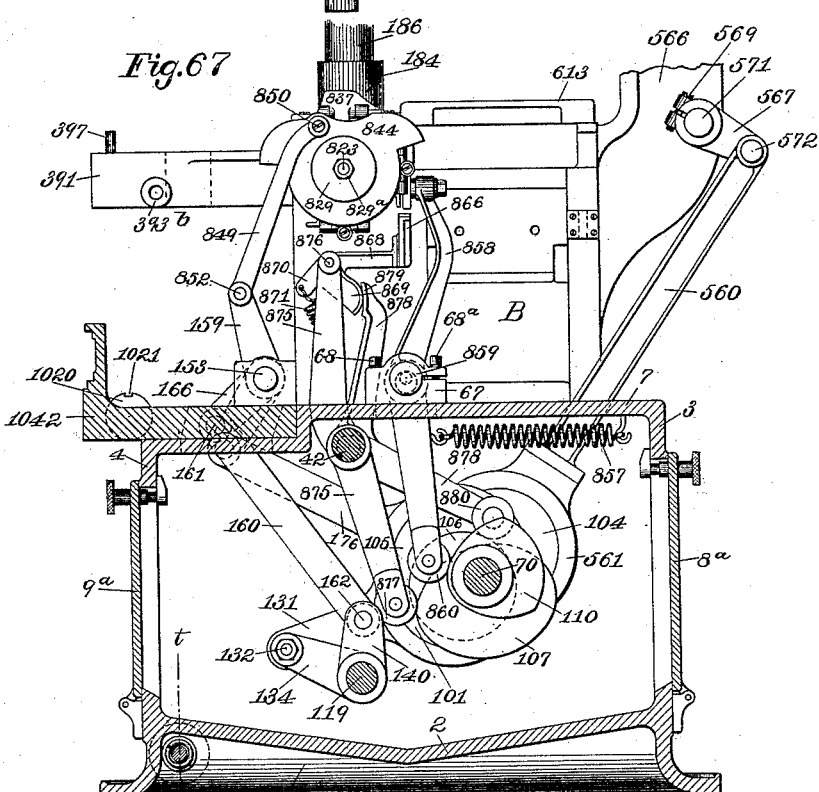
Figure 68:
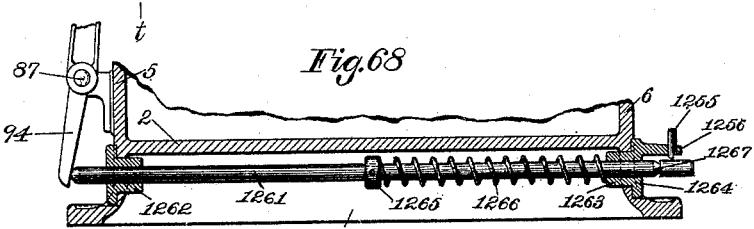
Figure 69:
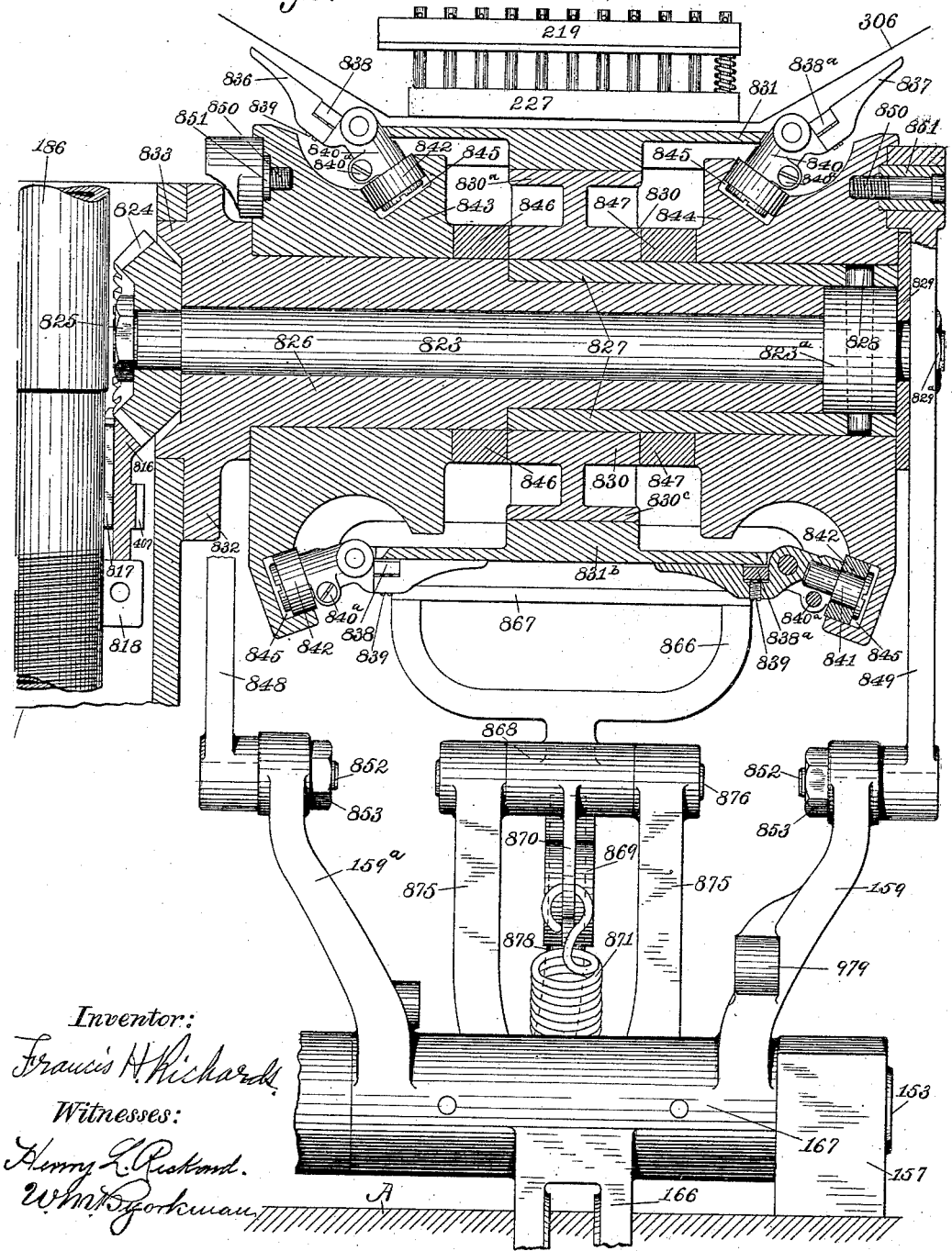
Figure 70:
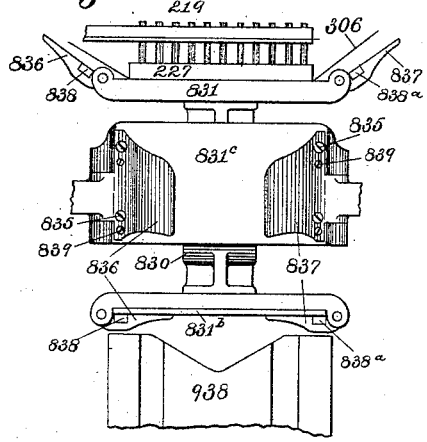
Figure 87:
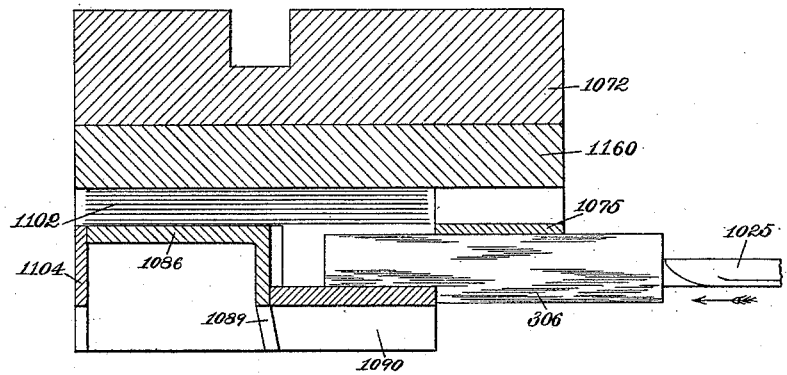
Figure 88:
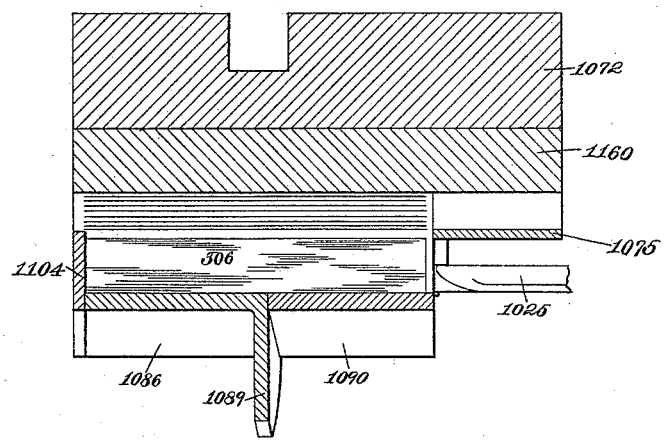
Figure 89:
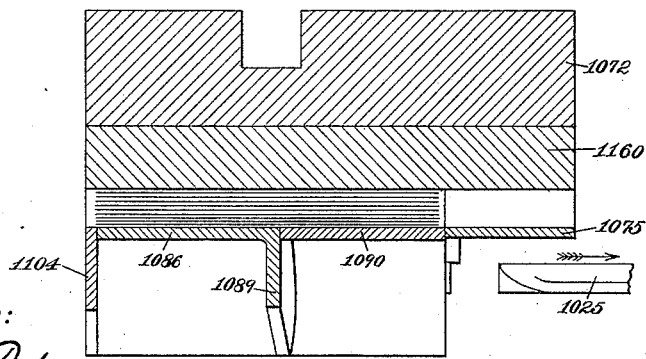
Figures 90, 91, 92:
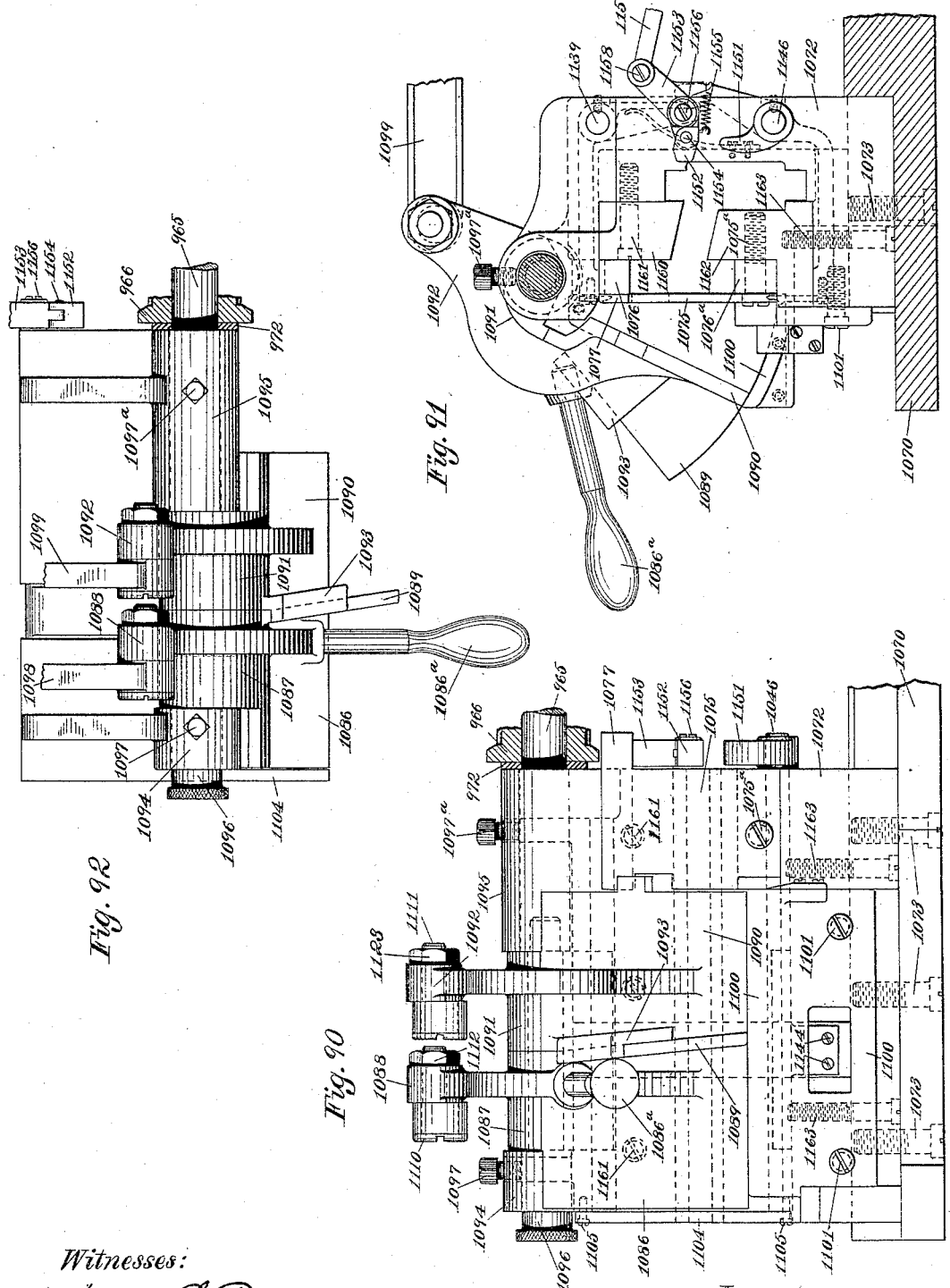
Figure 105:
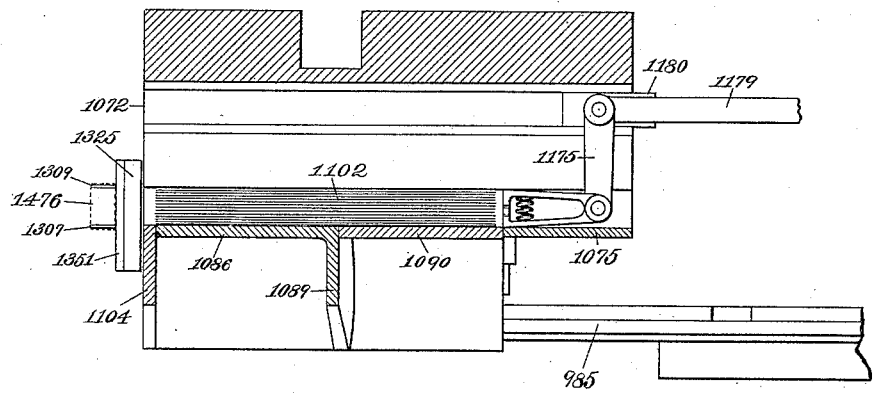
Figure 106:
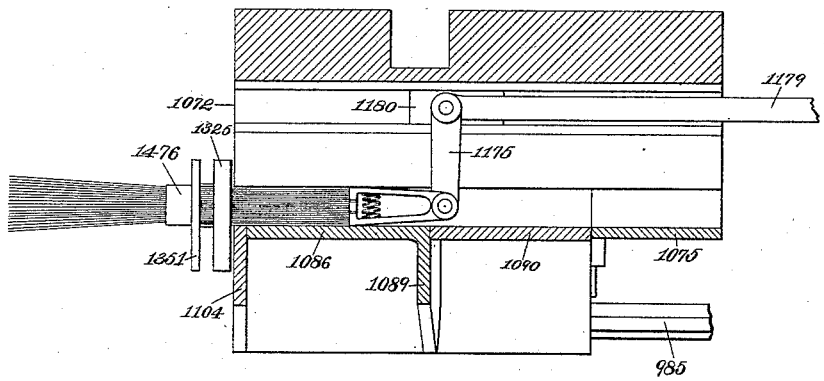
Figure 107:
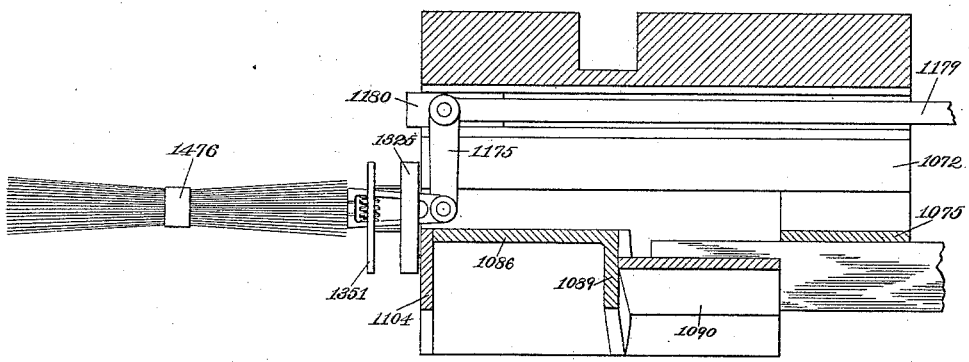
Figures 114, 115:
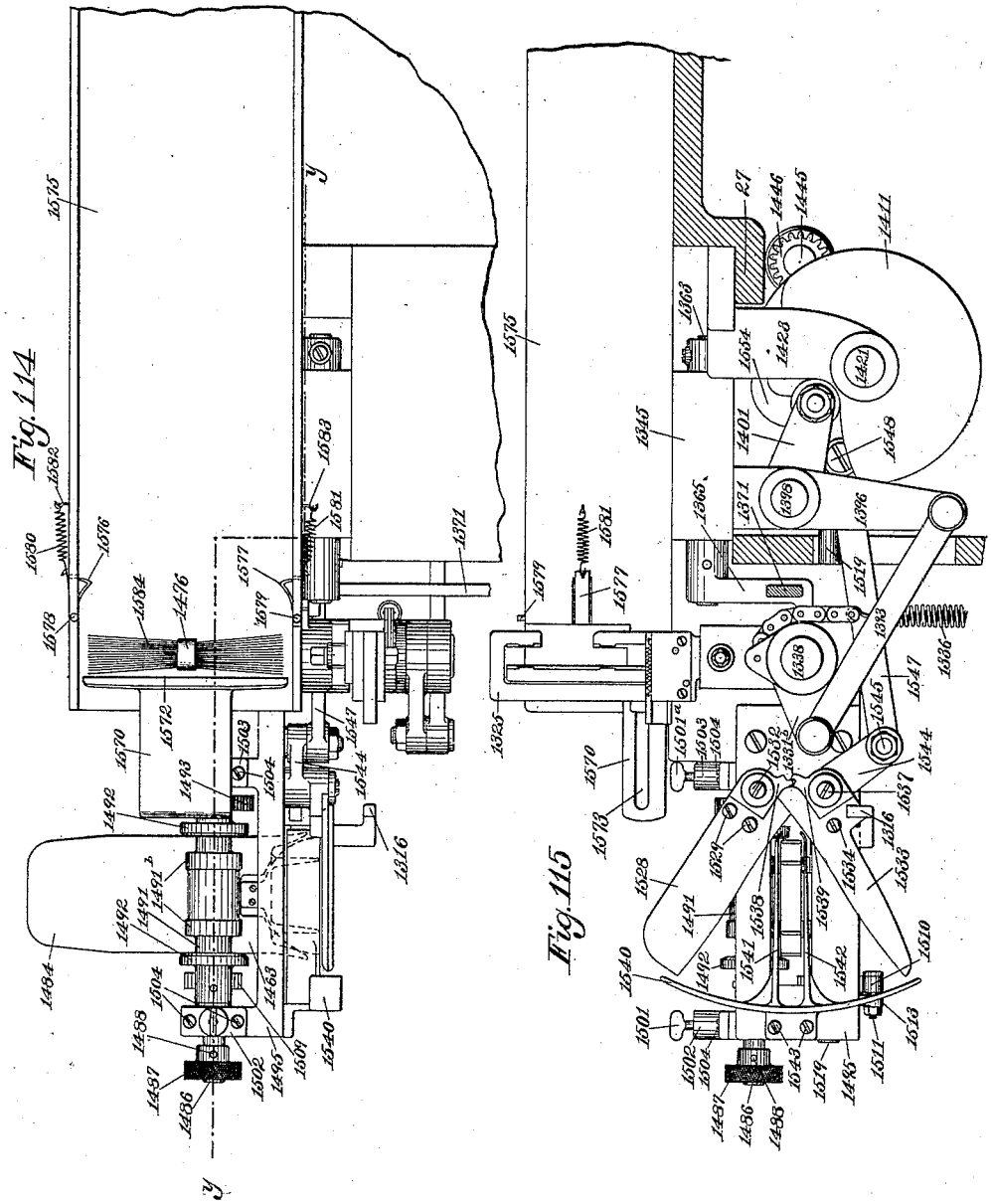
Figures 130, 131:
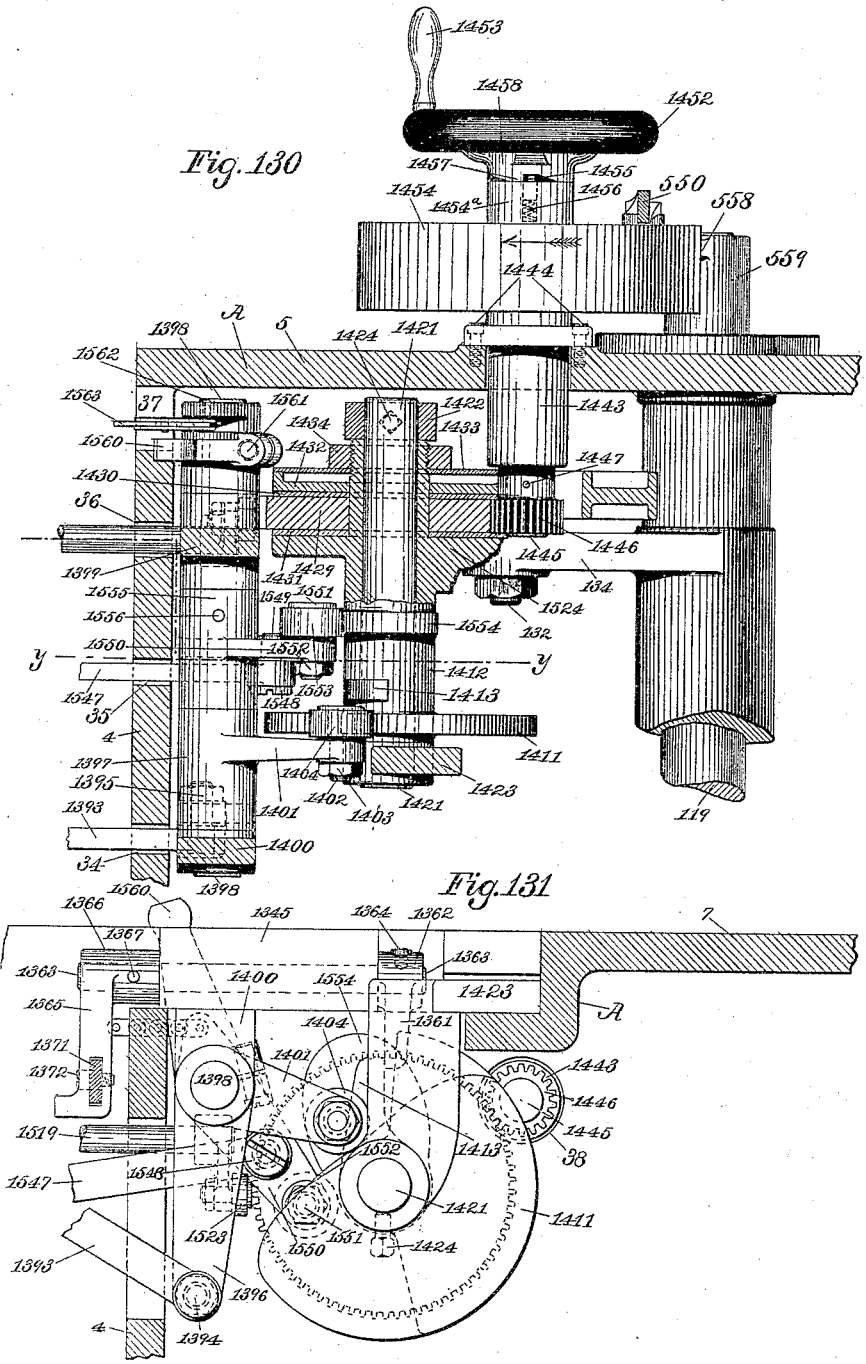
Figure 132:
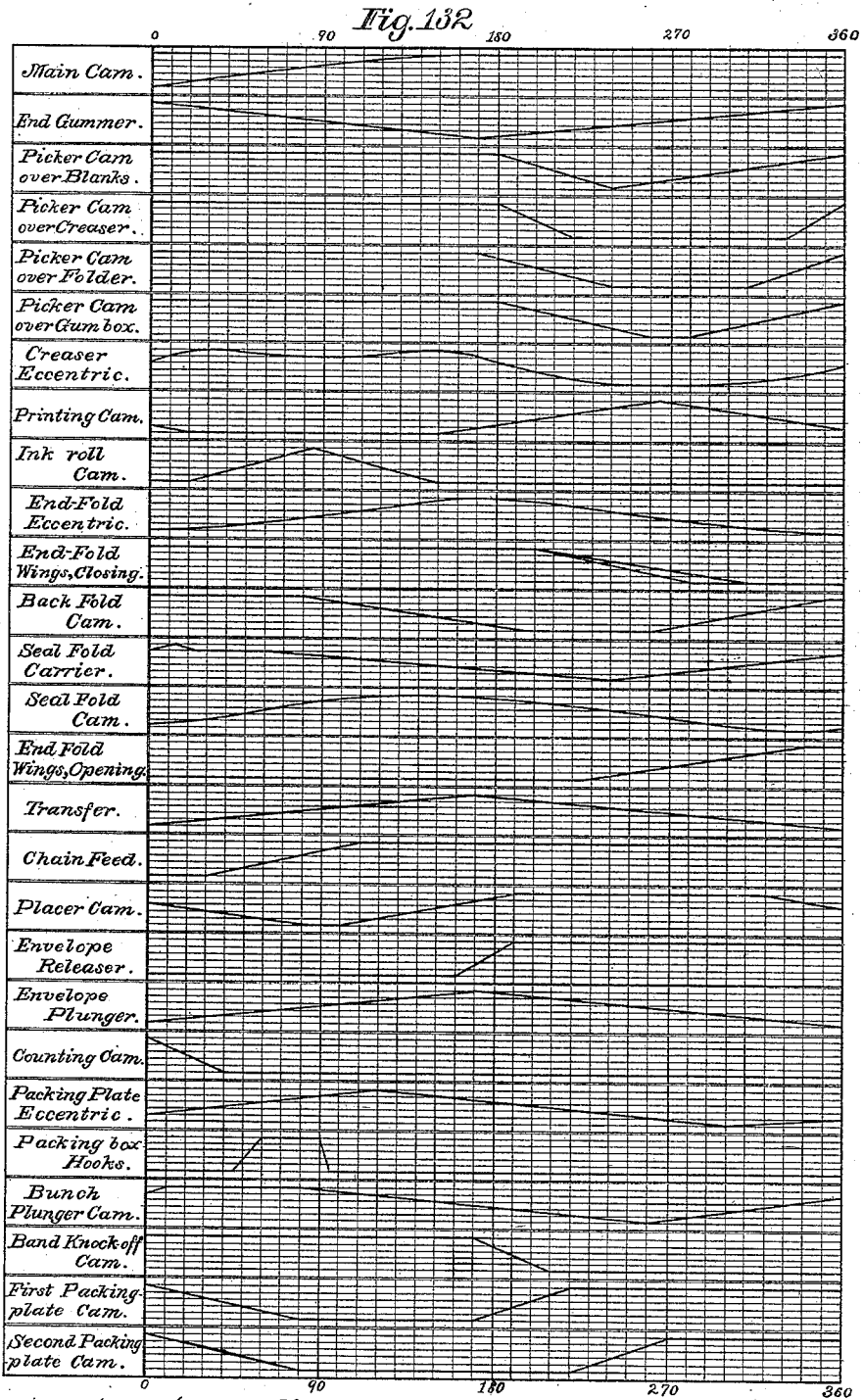
Figure 133:
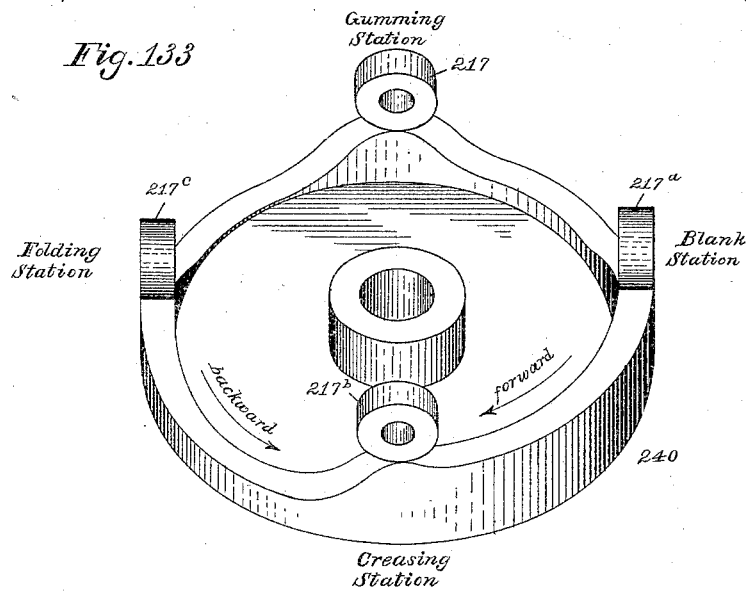
Figure 134:
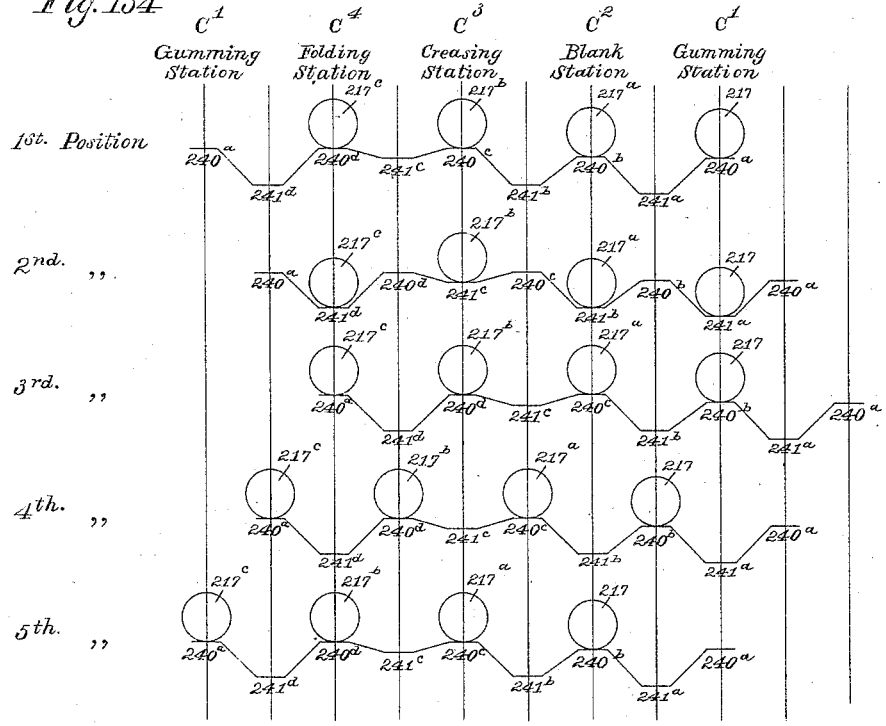

In the drawings accompanying and forming a part of this specification, Figure 1 is a front elevation of an envelope-machine embodying my improvements. Fig. 2 is a side elevation of the same as seen from the left hand in Fig. 1. Fig. 3 is a rear elevation of the machine. Fig. 4 is a sectional elevation of the adjacent part of Fig. 2. Figs. 5 and 6 are plan and front elevation, respectively, of the main bed of the machine, shown in detail. Fig. 7 is a side elevation of the main bed as seen from the left hand in Fig. 6 and drawn in projection with Fig. 6. Fig. 8 is a sectional elevation of the main bed, taken on the line $a\ a$ of Fig. 5 and as seen from the left hand in Figs. 5 and 6. Fig. 9 is a plan view of that part of the frame-work which I designate the "column." Fig. 10 shows the column in elevation as seen from the lower side of Fig. 9, which side is at the left hand in Fig. 1. Fig. 11 shows a horizontal section on the line $b\ b$, Fig. 10, as seen from above. Fig. 12 is an elevation of that side of the column which is above in Fig. 9 and which is at the right hand in Fig. 1. Fig. 13 shows the main cam-shaft in place in its bearings and with its driving-pulley, eccentrics, cams, and hand-wheel thereon. The first rock-shaft is shown below the main cam-shaft, and there is also shown a partial section of the main bed, taken on the line $c\ c$, Fig. 7. Fig. 14 shows side elevations of eight of the cams and eccentrics on the main shaft drawn in their proper relative positions, as shown by lines $a\ b$, to a horizontal plane through the shaft in Fig. 13. Fig. 15 is a diagram of the cam movements of that part of the machine which I designate the "banding mechanism" and hereinafter described. Fig. 16 is a plan view of the second rock-shaft with its arms and cams as seen from the front of Fig. 1, and the observer being in front of the machine, as in Fig. 1. Figs. 17 and 18 show side elevations as seen from the right hand in Fig. 16 of the double and single cams on the second rock-shaft, these views being drawn to a smaller scale. Fig. 19 is a plan view of the main cam, which I also designate the "picker-shaft cam," together with a horizontal section of the turret and rolls on which this cam operates, being the parts below the line $d\ d$ in Fig. 20. Fig. 20 is a vertical section of the cam-roll turret on line $e\ e$, Fig. 19, together with certain other parts of the apparatus for driving the picker mechanism. Figs. 21 and 22 are front and side views, respectively, of one of the blank-pickers, shown partially in section. Fig. 23 is a partial sectional elevation of one of the blank-pickers as seen from the left hand in Fig. 21, the section being taken on the line $f\ f$. Fig. 24 is a front elevation of the picker mechanism, shown chiefly in section. Fig. 25 is a plan view of the front half of said picker mechanism. Fig. 26 is a plan view of the picker-turret, showing one of the picker spindles and frames in section on the line $g\ g$, Fig. 24. Fig. 27 is a partial section on the line $h\ h$ as seen from above in Fig. 24. Fig. 28 is a plan view of the blank-feed mechanism, and also shows a partial plan view of the column, together with the upper bearing for the picker-shaft. Fig. 29 is a front elevation of the blank-feed mechanism, including the column, the upper bearing (partially broken away) for the picker-shaft, and the trough through which the bunches of finished envelopes are delivered at the front of the machine. Fig. 30 is a plan view of the blank-feed box or frame with its cover removed and showing the gearing for operating the blank-plate lifters. Fig. 31 is a side elevation of the feed-box as seen from the right hand of the machine, (the lower side in Fig. 30,) this side broken away. Fig. 32 is a vertical section taken on the line $i\ i$, Fig. 28. Figs. 33 and 34 are views illustrating the operation of certain parts of the feed mechanism. Fig. 35 is a plan view of part of the gumming mechanism and upper bearing for picker-shaft. Fig. 36 is an elevation of the mechanism shown in Fig. 35, drawn in projection therewith, a part of the column being broken away to show the driving-gearing. Fig. 37 is a vertical section on line $j\,j$ as seen from the right in Fig. 36. Fig. 38 is a vertical section on line $k\,k$ as seen from the left in Figs. 35 and 36, and shows, also, a part of the picker mechanism. Fig. 39 is a vertical section on line $l\,l$ as seen from the right in Fig. 36. Fig. 40 is an elevation of part of the mechanism shown in Figs. 35 and 36, some details being broken away the better to show other parts. Fig. 41 is a plan view of that part of the gumming mechanism which I designate the "gum-box." Fig. 42 is a vertical section through the gum-box on line $m\,m$ in Fig. 41 and drawn in projection therewith. Fig. 43 is a plan view of that part of the gumming mechanism which I designate the "end-gummer." Fig. 44 is a side elevation of the end-gummer shown in Fig. 43 and drawn in projection therewith. Fig. 45 is a front elevation of the end-gummer drawn in projection with Fig. 44 and showing part of the blank-feed mechanism. Fig. 46 is a horizontal section on line $n\,n$ in Fig. 45 as seen from above. Fig. 47 is a plan view of the blank-creasing dies. Fig. 48 is a vertical section of the upper and of composite lower blank-creasing dies, taken on the line $o\,o$ in Fig. 47. Figs. 49 and 50 are perspective views of a blank before and after it has been creased. Figs. 51, 52, and 53 are vertical sections illustrating the operation of the creasing-dies. Fig. 54 is a side elevation of the printing apparatus, showing section of a part of the main bed and the main cam-shaft. Fig. 55 is a plan view of an electrotype-block and the platen to which it is secured as seen from above and in projection with Fig. 54. Fig. 56 is a horizontal section on line $p\,p$ as seen from above in Fig. 54, showing the operation of part of the printing apparatus. Fig. 57 is a sectional front elevation of the printing apparatus and inking mechanism, taken on line $q\,q$ and as seen from the right hand in Fig. 62, and also showing a part of the main cam-shaft with some of the cams thereon. Fig. 58 is a vertical section of the ink-fountain, taken on line $r\,r$ and as seen from the right hand in Fig. 62. Figs. 59 and 60 are views illustrating the construction and operation of certain details of the inking mechanism. Fig. 61 is a sectional view illustrating the operation of the creasing and printing mechanism. Fig. 62 is a side elevation of the ink-fountain and accessory details as seen from the left hand in Fig. 63. Fig. 63 is a front elevation of the ink-fountain mechanism and accessory parts as seen from the right hand in Fig. 62 and drawn in projection therewith. This view also shows a portion of the main bed in section, together with the gearing for driving the ink-fountain rolls. Fig. 64 is a vertical section of the main driving-pulley and friction-clutch on the main cam-shaft, taken on line $s\,s$ and as seen from the left hand in Fig. 65. Fig. 65 is a side elevation of the main bed as seen from the right hand in Fig. 1 and also from the left hand in Fig. 3, showing the arrangement of driving-belts, together with means for operating the friction-clutch, and also showing a portion of the banding mechanism. Fig. 65$^a$ is a sectional view of the ink-fountain pulley. Fig. 66 is a plan view of the top of the column with a portion of the creaser frame or bracket in section on the right, a plan view of the shelf supporting the folding mechanism projecting below, and the bracket that supports part of the gumming mechanism on the left. Fig. 67 is a side elevation of the folding mechanism, and shows also the connections from the main cam-shaft to the first and second rock-shafts and to the creasing mechanism, the main bed being shown in section. Fig. 68 is a vertical section taken on the line $t\,t$ as seen from the left in Fig. 67, showing the construction and operation of a portion of the automatic stop mechanism. Fig. 69 shows on a larger scale a rear elevation of the folding mechanism, the fold-turret cams and driving-gears being in section. Figs. 70, 71, 72, and 73 illustrate the operation of the folding mechanism. Fig. 74 is a front elevation of the part I designate the "seal-folder." Fig. 75 is a top view of the transfer mechanism (excepting the trough and driving apparatus) for transferring the envelopes from the folding mechanism to the endless carrier. Figs. 76, 77, and 78 are side elevations illustrating the construction and operation of the transfer mechanism. Fig. 79 shows in two views the lower transfer-nipper. Fig. 80 is a plan view of the transfer-trough, and also shows the construction and operation of the apparatus for driving the endless carrier. Fig. 81 shows a section of the transfer-trough, taken on the line $v\,v$ in Fig. 78. Figs. 82 and 83 are views illustrating the construction of the endless carrier. Fig. 84 shows a rear elevation of the mechanisms I designate the "counting" and "envelope-plunger" mechanisms for taking the envelopes from the endless carrier, counting them, and placing them in the packing-box. Fig. 84$^a$ is a plan view of the placer-slide, the placer, the envelope-way, and certain adjacent parts. Fig. 85 is a side elevation of the counting and envelope-plunger mechanisms. Fig. 85$^a$ is a view illustrating the construction and operation of the counting-cam. Fig. 85$^b$ is a plan view of the packing-box bed-plate. Fig. 85$^c$ is a view of the rear edge of said plate. Fig. 85$^d$ is a side view of the same. Fig. 86 is a side view illustrating the construction and operation of the counting apparatus. Fig. 86$^a$ is a view similar to Fig. 86, but showing the parts in another position. Figs. 87, 88, and 89 are views illustrating the operation of the envelope-plunger and of the packing-box. Figs. 90, 91, and 92 show a rear elevation, side elevation, and plan view, respectively, of the envelope-packing box and of its component and accessory parts. Fig. 93 is a plan view of that part of the packing-box and bunch-plunger mechanism designated as the "packing-box frame." Fig. 94 is a rear side elevation of the packing-box frame. Figs. 95 and 96 are end elevations of the packing-box frame as seen from the right and left hand, respectively, of Fig. 94. Figs. 97 and 98 are sectional front and end elevations, respectively, illustrating the construction and operation of the packing-box. Fig. 99 is a rear elevation of the cams on the second rock-shaft and the connections for operating the packing-box mechanism. Fig. 100 is a side elevation as seen from the right hand of the parts shown in Fig. 99. Fig. 101 is a rear or side elevation, shown partly in section, of the device designated as the "bunch-plunger," which at the proper time drives the bunch of envelopes out of the packing-box, through the band-carrier, and into the bunch-trough, the band being placed on the bunch while the same is in motion. Fig. 102 is a plan view of the bunch-plunger drawn in projection with Fig. 101. Fig. 103 is an end elevation of the bunch-plunger as seen from the left hand in Fig. 101. Fig. 104 is a section of the bunch-plunger taken on line $w$ $w$ as seen from the left in Fig. 101 and illustrates the operation of the counting device. Figs. 105, 106, and 107 are sectional plan views of the packing-box, illustrating the operation of putting a band onto the bunch of envelopes. Fig. 108 is a plan view of the automatic stop mechanism, showing those parts of the envelope-ism and bunch-plunger mechanisms to which the automatic stop mechanism is attached, and also showing a portion of the banding mechanism. Fig. 109 is a side elevation of the automatic stop mechanism as seen at the right hand in Fig. 3 and drawn in projection with Fig. 108. Fig. 110 is a rear elevation of a portion of the automatic stop mechanism as seen at the left hand in Fig. 109 and drawn in projection therewith. Figs. 111, 112, and 113 are views illustrating the construction and operation of the stop mechanism. Fig. 114 is a plan view of the banding mechanism, showing the bunch-trough with a bunch of finished envelopes as delivered thereto by the bunch-plunger. Fig. 115 is a side elevation of the banding mechanism drawn in projection with Fig. 114. Fig. 116 is a plan view of the frame-work of the banding mechanism. Fig. 117 is a side elevation of said frame-work drawn in projection with Fig. 116. Fig. 118, Sheet 38, is a rear elevation of the band-feed apparatus and shears and also shows a portion of the band-carrier. Fig. 119 is a side elevation of the band-feed apparatus and shears as seen from the right hand in Fig. 118. Fig. 120 is a vertical section of the band-feed apparatus and shears, showing a coil of band-tube, also a band cut off by the shears and about to be taken up on the band-carrier. Fig. 121 shows the construction of the rolls in that part designated as the "band-shuttle." Fig. 122 is an edge view of the band-shuttle, and Fig. 123 a plan view of the same. Fig. 124, Sheet 29, shows one of the end-fold cams in three views. Fig. 125 is a vertical section of the banding mechanism, taken on line $y$ $y$ in Figs. 114 and 130, and illustrates the construction and operation of the band-feed rolls and bunch-pushing apparatus. Fig. 125ª is a detail view of the banding cam-shaft sleeve. Fig. 126 shows a rear side elevation of the band-carrier and apparatus for operating it. Fig. 127 is a side elevation of the band-carrier apparatus as seen from the right hand in Fig. 126. Fig. 128 is a horizontal section of the band-carrier, taken on the line $z$ $z$ in Fig. 127, as seen from above and drawn to a larger scale. Fig. 129 is a horizontal section of the band-carrier apparatus, taken on line $x$ $x$, as seen from above in Fig. 127. Fig. 130 is a plan view of the apparatus for driving the banding mechanism, in which view some of the parts are shown broken away the better to illustrate the construction and operation of the same. Portions of the main frame and first rock-shaft are also shown. Fig. 131 is a side elevation of the parts shown in Fig. 130, and also shows a portion of the main bed in section. Fig. 132 is a diagram or "time-chart" of cam movements, showing the relative positions and times of the movements of the several cams and eccentrics therein named. Fig. 133 is a diagrammatic view of the picker-lifting cam. Fig. 134 is a diagram of the movements of the pickers as they pass from station to station in their circuit. Figs. 135, 136, 137, and 138 are views illustrating the operation of the picker mechanism.

Similar characters designate like parts in all the figures.

The envelope-machine herein described is as to its organization and its principal combinations an improvement on the envelope-machine described and claimed in Letters Patent of the United States No. 340,244, granted to me April 20, 1886. In that prior patent the envelope-machine shown and described was organized to carry the blanks endwise along their line of movement, whereas according to my present invention the blanks are carried sidewise of said line of movement.

The blank-carrying pickers in my present improvement are not set circumferentially of the picker-circuit, as in said prior patent, but are "outreaching," being set in pairs which radiate from the picker-shaft and are arranged to pass between the blank-creaser dies.

According to this improvement the blank-folder turret is not set with its axis tangential to the picker-circuit, but is set radial thereto, being geared directly to the picker-turret shaft, as hereinafter more fully set forth. These essential differences of organization extend to and affect all of the principal combinations, which otherwise may be considered as related to the corresponding combinations set forth in said prior Letters Patent.

The said improved organization herein set forth has important practical advantages and carries out the manufacture of the envelopes by more certain and effective methods.

The frame-work of my improved envelope-making machine comprises a main frame or bed and its accessories and details and several smaller frame-work elements carried thereon or thereby, and it may properly be said that each mechanism of the machine has its own frame or bed especially adapted therefor and which constitutes a part of the general frame-work of the machine. Owing to the high speed of the machine (it making about one hundred and fifty completed envelopes per minute) and the desirability of protecting from dust and thoroughly lubricating the principal cams, I have designed a box-shaped main frame wherein the principal parts of the actuating mechanism are inclosed.

The main frame is designated in a general way by A, and as shown herein (see Figs. 5 and 8) it comprises the bottom plate 2, the front wall 3, rear wall 4, right-hand end wall 5, left-hand end wall 6, and the top plate or table 7. In this bed or frame are formed numerous openings and bearings adapting it to receive the doors, the removable bearings, and several operative details. The front wall 3 has the larger opening 8 covered by the front door 8$^a$, opening 9 in wall 4 for the rear door 9$^a$, opening 10 in wall 5 for the right-hand door 10$^a$, and opening 12 in wall 6 for the left-hand door 12$^a$. The end walls 5 and 6 have the slots or recesses 13 and 14 for the right-hand and left-hand main bearings, respectively, also bearings 15 and 16 for the first rock-shaft 119, and holes 17 and 18 for certain bearings of the stop mechanism. The other features of the main frame will be referred to when describing the parts for which such features are provided.

The several doors or covers above specified are or may be secured in place by hinges and catches in the well-known manner now commonly adopted for similar purposes in other classes of machines.

The bottom plate 2 is depressed in the middle part thereof to form a basin or reservoir to collect the oil for lubrication, of which a considerable quantity ordinarily lies on said plate. Extending around the base of the frame A, I usually form a base-flange 2$^a$ for supporting the machine and surround this flange with a rim or guard 2$^b$ for catching any oil dripping from the bearings and other openings in the walls of the main frame or which may run down from the parts above the bed A.

On the table or top plate 7 of bed A the column B is set, and is securely fixed in place by bolts through the holes 4$^a$, Figs. 9 and 11, in the flanges 51 and 52, which extend along the sides and at the base of said column. The column B is formed hollow, having the front wall 49, rear face 50, and right-hand and left-hand side walls 53 and 54. It also has a number of holes, bearings, and seats for receiving or carrying various details of the mechanisms. The front face 49 of column B is recessed to form a guide for receiving the frame (or bracket) carrying the mechanism or devices for operating the upper creasing-die. The rear side of column B (designated by 50) is open except at the top. The right-hand side wall 53 and left-hand side wall 54 are brought together about the middle of the column and formed into a recessed vertical bearing 59, guiding the printing-slide. The holes 55 and 56 in the top and bottom, respectively, of column B support bearings for the picker-cam shaft.

62 and 63 designate the recesses for the inking-cams.

The other parts of column B are described in connection with the several mechanisms that are attached thereto.

*Concerning the organization.*—The organization of this machine is such and the inter-relation of the several mechanisms is so intimate that it is not practicable to attempt a strictly consecutive description thereof in the order in which the several operations are performed, for in the description of one mechanism it sometimes happens that reference is necessarily made to other mechanisms not then described, so that the reader must resort in such cases to the paragraphs in which such other mechanisms are described. Furthermore, the division herein assumed of the machine into separate mechanisms is largely arbitrary and a matter of convenience since many of the combinations set forth and claimed are comprised in more than one mechanism, as these are herein described. These points being now understood, I will proceed to a detailed description of the machine, beginning with those parts which, for convenience, I denominate

*The driving mechanism.*—The main cam-shaft (designated by numeral 70) is shown best in Fig. 13. It is supported in bushings 45 and 46, which bushings are secured in the main cam-shaft bearings 47 and 48. These bearings are fitted into the recesses 13 and 14 in the bed A and secured by screws and dowel-pins in the usual manner. This construction allows these bearings, together with the main cam-shaft and all the cams thereon, to be removed by drawing the bearings forward out of openings 13 14 without separating or disarranging these parts relative to each other. The driving-pulley 72, Figs. 13 and 64, is fitted to rotate freely on the main cam-shaft 70. The inside of the rim of driving-pulley 72 (designated by numeral 73) is turned to fit the friction-cone 74. The hub 75 of cone 74 is shaped to serve as a pulley from which to drive the inking mechanism. By this hub the friction-cone 74 is secured to the main cam-shaft 70 by means of the key 77 and the adjusting-nut 76, which nut is fitted on said shaft for adjusting the friction-cone 74, so as to properly engage with the conical rim 73 of driving-pulley 72 when the machine is in operation. Said pulley 72 is thrown into engagement with said cone 74 by means of the dogs 80 and 81, which are supported on pivots 82 and 83, that have their bearings in the arms of said pulley 72 and take their fulcrum against the outer nut 84 (of the pair of nuts 84 and 85) on shaft 70. They are operated by the usual cam or cone 86, which is free to revolve on the bushing 45 and is moved by pins in the ends of arms 88 and 89, Figs. 64 and 65, which arms are attached to and form a part of the shipper-shaft 87, that is supported in bearings 90 and 91 on bed A and is operated by means of the shipper levers or handles 92 and 93. The arm 94 on shipper-handle 93 is operated by the automatic stop mechanism. Springs 78, acting against the collar 79, are usually provided to force apart the pulley 72 and said rim or cone 74 in a well-known manner. The cams and eccentrics on main cam-shaft 70 are shown in Figs. 13, 14, 19, and 67. The first rock-shaft eccentric 101 is secured to the main cam-shaft 70 by means of a clamp-screw through its slotted hub (not shown) or in any other ordinary manner, and on this eccentric the strap 131 is fitted to freely turn. A stud 132 is fixed in the projecting arm 134 (of the sleeve 133) on the first rock-shaft and fits into a hole in the end of eccentric-strap 131, thereby imparting an oscillating motion to the first rock-shaft when the main cam-shaft 70 is rotated. The printing-cam 102 is secured to the main cam-shaft 70 and operates the printing apparatus. The picker-turret cam C is part of a mechanism for converting motion, (shown in United States Patent No. 297,165, granted to me April 22, 1884,) and, as described in said prior patent, consists of two faces or roller-tracks 136 and 137, forming the opposite edges of a wide concaved rib extending through somewhat more than three hundred and sixty degrees, which rib for a part of its length, preferably at each end, is concentric with the main shaft 70, and which for the remaining part of its length is of a spiral form, connecting said end portions, substantially as shown. This cam is secured to said shaft 70 by an ordinary key (not shown) and set-screw 103 or in any other suitable and well-known manner. The turret and rolls on which the cam C operates are considered to be parts of the picker mechanism and will be described in connection therewith. The creaser-eccentric 104 operates the creasing apparatus. The packing-plate eccentric 105 operates the packing-plate double cam. The seal-fold cam is designated by 106 and the seal-fold-carrier cam by 107. These two cams are shown formed together. Cam 108 is for operating the inking-roller. Cam 109 operates the placer-slide, 110 the back-fold lever, and 111 the bunch-plunger. The direction of the rotation of the respective cams is shown by the arrows in Fig. 14, their relative positions on shaft 70 being indicated by their position relative to the lines $a$ $b$ $a$ $b$. The numeral 112 designates the hand-wheel, which is securely clamped onto the left-hand end of the cam-shaft 70 in the usual manner. 113 designates a nut and 114 a jam-nut on said shaft. The first rock-shaft (designated by the numeral 119) is best shown in Fig. 13. Said shaft is supported in the bearings 120 and 122. These bearings are fitted in the holes 15 and 16, respectively, formed in the walls 5 and 6 of the main bed A. The numeral 121 designates a flange formed on the bearing 120, a similar flange 123 being formed on the bearing 122. The rocker-arm sleeve 133 is secured to shaft 119 by a pin in the usual manner. The arm 134 is usually formed, as shown, integral with said sleeve, as also the segment 135, which operates the picker-cam shaft 241. Shaft 119 also carries the second rock-shaft-driving arm 140, the envelope-placer arm 143, and the envelope-plunger cam 148.

*The picker mechanism.*—This mechanism is carried by the column B, which is provided with a lower bearing 185 (which is fitted at $185^a$, Fig. 20, to be driven into the hole 56 in the lower end of column B) and the upper bearing 184 for the tubular shaft 186, which I designate the "turret-shaft." This shaft passes through the hole 19 in the top plate 7 of the bed A, and at its lower end carries the roll-turret D, provided with a series of arms or rolls engaging with and driven by cam C for imparting an intermittent rotary motion to said shaft and to the picker-turret 210, carried on the upper end thereof. Said turret D is secured to shaft 186 by holding-screw 187 and a clamp-screw at 188. (See Figs. 19 and 20.) Turret D has a series of hubs, four in number, as shown, which are designated as 189, $189^a$, $189^b$, and $189^c$, respectively, and are bored to receive the cam-roll stems 190, $190^a$, $190^b$, and $190^c$, which carry the rollers 191, $191^a$, $191^b$, and $191^c$. Said stems are preferably held in place by clamping them in the hubs by screws 192, $192^a$, $192^b$, and $192^c$, the hubs being cut open on one side, as shown, for that purpose. The lower end of turret D is bored larger than the shaft 186 and is threaded to receive the tubular adjusting-screw 193. The point of this screw is tapered, as at 194, Fig. 20, to form a circular wedge for pushing out the stems, the inner ends of which are preferably correspondingly beveled or tapered, as at 195, to secure a better bearing-surface. A check-nut 196 is usually provided to securely hold in place the screw 193. When it is required to spread out or enlarge the circle of the cam-rolls to a greater diameter for adjusting the bearing-pressure of said rolls on the driving-cam C, it is only necessary to loosen nut 196 (and perhaps screws 192, if these are very tightly screwed up) and to then screw up the wedge 193, as the particular case may demand. To set in the rollers, the reverse operation is performed. Wedge 193 being screwed down, the said stems are then driven in against it and again clamped, as before. The tubular wedge 193 may be threaded on the inside and fit a corresponding thread on shaft 186, if this modification shall be for any reason preferable to that shown in the drawings, and it should be understood that the other details are also capable of modification in various ways and degrees after the manner of machines in general within the scope and limits of my invention.

By the term "picker-turret," when speaking of the mechanisms in general, I allude to the entire upper portion of the picker mechanism which is shown in Figs. 24 and 25; but in considering this mechanism in detail I designate the disk or frame 210 as the "picker-turret," it being the turret proper, which serves as a frame or base for carrying the operative details. This turret 210 is secured to shaft 186 by a holding set-screw 211 and carries the picker-frames 212, into which are fitted to slide vertically the hollow stems or picker-spindles 213. The turret 210 has formed therein the recesses 232, into which are firmly fitted the picker-frames 212, said frames being made fast therein by the holding-screws 233. (See Fig. 26.) The spindles 213 have formed on their lower end the plates or feet 214, to which are adjustably secured the outreaching picker-arms 219 and $219^a$. (See Fig. 32.) Said spindles 213 have the guide-arms 215 secured thereto by pins 216. Spindles 213 are pushed down by springs 209, the tension of these springs being adjusted from above by the adjusting-screws 208, threaded into the screw-caps 207 and secured by check-nuts 206. The screws 208 bear on the follower-plugs 205, and the spindles are lifted up by the lifting-cam 240. This cam acts on the cam-rolls 217, affixed to the guide-arms 215 in any convenient way—as, for instance, by means of studs 218, fixed in the ears $215^a$ of said guide-arms. Each of the picker-arms 219 has on its inner end a stud 220, (see Fig. 23,) which studs pass through holes 221, formed in the feet 214 of the spindles 213, and the nuts 222 and washers 223 serve to hold the picker-arms in their proper position. The shaft 241 has at its upper end a sleeve 242, over which is loosely fitted the guide-sleeve 243, which, together with the caps 244, secured thereto by screws 245, form guides, in which the inner end of the guide-arms are fitted to slide vertically. (See Figs. 24 and 27.) The said sleeve and guides are held in place on shaft 241 by nut 246 and washer 247. The picker-arms 219 may be considered in pairs, the seal-arms being designated by 219 and the back arms by $219^a$. A series of picker-face studs 226 are fitted to slide vertically in the picker-arms 219. The lower ends of said studs 226 are inserted in the picker-faces 227 and $227^a$, as shown in Figs. 21 and 22, the said faces being constructed of vulcanized rubber. The lower portion, shown by the finer shading and designated by 234, (see Figs. 21 and 22,) is of a softer constituency than the rest, the proper degree of hardness being ascertained by trial. The seal picker-plates 228 and the back picker-plates $228^a$ are secured to said faces 227 and $227^a$ to stiffen the same. The studs 226 are provided with the springs 229 and with stop-pins 230 to limit their movement in the picker-arms. The picker-cam shaft 241 and cam 240 (secured thereto by key 248) have a rotary reciprocating movement imparted to them by means of the following devices: Fixed on the lower end of said shaft is the bevel-gear 250, which is secured thereto by key 251, washer 252, and nut 253 or other equivalent well-known means. Said gear meshes with a segment 135, which is fixed on rock-shaft 119. This shaft 119 is actuated, as shown in Figs. 13 and 67, by the eccentric 101 through rod 131, connecting to arm 134 of the hub 133 of said gear-segment 135. On shaft 241, between cam 240 and turret 210, I usually place a washer 249 to take up the wear.

In Fig. 133 the picker-cam 240 is shown in perspective the better to exhibit the several portions thereof. In Fig. 134 I have shown the rim of said cam as if broken in two and straightened out and have supposed the picker-spindles 213 to be situated in a straight line alongside thereof, and, as the spindles have the same movement as the rollers 217, I have for the sake of simplicity omitted in this figure the drawing of said spindles, and have shown the rollers designated by their proper numerals, said rollers being considered as symbols of themselves and of the spindles together. In this Fig. 134, I have mapped out the several successive movements of the pickers as these pass around the circuit of the mechanisms, showing five successive positions of the system of pickers, as designated in the column at the left hand of said figure. The operation is as follows: On rotating shaft 186 the rotating mechanism operates, as above described, to impart an intermittent forward motion to the turret, carrying each spindle 213 successively to each station $C'$ $C^2$ $C^3$ $C^4$ $C'$, respectively. At the same time the reciprocating mechanism operates to impart a forward movement to the cam 240 during the same movement of the turret and spindles and a corresponding backward movement to said cam 240 while the turret is at rest. The forward movement of the spindles and the same movement of cam 240 are of similar velocity and extent, so that while moving forward rolls 217 stand at about the same points as $240^a$ $240^b$ $240^c$ $240^d$ on said cam, and thus practically impart no vertical movement to said spindles; but on the return movement of cam 240, which turns back about ninety degrees, each spindle is operated according to the conformation of that portion or division of the cam passing under its roller. In position first are shown the positions of the spindles 213 and the several parts of cam 240 relative to each other and to the stations indicated by $C'$ $C^2$ $C^3$ $C^4$ at the completion of a forward movement of the whole, this being toward the left hand. In position second the cam is represented as in the middle of its return movement toward the right hand, the several spindles standing at different elevations corresponding to the various shapes of the respective portions 241$^a$ 241$^b$ 241$^c$ 241$^d$ of said cam. In position third the return movement of the cam has been completed, the relation of spindles and cam being the same as in position first, except that all the spindles are advanced one station in respect to the cam, but themselves continue to stand at the same stations. In position fourth the cam and spindles are shown advanced through one-half of their forward movement, having all gone forward together without any change in respect to each other. In position fifth this forward movement is completed, the spindles being each advanced to next succeeding station from the place thereof in the first position. The several operations continuing as described, each spindle is brought successively to every station and every spindle successively to each station; but whichever spindle may during one complete movement be at a given station its operation while there is always the same. At each different station the spindles have a different vertical movement.

*The gumming mechanism.*—In the general views, Figs. 1, 2, and 3, this mechanism is designated in the general way by the letter G, and is also termed the "picker-gummer." The frame-work or gum-box bracket 391 is secured to the column B by screws 392, as shown in Fig. 36. (See also Figs. 66 and 67.) Bracket 391 supports the gum-plate bed 396, which is carried by its stem 398, fitting in the hole 396$^a$, Fig. 66, and is held from rotation therein by guide-pin 397. Within the sleeve 398, which is formed tubular for such purpose, the gum-plate driver 399 is contained, which driver is connected to the gum-plate 406 through the medium of the projecting boss or hub 405 and the driver-pin 400. Said hub fits into a recess 404 in the upper surface of the flange of said shaft 399, which shaft is intermittently rotated by the gum-plate-driving gear 410, which is affixed to the lower end thereof, Fig. 38, and is driven by the gear 407 on the hub of gear 816 through the intermediate gears 408 and 409 and the pinion 410, that is secured to the driver 399 by means of a screw 411, a washer 412, and an ordinary key. (Not shown.) The gum-plate 406 is raised to its proper working-point by means of the gum-plate-lifting shaft 431, which has on its inner end the crank-pin 432. This stud engages with the block 433, which is fitted to slide in a slot in the sleeve 398, as shown in Figs. 35, 36, and 40. A handle 434 is provided to turn shaft 431 in its bearing, said shaft being held in place longitudinally by the plug 435 and detent-spring 436, which are held in place by the detent-screw 437. Said shoe 435 bears on the reduced and flattened part 430 of the shaft 431, thus tending to hold the same in proper position. The "gum-box" 441 at its ends rests on the gum-plate bed 396. It is held in place thereon at its inner end by the end strap 401, which strap is secured to bed 396 by screws 402, and has a guide-pin 403 fitting into the notch 442 in said end of the gum-box. At its outer end the gum-box is fastened to said bed by a binding-screw 443, which is operated by handle 444, and whose thread is cut away on one side, as at 443$^a$, the remaining thread being less than one-half of a circle and fitting the half-nut 480, Fig. 41, formed in said outer end of the box. A gum-plate guard 445 is secured to the gum-box by a screw 446, and is constructed to prevent the gum from flowing over the edge of the plate by guiding back thereon any gum that may have already overflowed onto the edge of said plate. The adjustable gum gages or scrapers 447 and 448 are provided for the purpose of regulating the flow of gum through the guarded narrow passages 426 and 427 (see Figs. 36, 40, 41 and 42) onto the gum-plate from the space 440, constituting the gum-box proper. Corresponding passages 428 and 429 are on the opposite sides of the box 441, since the unused gum is carried by the plate into the box again through these unguarded passages. Said gum-gages have tongues 449 and 450, respectively, which are fitted to slide in the inclined grooves 451 and 452, formed in the gum-box, and are held in place by the washers and binding-screws 453. The adjustment of these gages is effected by means of adjusting-screws 454 and 455, which are journaled in bearings 456 and 457, that are formed on said box 441, each screw being furnished with a thumb-nut for turning the same. Posts or guides 481 are fixed in the gum-box 441 for the purpose of supporting the gum-bottle 482, as illustrated in Figs. 36, 37, and 39. Said bottle rests with its outlet in the receptacle or space 483, which communicates by passage 484 with the space 440. Said passage 484 leads in a curved way and downward into space 440, so that the foam formed in the latter space is prevented from working up into the bottle. Within space 483 there is a stop or ledge 485, Figs. 39 and 41, on which rests the mouth 482$^a$ of the bottle neck.

*The end-gummer.*—In the manufacture of envelopes of the "high-pocket" style it is customary to stick one end flap to the other and to use for this purpose an auxiliary gumming apparatus usually designated as an "end-gummer." In my machines this apparatus is a substantially independent fixture designated in the general views by H, and shown more in detail on a larger scale in Figs. 43 to 46, inclusive. The standard 486 stands on the cover F$^2$ of the feed-box F, as shown in Figs. 28 and 29, being secured thereto by screws and washers 488, said screws passing through the foot 487 of the standard. Said standard 486 carries the gum-box 489, which is provided with a dovetail foot or base plate 490, that is fitted under the corresponding part 491 of the standard. The clamp 494, which is removably secured to the standard 486 by the pin 495 and is adjusted by the clamp-screw 496, serves to clamp said gum-box in its proper place on the top of the said standard. The gummer-gage 500 is secured to the gum-box 489 by holding-screws 501 and is adjusted toward and from the roller 515 by the adjusting-screw 502. The posts 507, made fast in the gum-box 489, serve to support the bottle 508 for holding the gum solution, and which rests on a ledge 509, formed in the interior of said box. The ratchet-wheel 513 is provided with a stud or shaft 514, said stud being fitted to turn in its bearings 512 512, formed on the gum-box 489. The gum-roll 515 is removably fixed on said stud 514 by a key or like device, (not shown,) while the nut 516 on said ratchet-shaft serves to hold together the several parts. The ratchet-wheel 513 is actuated by the pawl 517, said pawl being pivoted on a screw 518, fixed in the bracket 545, carried on the slide 546. A spring 519, Fig. 43, serves to hold said pawl in engagement with said ratchet-wheel. The series of gummer-pads 526 are carried in a rotary holder 525, which is carried on the hollow sleeve 528, that has thereon the ratchet-wheel 527. Said ratchet-wheel sleeve is fitted to turn on the stud 529, that is fixed in the slide-bracket 545, as shown in the sectional view, Fig. 46. The ratchet-wheel 527 is actuated by the pawl 530, (similar to pawl 517,) which is carried by the stud 536, which is fixed in a bracket 537, that is adjustably fixed to the standard 486 by a screw and washer 538. A spring 539, connected to the standard 486 by a screw 540, serves to hold pawl 530 in engagement with the ratchet-wheel 527. The slide-bracket 545 is secured to the slide 546 by means of screws 547, and these parts together constitute one element of mechanism and may be made integral, if so desired. Said slide is actuated by the connecting-rod 550, which takes hold of stud 552, secured to the slide by screw 553. The rod has a slot 551 formed in the upper end thereof, and a spring 555 (carried on the hook 556, fixed in the stud or bushing 552, and the pin 557, fixed in the rod 550) serves to normally hold said stud against the bottom end of said slot. The lower end of the connecting-rod 550 is connected by a stud to the arm 558, which is fixed by its hub 559 to the right-hand end of the first rock-shaft 119, as will be seen from Figs. 1, 65, and 130. The mode of operation of this apparatus is as follows: The gum-bottle 508, having been filled with the usual solution of gum, is placed in position, as shown in Fig. 45, between the posts 507 and with the mouth thereof resting on the ledge 509. The gum now flows down, filling the box up to the level of the bottle-mouth. The gum-roll 515 has an intermittent rotary movement imparted thereto by the rock-shaft 119 through the connections above described, including the slide-bracket 545 and pawl 517, which pawl engages with the ratchet-wheel 513. The gage or roll scraper 500 is next adjusted to regulate the amount of gum adhering to the gum-roll, being adjusted by the thumb-screw 502. The gummer-pads 526, being located on the periphery of the wheel 525, are successively brought into working position below the axis of said wheel or holder, and afterward to the upper side thereof, said holder being turned forward on each upward movement thereof, as will be readily understood from Figs. 44, 45, and 46. Fig. 45 shows the slide-bracket in its uppermost position, with one of the gummer-pads taking gum from the gum-roll 515, as indicated by solid lines in the drawings. The dotted lines 525ª show the holder lowered, thus bringing one of said pads to bear on the end flap of the uppermost blank of the pile 303, which pile rests on the plate 270 of the blank-feed mechanism. The ratchet 527 has as many teeth or catches formed thereon as there are gum-pads 526, being six in this case. The pawl 530, being fixed to the standard 486, is stationary and operates on each upward movement of the slide-bracket to turn the holder 525 one-sixth of a revolution, so that on every upward movement of the said bracket one gummer-pad face takes gum from the gum-roll, and on every downward movement thereof another said face delivers gum to the then topmost blank of the pile 303. The spring 555, hereinbefore mentioned, accommodates the operation of this apparatus to the varying height of the said pile of blanks.

The blank-feeding mechanism is shown in a plan view in Fig. 28, and is also termed the "blank-supporter." Fig. 29, drawn in projection thereto, illustrates the operation of the same. Figs. 30 to 34, inclusive, are views showing the construction in detail of this mechanism. Figs. 33 and 34 are sectional views illustrative of the operation of engaging and disengaging the feed-pawls and holding-pawls. F designates the frame-work of this mechanism, which is conveniently made box-shaped, as shown, to contain the intermediate shafts and gearing. Said frame-work F rests on ledge 65 of column B, and is secured to said column by screws 307, as shown in Fig. 32. F² is a top plate, which forms the cover of frame or box F, and to the top of which the usual guides are fixed for holding the blanks in proper position laterally. These guides are four in number, arranged in two pairs, of which one pair is at the front (marked 260 and 260ª) and one at the back, (marked 261 and 261ª.) All of said guides may and usually do have a slight adjustment on the top plate to accommodate slight variations in the blanks, the back guides being held down in the usual manner by screws and washers 316ª, Fig. 28, substantially as shown. Guides 260 are shown supported by brackets 262, as in Fig. 29. The back guides 261 rise directly from their bases 263, but have in this case, as they usually do in practice, an outwardly-projecting arm 264 for holding the separator device. This device consists of an arm or lever 265, pivoted to said arm 264 at 266, and each provided with a separator-finger 267, which may be clamped therein by a screw 268. Springs 269 are provided to produce a slight downward pressure of the fingers onto the pile of blanks, being connected to arms 265 and posts 261. (See Fig. 32.) Spring separator-fingers 308 are secured to the front guides by washers 309 and screws 310 and pass through slots formed in the inner side of said front guides, as shown. 303 designates a pile of envelope-blanks in proper position for the gummer 227 and 227ᵃ, Fig. 24, to take up blanks therefrom, the pile, as shown, being nearly exhausted. 270 is one of the blank-supporting plates, shown in position for holding up pile 303 and near the uppermost point of its vertical travel. 271 is a similar blank-supporting plate, which is shown in position for receiving the pile of blanks 304. These blank-supporting plates are respectively each upheld by a similar set of vertically-movable plate-lifters 272 and 273. Each set of lifters consists of three rods arranged as shown in Figs. 28 and 30. For communicating a simultaneous and equal vertical motion to all the lifters in a set a horizontal rod 274 for lifters 272 and 275 for lifters 273 is provided and arranged to slide in bearings formed in the frame F. Underneath and at right angles to rods 274 and 275 are the revolving shafts 276 and 277 and a fixed shaft 278, carrying a system of gearing intermediate to said rods and lifters. Each rod has thereon rack-teeth 279, which mesh into a gear on shaft 276 and into another on shaft 278. In Fig. 30 a part of rod 274 is broken away the better to show the arrangement of the gearing. Rod 275 meshes into gear 280, which is fixed on shaft 276, and into gear 281, which revolves loosely on shaft 278. Shaft 276 has two gears 282 and 283, each of which meshes into rack-teeth 311 on one of the front lifters 273, (see Fig. 30,) and gear 281 has secured thereto a gear 284, that meshes into similar rack-teeth 312 on the rear lifter 273. Rod 274 meshes into gear 285, (similar to gear 280,) which is loosely fitted on shaft 276 and into gear 286 on shaft 278, which is similar to gear 281. Gear 285 has fixed thereto a gear 287, which meshes into another and similar one 288, fixed on shaft 277. This shaft has two gears 289 and 290 fixed thereon, each of which meshes into rack-teeth in one of the front lifters 272, and gear 286 has another 291, (similar to 284,) which meshes into rack-teeth 314 on the rear lifter 272. The relative proportions of the members of these systems of gearing are such that when either of the rods 274 and 275 is drawn forward the set of lifters connected thereto will all be raised up equally. It is desirable, also, that said rods shall move somewhat faster than the lifters, so that the operator can control the elevation of the pile with greater ease and accuracy. The rear lifters 272 and 273 have horizontal arms 315, the ends of which are fitted to slide vertically in slots in the upright guide-post 316, which is secured to plate F² by screws, as shown. The rods 274 and 275 have ratchet-teeth 292 on their upper sides, whereby they are automatically fed forward. For this purpose a rock-shaft 293, carried on a bracket 294 and having arms 295, is provided with feeding-pawls 296 and with holding-pawls 297, which operate in the usual manner. Said shaft has an oscillating motion imparted thereto through connecting-rod 298 and arm 299 from some suitable member (as the picker-spindle) of the envelope-machine. The extent of said motion should be sufficient to move pawl 296 through the distance of one of the teeth 292 and a little in excess to insure certainty of action. The rods 274 and 275 are each provided with a handle 300, whereby they may be operated by hand. Said rods have been described as having a horizontal sliding movement; but they may also have, and as herein shown do have, a rotary motion of about ninety degrees for the purpose of disengaging the pawls from the notches 292, handle 300 being then in the position shown in Fig. 34. In order that said rotary motion may not also disengage said rods and the gears 280 and 285, the rack-teeth 279 are made to extend around these rods about one-half of their circumference, as shown in the section of rod 274, Figs. 33 and 34. By turning rod 274 from the position shown in Fig. 33 to the position shown in Fig. 34 teeth 292 are turned down to one side and surface 301 brought under the feeding and holding pawls. Then said rod may be moved by hand forward or backward at any point of its stroke and thrown into engagement with the pawls by simply turning it back to its original position—that is, with handle 300 hanging down, as in Figs. 31 and 33. The "connecting-rod" 298 is shown constructed to serve the special purpose of automatically feeding the blanks up to a given height only. To this end said rod has a hook 317 at its upper end for engaging with a corresponding hook 231 on one (or more) of the picker-spindles 213. The rod 298 is made laterally movable at its upper end, being carried in a bearing 318 on column B and normally held out by a spring and plug 319, Fig. 32. The particular construction and arrangement of these parts are such that when the picker-hook 231 descends below a given point, as line *a e*, Fig. 29, it will catch the hook 317 of rod 298 and draw up the same, thus actuating shaft 293 and causing the blank-plate to be elevated; but if the picker-hook does not descend to said line *a e* then the hooked-shaped end 317 of rod 298 is simply pressed toward one side, and thus fails to act until the removal of blanks from the pile 303 shall permit of such engagement and action as aforesaid. The blank-supporting plates 270 and 271 may have any shape to adapt them for being upheld by the lifters and for holding the pile of blanks, said shape depending somewhat, of course, on the shape of the blanks they are to hold. In Fig. 28, 270 designates a plate of convenient form, having fingers 302 for supporting the end flaps 305. Suitable springs (not shown) are or may be in practice fixed to the under side of the plates to engage with the lifter-rods, and thus to hold the plates with some little force in their proper position on the top of said lifters. The operation of this blank-feeding mechanism is as follows: One of the blank-supporting plates, as 270, is placed in position 271 on the lifters 272, which then stand down. A pile of blanks, as 303, is then placed on plate 270, and the plate, with said pile on it, is lifted up until the top of said pile is at the point shown in Fig. 29. The envelope-machine being now started up, the blanks are taken one by one from the pile, the plate being fed up in the meantime by means of the mechanism above described. While this is going on the operator places plate 271 in position on the lifters 273 and places a pile of blanks 304 on said plate. Rod 275 is now drawn forward, lifting plate 271 until pile 304 reaches plate 270, when said plate 270 is pulled out, letting the remainder of pile 303 rest on pile 304. Rod 274 is then turned to disengage the pawls 296 and 297 and is slid back, thus lowering the lifters 272, when plate 270 is again placed on them and another pile of blanks on that, to be fed up as before. In this way the machine may be run continuously, the blanks being fed at convenient intervals.

*The blank-creasing mechanism.*—The frame or upright 566 for carrying the creaser-slide is fitted to the front wall 49 of the column B in a usual manner, being secured thereto by the holding-screws 565. (See Figs. 1, 2, 4, 66, and 67.) The creaser-frame is formed to overreach from the front toward the center of the machine, substantially as shown, so as to provide a space between the creasing-dies for the passage of the outreaching pickers, which, according to my present invention, pass sidewise between the creasing-dies, while the upper creasing-die is raised, as will be more fully understood by the following more detailed description. Said upright 566 has formed thereon the guides 564, to which is fitted the creaser-slide 595, which has a vertical movement imparted to it by the creaser-eccentric 104 on the main cam-shaft 70 through the several arms and connecting-rods hereinafter described. Slide 595 has an adjusting bracket or block 581, which is adjusted by screw 584. A holding-screw 582 and washer 583 serve to hold said bracket in place. The angle-lever or rocker-arm 576 is pivoted in the creaser-upright 566 by pin 577. The creaser-arm link 578 connects the adjusting-bracket 581 and said arm 576, being furnished with the pivot-pins 579 and 580 for that purpose. The creaser-connecting rod 573 is pivoted to arm 576 by pin 575 and to the inside creaser-arm 568 by pin 574. The creaser-arm 568 is clamped onto the creaser-arm shaft 571 by a clamp-screw 570, and may also be keyed thereto, since in practice this fastening should be securely made. The lower end of the angle-lever 576, which end is pivoted at 579 to the link 578, constitutes one part of the slide-actuating toggle, which on the downward movement of the slide gives the necessary dwell to the upper creasing-die while the printing (as hereinafter described) is being performed. The angle-lever 576 is itself actuated through a second toggle comprising the rocker-arm 568 and the connecting-rod 573, the two toggles described working in opposition, by which is meant that when the aforesaid slide-actuating toggle is brought into line the second toggle is carried out of line, and vice versa, thus causing a distinct dwell at each end of the slide movement, the dwell at the bottom being utilized for printing, as aforesaid, while that at the top has the effect, in practice, of shortening the required slide-stroke. There is also another advantage of the system of toggle-connections described, since there is a peculiar acceleration of the slide movement co-operating favorably with the picker movements. Shaft 571 also carries the outside creaser-arm 567, whereby this shaft is actuated, said arm being clamped thereto by clamp-screw 569 and connected to eccentric-rod 560 by pin 572. The eccentric-rod 560 passes through the hole or slot 22, formed in the top plate 7 of the main bed A, and has at its lower end the creaser eccentric-strap 561, which is fitted to the creaser-eccentric 104 on the main cam-shaft 70. The creaser-die base or bed 613 rests at its inner end on the column B and at its outer end on the frame 566, it being held in place thereon by screws (not shown) which pass through the holes 614, Fig. 47, in said bed 613. The creaser-slide 595 has formed in the lower end thereof the dovetail groove 596 to receive the dovetail 596ª, formed on the creaser-blade holder 605, said holder having the creaser-blades 606 secured thereto by the screws 607. The inside lower edges of the said creaser-blades 606 are beveled and the outside of the same concaved, as best shown in Fig. 48. These blades are preferably constructed of steel and should be well tempered. Said blade-holder 605, together with said blades 606, constitutes the "upper creasing-die." The lower creasing-die consists of the side blocks 615, the end blocks 616, the die-bed 613, and the minor details supporting said blocks on said bed. The blocks 615 and 616 are fitted to turn on the hinge-pins 617 of the hinge plates 618, said hinges being adjustably secured to the creaser-bed 613 by the holding-screws 619. The side blocks 615 have secured thereto the lower side spring-plates 631 and the upper side spring-plates 632 by the screws 635. The end blocks 616 have similarly secured thereto the lower spring-plates 633 and the upper spring-plates 634 by the screws 635ª. The said side and end blocks are yieldingly upheld by the springs 620, their upward movement being limited by stop-surfaces at 620ª, Figs. 48, 51, 53 and 61. The numeral 306, Figs. 51 and 53, designates an envelope-blank being operated upon. The upper and lower spring-plates above referred to are shown on a larger scale in Fig. 61, and the form and construction thereof may be best understood by consulting said view. As shown, the lower spring-plates rest on the side and end blocks and are secured thereto in the manner above described. They consist of the flat portion 630, the angular portion 633ª, and the curved edge 629. The upper spring-plates consist of the flat portion 626, (resting on the portion 630 of the lower plates,) the angular portion 627, and the rounded edge 628. The said plates are in practice made of spring-steel, and, as best shown in Figs. 47 and 48, the edges and angular portions thereof are split or sawed, forming numerous fingers, the cuts of one plate alternating with the cuts of the other plate, so that one finger 636 of an upper plate shall rest on two of the fingers 637 of a lower plate. This construction secures a very perfect operation of the creasing-die, since the narrow fingers 636 and 637 constitute, in effect, independent springs, each bearing against the paper, as in Fig. 61, and thus folding the sheet equally close to the edge of blade 606 throughout the whole length of said blade. The operation of creasing an envelope-blank by means of the above-described mechanism will be understood by referring to Figs. 49 to 53, inclusive. A sheet of paper of proper blank form 306, as shown in Fig. 49, is placed on the lower die, as in Fig. 51, resting on the edge 628. The upper die is then brought down onto the paper, the edges of said die pressing said paper down against the curved portion or edge 629 of the lower spring-plates, as in Fig. 52, and at a little distance from the rounded edge or border 628 of the upper spring-plate. On now continuing the downward motion of said die the edge 629 is carried by the blocks downward and sidewise, as clearly shown in Figs. 53 and 61, closing the edge 628 up against the side of the creaser-blade as it presses the paper into the corner formed by and between the upper and lower spring-plates. This operation being simultaneously performed on the four sides, the blank (shown plain in Fig. 49) is folded up, as shown in Fig. 50, and without tearing or breaking the paper. It will be understood that during this operation the blank is held by its side flaps adhering to the seal and back-flap pickers, respectively, in proper position at the creasing station C³ of the machine. This mechanism is also designated by the term "blank-creaser."

*The printing mechanism.*—This portion of the machine, which is also designated as the "envelope-printer," consists of the upper and lower platens and the means for actuating the same; but the upper platen or "platen proper" is also the block or blade holder 605 of the upper creaser-die, which block is carried on the lower end of the creaser-slide 595, as hereinbefore described. Said slide therefore constitutes an element of two mechanisms, which, however, are herein constructed and arranged for conjoint operation. In practice said platen 605 is furnished on the under side thereof with a suitable blanket 685, Fig. 61, of paper or papier-maché or other material usually used for like purposes by printers. The type to be printed from may be secured in any well-known manner to the platen 676ª of the printing-slide 676. Usually, however, I use to print from an electrotype 683, which is secured in the usual manner, as by nails, (not shown,) to the block 682, that is secured by screws 684 to the removable "form" or chase 680. (See Figs. 54, 55, and 61.) Said chase is held in place on the said platen by screws 681, which pass through the flange 680ᵇ of said platen, as shown in Fig. 63. The printing-slide 676 is fitted for vertical movement in the channel 59, (see Figs. 9, 11, 12, and 54,) formed in the right-hand side of the column B, being held therein by slide-straps 677 and 678, that are secured to said column by the screws 679. Said printing-slide is actuated by the printing-cam 102 on the main cam-shaft 70 through the following intermediate devices: The printing-cam roll 648 is carried on the cam-roll stud 650, said stud being made fast in the arm 649 by the nut 651. Said arm 649 is carried on the printing shaft or stud 652, said shaft being fixed in the hole 39 in the wall 5 of the main bed A. A spring 653 serves to hold said cam-roll normally in contact with the cam 102. Shaft 652 also carries the link-arm 654, which is pivoted on the stud 656, that is fixed in the printing-slide link 655 by means of the nut 657. The said link passes through the hole 20, formed in the top plate 7 of the bed A, the upper end thereof being carried on the printing-slide adjustment-eccentric 665, said eccentric being bored to receive the eccentric-supporting stud 666, which is firmly screwed into the slide 676. The eccentric arm or lever 667 is adjustably secured to the eccentric 665 by the clamp-screw 668, the hub of said arm being split on one side for that purpose. The eccentric-arm 667 has at its upper end the index-pin 669, said pin being provided with the spring 670 and knob 671. (See Fig. 56.) Holes 672 and 673 are formed in the printing-slide 676 to receive the point of the index-pin 669. When the eccentric-arm 667 is thrown over to the right hand and the index-pin 669 is inserted in hole 672, as shown in Figs. 54 and 56, the eccentric 665 is in the position shown by the dotted line in Fig. 54, being locked in said position by said index-pin, and the mechanism is ready to print. If arm 667 is thrown over to the left to the position indicated by the dotted lines in Fig. 54 and the index-pin is inserted in hole 673, the slide 676 is lowered by the eccentric 665 to a position below the printing-point, said eccentric being again locked by said index-pin. By this means the operator may at any time instantly throw down the type-form into an inoperative position.

The operation of the above-described printing mechanism is as follows: An envelope-blank having been carried by the pickers to the proper position between the upper and lower creasing-dies, the upper die is now brought down forcibly onto said blank, thereby holding the blank firmly in place by means of the creasing-blades, as before set forth, and while said die remains on the paper the type 683, being previously inked, is brought up against and prints the blank, as shown in Fig. 61. The operation of the slide 676 is so timed by the proper shaping of the printing-cam 102 that the printing is completed and the type withdrawn from contact with the blank while this is firmly held between the creasing-dies. This feature in practice enables the printing to be performed very rapidly without any displacement of the blank on the pickers.

The envelope-creaser and the envelope-printer together constitute a combined mechanism termed the "envelope printer and creaser."

*The inking mechanism.*—The ink-fountain 686 has its seat at 60 on the column B, being secured thereto by screws 687, and the lower edge of said fountain resting on the ledge 61 of said column. The ink-fountain roll 699 is carried on the ink-fountain-roll shaft 700, said shaft being journaled in the end walls 702 and 703 of the ink-fountain 686. Said shaft 700 has affixed to its outer end the ratchet-wheel 701, through which it is rotated by means of the pawl 706. The ink-fountain gage-plate or roll-scraper 688 is secured to the inclined front wall 704 of said fountain by the holding-screws 689, and is provided with the adjusting-screws 690, the office of said gage-plate being to regulate the quantity of ink carried on said roll 699. The ink-fountain pawl 706 is operated by the ink-fountain pawl-eccentric 707 on the ink-fountain cam-shaft 708. Said shaft also carries the transfer-cams 709 and 710 and the worm-gear 711. The ink-transfer roll 716 is carried on the transfer-roll shaft 717, said shaft having its bearings in the slides 718. These slides are provided with the movable caps 719, springs 720 serving to hold said caps in their proper place and yet allow the transfer-roll 716 to recede under a certain pressure. The springs 721, which bear on the spring-pins 722, fixed in the slides, serve to hold said slides always in contact with the transfer-cams 709 and 710, said cams imparting a vertical movement thereto. When the slides 718 are allowed by the revolving of said cams 709 and 710 to assume their lowest position, being forced down by the springs 721, the transfer-roll 716 is brought in contact with the ink-fountain roll 699, (as shown in dotted lines in Fig. 57,) from which the said transfer-roll receives a coating of ink. When in the course of their revolution the transfer-cams have raised the slides 718 to their uppermost point, the transfer-roll is brought in contact with the cylinder 751, to which it delivers the ink it has received from the ink-fountain roll 699. The stop-pin bosses 723, formed on the ink-fountain 686, form bearings for the stop-pins 724, these pins being provided with the stop-pin springs 725. The holes 726 in the slides 718 are provided to receive the stop-pins 724 when the operator wishes to lock the slides, as in Fig. 58, to prevent the transfer-roll 716 taking ink from the ink-fountain roll 699. Fig. 60 is a fragmentary view showing one of the stop-pins 724 drawn out and one of the slides 718 free to be operated by one of the transfer-cams, assisted by spring 721. As shown in Fig. 60, the stop-pin 724 is provided with the knob 727, which has inserted therein a pin 728. When by means of the knob 727 the stop-pin 724 has been fully drawn out and turned to one side, so that pin 728 shall not re-enter hole 729 in the boss 723, but shall rest on the face of said boss, the stop-pin 724 is prevented from entering hole 726 in slide 718. Said slide is then free to be operated, as aforesaid. The ink-distributer roll 737 is carried on the distributer-roll shaft 738, said shaft being journaled in the vertically-movable shaft-bearings 739, said bearings being provided with the bearing-springs 740. (See Fig. 58, Sheet 17.) The oscillating ink-distributer-roll cam 745 is carried on the supporting screw-stud 746, which passes through the hub of said cam. An arm 747 is formed on said hub, said arm being forked at the end thereof to receive the cam-actuating pin 748, which is fixed in the pawl 706. A grooved cam-roll 736 is made fast to the outer end of the distributer-roll shaft 738. The inclined or spirally-formed working edge or face 745$^a$, Fig. 62, of the cam 745 is fitted to work in the groove of said cam-roll 736. The said face 745$^a$ of cam 745 being at an angle to the axis of the shaft 738, as the cam is oscillated by the pawl 706 through the pin 748 it gives a forward-and-backward movement to the distributer-roll 737, thereby distributing the ink evenly over the surface of the ink-distributing cylinder or roll 751. This operation is strictly analogous to the distribution of ink in ordinary printing-presses, and hence need not herein be further set forth. The ink-distributing cylinder 751 is carried on the distributing-cylinder shaft 752, said shaft being carried in the bearings 753 and 754. Said shaft 752 also carries the spiral gear 755. The ink-fountain vertical shaft 766 passes through the hole 21, formed in the top plate 7 of the bed A, and has an upper bearing 767 and a lower bearing 768. Said shaft has secured thereto at its upper end the spiral gear 769, which meshes with the spiral gear 755, and said shaft also carries the worm 770, that meshes with the worm-gear 711. The vertical shaft 766 has secured thereto at its lower end the miter-gear 773, meshing with the miter-gear 774, carried on the ink-fountain pulley-shaft 775, said shaft 775 being carried in the bushing 776, which in turn has its bearing in the main bed A at 40. (See Fig. 5, Sheet 4.) Shaft 775 is rotated by the ink-fountain pulley 777, which receive its power from the main cam-shaft 70 through the belt 778. (See Fig. 1.) The inking-roll 788 on the inking-roll shaft 789 is carried by the forked inking-roll carrier or lever 790. Said carrier 790 is held in the inking-roll-carrier clamp 795 by means of the clamp-screw 796, said clamp being pivoted at the upper end of the inking arm or lever 798 by the pin 797. The carrier-spring 799 is provided to give a downward pressure to the said carrier. The inking-arm 798, pivoted in the inking-arm bearing 800 by the inking-arm stud 801, passes through the hole 23, formed in the top plate 7 of the main bed A, and has at its lower end the inking-arm cam-roll 802, which is secured to said arm 798 by the cam-roll stud 803. Said cam-roll 802 bears on the inking-roll cam 108 on the main cam-shaft 70, whereby said roll is actuated in proper time. The inking-arm bearing 800 is secured to the top plate 7 of the main bed A. The inking-arm 798 is provided with the pull-spring 804, the opposite end of which is carried by a hook screwed into the column B, as shown in Fig. 57.

Figure 71:
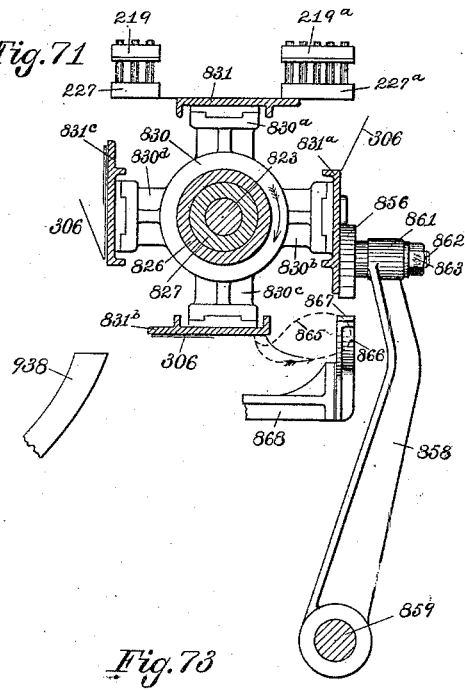
Figure 72:
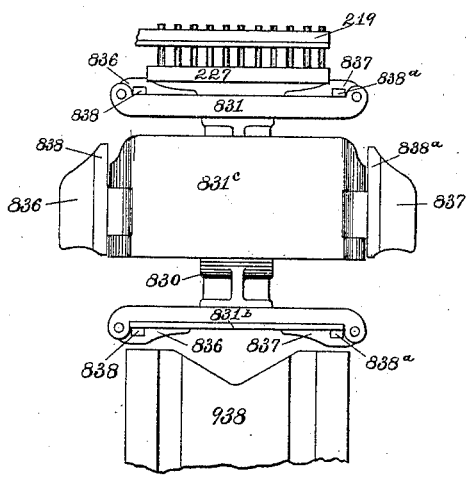
Figure 73:
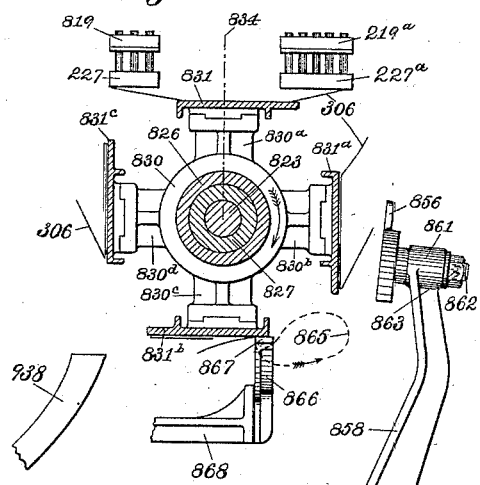
Figure 74:
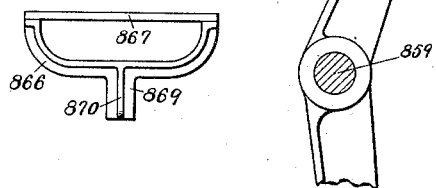

*The folding mechanism.*—This portion of the machine, which is also termed the "envelope-folder" or the "blank-folder," will be best understood by comparison of Figs. 16, 66, 67, and 69 to 73, inclusive. It comprises the "folding-turret" and folding apparatus operating in connection therewith to fold the back flap and the seal-flap. Referring to said figures, (and also in a general way to Figs. 1, 2, and 3,) it will be seen that bearing-sleeve 826, carrying the folding-turret is affixed by its flange 832 to the part 58 of the side wall 54 of column B by screws, (not shown,) its tenon 833 being fitted into the hole 57, Fig. 10, in said column. The turret-shaft 823 is carried in said sleeve, as shown best in Fig. 69, and at its enlarged outer end $823^a$ is connected by pin 828 to the tubular shaft 827, which is carried on the reduced outer end of the fixed turret-supporting sleeve 826, as indicated in Fig. 69, and that carries the "spider" or frame 830 of the folding-turret proper. Said shaft 823 is actuated from shaft 186 by closely-fitted gearing. The driven bevel-gear 824 is keyed fast to the inner end of said shaft 823, being held thereon by a nut 825. It meshes with the corresponding driving-gear 816, which is fitted to slide on shaft 186 and on the key or spline 817 thereof, being held in place in proper mesh with gear 824 by the adjusting-nut 818, which is shown to be a clamp nut or collar held together by clamp-screws, as shown in Fig. 36. By this means, as the teeth of gears 824 and 816 wear away, the gear 816 may be moved upward to bring the said teeth into a firm bearing again, for in practice these gears should run without any play or backlash. Said pair of gears are "skew-bevels," the axis of shaft 823 being about one-half of an inch rearward in the machine of the axis of shaft 186. This arrangement is adopted to permit a better arrangement of the fold-plates 831 on the turret-spider 830, as shown in Figs. 71 and 73, said plates being set forward in their line of movement of a radius 834, Fig. 73, for the purpose of co-acting with the back-flap folder, as hereinafter more fully set forth. The gear 816 on the shaft 186 being below the driven gear 824 on the turret-shaft 823, the movement of the upper side of the turret is made opposite to the movement of the pickers in their circuit. This will be understood by comparison with Figs. 69, 71, and 73, in the latter figures the direction of the folding-turret movement being shown by arrows thereon, while the movement of the pickers in their circuit is toward the left hand in said Figs. 71 and 73. The effect of this organization and combination of the turrets and their connecting-gearing is to fold over the back flap of the envelope (which flap is shown in Figs. 71 and 73 in contact with the picker $227^a$) by the movement of the picker $227^a$ laterally of the folding-plate to the position shown by the line representing said envelope-flap between the folding-plate $831^a$ and the folder 856 in Fig. 73. The fold-turret spider 830 consists of the hub and the four arms referred to as $830^a$, $830^b$, $830^c$, and $830^d$, respectively, each arm carrying one of the series of folding-plates 831, $831^a$, $831^b$, and $831^c$. Each folding-plate has hinged thereto at each end the end-fold wings, right and left (designated by 836 and 837, respectively,) which wings have adjustable shoes—right 838 and left $838^a$—for gaging the "thickness" of the edge of the folded envelope, being adjusted by set-screws 839 and binding-screws 835, Fig. 70, in a well-known manner. The hubs 840 of said wings are bored to receive studs 841, carrying cam-rolls 842, which run in the grooves 845 of the oscillating end-fold cams 843 and 844, respectively, whereby said end wings are actuated. Said cam-roll studs are held in place by the binding-screws $840^a$, which clamp said hubs 840 (which are split on one side thereof) firmly to the stem of said studs. Thickness-collars 846 and 847 separate cams 843 and 844 from the spider 830, the outer cam being held in its proper place on sleeve 827 by a washer 829 and nut $829^a$. The end-fold cams 843 and 844 have a rotary reciprocating movement imparted thereto by connecting-rods 848 and 849, which rods are secured to said cams by means of screws 850, which pass through bushings 851. Said connecting-rods are connected at their lower ends to studs 852, which are fixed in arms 159 on the second rock-shaft 153 by nuts 853. This rocker 153 is actuated from shaft 119 by arm 140, connecting-rod 160, and arm 166 on said second rocker, the arms having pins 162 and 161, respectively, for said rod. The back-folding wing 856 is carried by the arm or lever 858, which is carried on shaft 859. Said arm 858 passes through the hole 24, formed in the top plate 7 of the bed A, and has at its lower end a cam-roll 860, which bears on back-fold cam 110 on main cam-shaft 70, which cam (see Fig. 67) operates to draw forward said folder, (toward the right hand in this figure,) the work of folding the back flap being performed by the spring 857. Said shaft 859 is an eccentric one, carried at its inner end in bearing 66 of column B and at its outer end in the clamp-bearing 67, affixed to bed A by screws 68 and 68ª. By loosening screw 68ª said shaft may be turned to throw the back-fold plate 856 either toward or from the fold-turret. Said plate 856 is adjustably attached to the upper end 861 of arm 858 by a stud 862, which passes through said upper end and is held therein by nut 863. The form and construction of the end-fold cams 843 and 844 will be best understood by reference to Fig. 124. The seal-folder consists of the arm 866, which has secured across its forked ends the folder-bar 867. The movement of this bar is shown by dotted line 865 in Figs. 71 and 73. Arm 866 is adjustably secured to a carrier-arm 868. (See Figs. 67, 71, and 73.) Said carrier has formed thereon an arm 869, to one side of which 870 is fastened one end of a spring 871, the opposite end of which is made fast to the top plate 7 of the bed A. The carrier arm or lever 875 is forked at its upper end and is provided with the shaft 876, (see Fig. 69,) on which shaft and between the said forks of the arm 875 is loosely fitted the seal-fold carrier 868. The arm 875 is carried on the seal-folder eccentric-stud 42, said stud being journaled in the bearing 41, that is formed in the wall 6 of the main bed. The lower part of arm 875 passes through the hole 26, formed in the top plate 7 of the bed A, and carries at its end the cam-roll 877, which bears on the seal-fold carrier-cam 107. The seal-folding arm 878 is also carried on the eccentric 42, and is formed at its upper end 879 to bear on the arm 869 of the carrier 868. The office of spring 871 is to always hold the arm 869 in contact with the said face 879. Arm 878 carries at its lower end the cam-roll 880, bearing on the seal-folding cam 106 on the main cam-shaft 70. The horizontal movement of the seal-folder 866 is derived from the cam 107 through the arm 875 and the vertical movement thereof from the cam 106 through the arm 878, and these two movements are so timed by the corresponding shaping of said cams as to produce the required movement, as set forth, of the seal-fold bar 867 in the path and direction shown by the dotted line 865 and the arrow thereon in Figs. 71 and 73. By this means the seal-flap of the envelope-blank is folded from its position at 306 on the plate 831ª to its position on the plate 831ᶜ in Fig. 73.

*The transfer mechanism.*—The operative parts of this mechanism, which is also termed the "envelope-transferer," are actuated from the second rock shaft 153. The lower transfer-arm 181 has a hub 182, which is fitted onto said rock-shaft 153 and is secured thereto by the pin 183. Arm 181 has secured to its outer end by the screw-stud 934 the transfer-arm connecting-rod 935, Fig. 16, Sheet 7, said rod being connected to the upper transfer-arm 930 by means of the stud 931, Fig. 3, Sheet 3. The arm 930 is adjustably secured to the transfer-shaft 932 by the transfer-arm binding-screw 933, Fig. 3, the hub of said arm being split on one side for that purpose. The shaft 932 has its bearing 393ª, Fig. 36, in the gum-box bracket 391, the sleeve 393 and the base 394 forming a part of said bearing. The upper nipper 886 is pivoted to the hollow sleeve 902 by the upper nipper-stud 887, which passes through the ears 899 on said sleeve 902. The said nipper 886 has secured thereto one end of a spring 888, the other end of said spring being carried by the arm 885, the function of said spring being to hold up the outer end of nipper 886. Said nipper also has formed thereon a stop-arm 884 to limit the upward movement thereof. The lower nipper has at its outer end the hollow stud 892, sometimes provided with the rubber covering 893, (see Fig. 79,) and also has formed integral therewith the sleeve 894, bored to loosely fit on the transfer-finger shaft 919, and also the hub 895, bored to fit the rock-shaft 917, to which it is secured by the pin 896. The transfer finger or pusher 920 is secured to the fixed shaft or stud 919, by means of the pin 918. The transfer-finger 921 is also secured to shaft 919 by a pin 922. The transfer-finger connecting-arm 923, which is formed integral with the finger 921, is pivoted on the stud 925, said stud being fixed in the arm 924 by the nut 926. The arm 924 is loosely connected to the outer end of shaft 932, as to a stud, by means of the screw 927 and the washer 928. Shaft 932 has a rocking movement imparted to it by the second rock-shaft 153 through the connections hereinbefore described. The transfer adjustable arm 889 is adjustably clamped to the shaft 932 by the clamp-screw 890, the hub of said arm being split to permit of this. The arm 900, formed on the sleeve 902, is adjustably secured to arm 889 by means of the screws and washers 901, said screws passing through slots (indicated by dotted lines 901ª in Figs. 75 and 76) in said arm 900 and being screwed firmly into arm 889. The sleeve 902 is bored to receive the rock-shaft 917, which is fitted to turn freely in said sleeve. The arm 911 is secured to the inner end of said shaft by a pin 911ª in the usual manner, said arm having a stud 916 secured to its outer end by the nut 916ª, said stud carrying one end of the transfer-finger connecting-rod 903. The transfer friction-clamp 904 is in two parts hinged together on the stud 905, said stud being provided with the nut 906. The friction-clamp 904 is provided with the friction-leathers 907, which bear on the outer surface of the sleeve 393. The clamp-screw 908, the spring 909, and the check-nut 910 are provided for regulating the pressure of said friction. The clamp furnished with the leathers, as set forth, is fitted to the reduced part 393$^b$ of the said sleeve 393. The rocking movement of shaft 917 is imparted thereto by the shaft 932 through the clamp 904, the connecting-rod 903, and rock-shaft arm 911, pinned to said rock-shaft 917. The stop 912, secured to the arm 900 by the holding-screws 913 and provided with the stop-screw 914 and the stop-screw check-nut 915, serves to limit the rocking movement of the rock-shaft 917 in its bearing 902. When the arm 889 and the nipper 886 are carried up, as in Fig. 77, the said connections revolve shaft 917 in its said bearing to throw down the nipper 891 and draw back the fingers 920 and 921, as there shown. At this time the folding-plate 831 has brought an envelope 306 in position above the trough 938 ready to be taken hold of by said nippers and deposited in said trough. Next the reverse movement of said shaft 932 operates to close said nippers or gripper-fingers 886 and 891 onto the envelope, as in Fig. 76, and firmly grip the same. Continuing its motion the arm 889 carries the closed nippers down to the position shown in Fig. 78. At this point the envelope is brought to position $r$, while the preceding one is pushed along by the fingers 920 921 to the position $p$ between the fingers of the carrier, as in Fig. 78. The transfer-trough 938 is supported on a base 939, that is securely fastened in place on top of the framework of the machine by means of ordinary screws. (Not shown.) Said trough 938 is made fast to said base by screws (not shown) and is provided with the trough-caps 943 and 944, which are secured to the edges of said trough by the cap-screws 945. The said caps have formed thereon ears to receive the pivot-pins 947, 947$^a$, 947$^b$, and 947$^c$, carrying the detent latches or pawls 946, 946$^a$, 946$^b$, and 946$^c$, respectively. The pawl-springs 948, 948$^a$, 948$^b$, and 948$^c$ are provided to lightly hold down said pawls, said springs being secured to the caps 943 and 944 by the holding-screws 949. Said pawls are arranged in pairs, the two designated by the numerals 946 and 946$^a$ comprising the first pair and the two designated 946$^b$ and 946$^c$ the second pair. In Figs. 76 and 77 the numeral 831 designates one of the folding-plates of the folding-turret, and 306 designates a folded envelope thereon. When in the operation of the machine, as aforesaid, the nippers 886 and 891 have grasped the envelope 306 by the seal-flap, as shown in Fig. 76, (said envelopes being still carried on the folding-plate 831 and held in place thereon by the end-fold wings,) as the end-fold wings release said envelope 306 the nippers transfer it to the position $r$, (shown in Fig. 78 below the detent-pawls 946 and 946$^a$,) the envelope being still in the grasp of the nippers. The nippers now release the envelope and return to the position shown in Fig. 77, ready to grasp another envelope. The first pair of pawls serve to prevent the return of the envelope should it happen to adhere to the nippers in any way. The nippers now take another envelope and, as before, carry it to the transfer-trough. The transfer-fingers 920 and 921 at the same time push the first envelope beyond the second pair of pawls (whose office is the same as that of the first pair) and into the endless carrier, allowing it to rest on one of the carrier-fingers 956, as shown in Figs. 78 and 80. The grooves 937 are formed in the trough 938 to provide for the free passage of the transfer-fingers 920 and 921 as these project below the envelope, as illustrated in Figs. 76 and 78.

*The endless carrier.*—This element of the machine, which is also termed the "envelope-carrier," consists in an endless belt or apron 955, provided with fingers for holding the envelopes. Said fingers 956 are formed or fixed on the finger-base 957, which is provided with the envelope-stops 958, that overlap the bases of the adjacent fingers, as shown in Figs. 82 and 83. The driving-bar 959, having the teeth 960 and the driver-pins 961 formed thereon, is secured to the base 957 by screws 962. This clamps the endless belt 955 firmly between said parts, the teeth or pins 960 being firmly embedded in the substance of the belt. The envelope-blanks, having, one by one, in rapid succession, been gummed, creased, printed, and folded, are taken by the transfer mechanism from the folding-turret and carried to the transfer-trough as completed envelopes. From the said trough they are delivered to the endless carrier at the position $p$, Fig. 78. From this point the envelopes pass upward and come down on the rear side of the carrier, pass between the guides 982 and 983, and forward of the rear guide 981 until they reach the position $q$, Fig. 86, where they stand on the envelope-way 985 at the entrance to the packing-box. The said carrier, which is of sufficient length to allow the gum and the printing-ink to thoroughly dry, is driven by an apparatus hereinafter described, and is supported or suspended by a pulley that is placed above the machine. Said pulley may be supported by a shaft carried in hangers depending from the ceiling of the room in a well-known manner, which shaft should be arranged in practice to be vertically adjustable for the purpose of taking up the stretch of the belt 955 as this becomes lengthened by long use. At its lower end said carrier passes under the driving gear or sleeve 966, which has the driving-teeth 964 for engaging with the driving-pins 961, and is carried on a fixed shaft or stud 965, that is supported by the bearing 1095, formed on the packing-box frame 1072, said shaft being held in place by a set-screw 1097$^a$ or by other suitable means. The driving-gear ratchet 967 is securely clamped to the sleeve 966 by means of the clamp-screw 968, the hub of said ratchet being split on one side for that purpose. In practice it is found desirable to control the movement of the sleeve 966 by a frictional resistance, for which purpose I clamp said sleeve between the leather friction-washer 972, fitted onto the stud 965, against the bearing 1095, and a similar washer 971, that is fitted onto the said stud 965, between the hub of the ratchet 967 and the friction-collar 973. A sheet-metal spring-washer 974 between said collar and the check-nuts 975 and 976 furnishes additional elasticity, while said nuts provide for adjustment of the pressure to produce the required amount of friction. The friction-collar 973 is recessed, as shown by the dotted line 970 in Fig. 80, to allow the washer 974 to spring under the pressure of the nut 975. The carrier driving-sleeve 966 is driven by the end-fold rocker 167 through the driving-pawl 977, which engages with the ratchet 967, being held thereon by gravity. The said pawl is carried by the stud 978, which is fixed in the ear 979, formed on the arm 159 of said rocker 167, this rocker being carried on the second rock-shaft 153. The operation of said carrier-driving apparatus will be readily understood without further description, the pawl having a simple reciprocating movement and acting in a well-known manner.

*Placing and counting mechanism.*—This mechanism comprises two parts, which are also designated, respectively, as the "envelope-placer" and the "envelope-counter." A few details of this mechanism are carried by the bracket 1042, which is fitted on and secured to the shelf 27, that is formed on the rear side of the top plate 7 of the main bed A; but the greater portion of said mechanism is carried by the packing-box bed-plate 1070, which is fully shown in Figs. 85$^b$, 85$^c$, and 85$^d$, and is secured on the main bed A, adjoining the aforesaid part 1042. The envelope-plunger slide 1035 is carried by said bracket 1042, being fitted to move between suitable ways or guides thereon. As herein shown, these ways comprise the upper guide 1043 and the lower guide 1044, said guides being fixed to the bracket by screws, as shown. The envelope-plunger 1025 is pivoted to the slide 1035 by the screw-stud 1026. Said plunger has two stops—the upper stop 1027, which is formed on the slide 1035, and the lower stop 1028, which is secured to the slide 1035 by the screw 1029. (See Fig. 84.) The plunger 1025, for the purpose of cushioning the same, is provided with the leather strap or buffer 1030, which is secured by screws, as shown, on the projecting end or stop-arm 1031 of said plunger 1025. The slide 1035 is usually provided with a friction device consisting of the cap 1036, the leather 1037, the screw 1038, and the spring 1039. By turning the screw the tension of the spring may be adjusted for regulating the pressure of the clamp and leather on the lower guide 1044, and thus control the resistance of the friction device to the slide movement. The purpose of that resistance is to furnish a means for operating the envelope-plunger on its pivot 1026. The envelope-plunger arm 1049 is carried on the envelope-plunger shaft 1050, which turns in the bearing 30, Fig. 85, in the rear wall 4 of the main bed A and in a second bearing 31, formed on the wall 6 of said bed A. Said shaft 1050 is actuated forwardly by a spring 1057, which is connected by a pin 1056 to the arm 1055, that is secured by the pin 1052 to said shaft. The opposite end of said envelope-plunger spring is connected to a pin 1058, fixed in the rear wall 4 of the bed A. The envelope-plunger 1025 is operated backwardly by the cam 148 on the first rock-shaft, which cam acts through the roll 1048, which is carried on a stud 1047, fixed in an arm 1046, that is fixed by its hub and clamp-screw 1045 to shaft 1050 adjacent to bearing 31. The face of said cam 148 is shaped to impart to said plunger the proper movement. The cam 148 is secured to shaft 119 by its hub 149 and the clamp-screw 150. (See Figs. 84 and 85.) The envelope-plunger arm 1049 is adjustably secured to the outer end of the shaft 1050 by means of the clamp-screws 1049$^a$ and is pivotally connected at its upper end to the envelope-plunger 1025 by means of the stud 1053, fixed in said arm by the nut 1054, and works in the slot 1034 in said plunger. The nature of the said construction is such that when the parts are assembled, substantially as shown and described, a reciprocating movement of the arm 1049 imparts a "four-motion" movement to the forward end 1025$^a$ of the plunger 1025. This is for the purpose of permitting the plunger to go forward (toward the left hand in Fig. 84) while the chain 955 stands still and to return while said chain is going forward. As shown in said Fig. 84, said plunger is in the middle of its forward movement, the pressure of arm 1049 on stud 1053 keeping the arm 1031 against stop 1028. On the reverse movement of arm 1049 the stud 1053 throws arm 1031 against the upper stop 1027 and the point 1025$^a$ below the envelopes in said chains. This movement being completed, the plunger then goes back to its original position ready for the next operation.

*The envelope-placer.*—The first rock-shaft 119 also carries the envelope-placer arm 143, whose hub 143$^a$ is bored to fit loosely on said rock-shaft. The curved face 144 of said arm 143 bears on the placer-slide roll 995, which is carried on the stud 996, fixed in said placer-slide 989. (See Figs. 84 and 85.) The envelope-placer cam 109 is carried on the main cam-shaft 70 and actuates said arm 143 through the placer-cam roll 145, which is carried by a stud 146, fixed in the arm 143 by the nut 147. The slide 989 is provided with the spring 991, which, with the arm 143, operates the said slide, the inner end of said spring being supported by the hook 992, which is made fast in the main bed A, the outer end being carried by the tension-hook 993, said hook being carried by the arm 989ᵇ of said placer-slide and being provided with the adjusting thumb-nut 994, the said spring passing through the opening 33, formed in the wall 4 of the bed A, as shown in Fig. 85. The placer-slide is fitted to slide on a guide or rib 997 on the bed 1070, (see Figs. 84 to 85, inclusive,) which rib fits in the groove 989ᵃ, formed in said slide. At its inner or forward end said slide rests on the shelf 27 of bed A and at its outer or rearward end is supported by two caps or gibs 990, which are held by screws 990ᵃ to the under side of said bed 1070. This bed 1070 (secured to bed A by screws in holes 1071ᵃ) has a shelf or ledge 984, on which the envelope-way 985 is set, being held thereon by screws. (Not shown.) The purpose of said part 985 is to furnish a guide or track onto which the envelope may be delivered by the chain and accessory devices and on which the envelope may be slid along into the packing-box. Accordingly the track 985ᵃ, Fig. 86, on which the lower edge of the envelope 306 rests, coincides in height and alignment with the lower surface of the packing-box. The envelope-placer 986 is carried by the placer-slide 989, being secured thereto by the holding-screw 987. The counting-arm 998 is carried on the counting-arm stud 999 and is provided with one or more counting-fingers 1000, which are fitted to normally pass through slots 988, formed in the placer 986. Said counting-arm is actuated in one direction by the cam 1008, which acts on the roll 1001, that is carried on the stud 1002. It is reversely actuated first by an envelope carried against said fingers 1000 and then by the releaser-cam 1009, which is affixed by screw 1010 to the arm 989ᶜ of the placer-slide and which strikes the cam 1011 on said arm 998. The mode of operation of said devices is illustrated in Figs. 85, 86, and 86ᵃ. On the backward movement of said placer and placer-slide (shown by dotted lines in Fig. 86) the cam 1008, acting on roll 1001, throws arm 998 into the position shown in Fig. 86ᵃ, with the fingers 1000 standing back of the way or track 985ᵃ and with the cam 1011 standing clearly below the cam 1009. The envelope being now brought by the chain nearly up to the way 985ᵃ, as in Fig. 86, the placer on its forward movement carries it against the fingers 1000, and thus throws the arm 998 into the position shown in Fig. 86, where the cam 1011 stands above the line of cam 1009, as there shown, and on further forward movement of the placer the cam 1011 strikes cam 1009, as in Fig. 85, and (owing to the steep inclination of their working-faces) instantly throws the fingers forward of said way 985ᵃ, thus releasing the envelope from its clamped position between said placer and counting-fingers. This operation "sets" the counting devices ready to turn the "stop-wheel" 1020, but does not actually turn that wheel. This is done on the outward stroke of the cam 1008, which acts in a positive manner on the arm 998, which is connected to actuate said wheel. By this means each complete movement of the machine causes the stop-wheel to be turned, provided an envelope is forward of the placer; but in the absence of the envelope at that point the fingers 1000 are not thrown back, the cam 1011 remains below cam 1009, and the arm 998 remains idle. Thus the presence or absence of the envelope determines the operation or non-operation of the counting devices. The stop-wheel or "counting-wheel" 1020 stands in the mortise 1023 in bed 1070 and is carried by a stud 1022, that is removably fixed in the notch 1024 formed in said bed. Said wheel has a ratchet-wheel 1019, whereby it is turned. The connections for actuating the wheel 1020 from the arm 998 consist of the pawl-arm 1016, carried on the hub 1012, Figs. 101 and 104, of the wheel 1020, said arm being pivoted at its lower end to the connecting-rod 1004 by the screw-stud 1005. The counting-pawl 1017 is carried on the arm 1016 by the pin 1018 and operates the ratchet 1019. The arm 1016 is actuated by the rod 1004, pivoted thereto at 1005 and to arm 998 at 1003.

*Packing-box mechanism.*—The packing-box bed-plate 1070 is shown in detail by three views, Figs. 85ᵇ, 85ᶜ, and 85ᵈ. It rests on the shelf 27 of the main bed A, and is secured thereto in the usual manner by screws passing through the holes 1071ᵃ. Other screws 1073, Figs. 90 and 91, passing through holes 1073ᵃ, hold the packing-box frame 1072 on the shelf 1079 of said bed 1070. The packing-box frame is shown in detail in Figs. 93, 94, 95, and 96, in which 1074 designates the wall, which rises from the base 1084 and carries the top plate or bar 1082. 1078 is the right-hand and 1080 the left-hand end as seen from the front of the machine. 1094 and 1095 are bearings supporting the pivot-shaft 1096. Other and minor features of said frame will be hereinafter referred to in connection with the operative details of this mechanism. The first packing-plate consists of the plate proper 1086, the hub 1087, the arm 1088, carrying the eccentric-stud 1110, the rib 1089, and the handle 1086ᵃ. The second packing-plate consists of the plate proper 1090, the hub 1091, the arm 1092, carrying the eccentric-stud 1111, and the rib 1093, overlapping the rib or hook 1089 of the first packing-plate. The packing-plate pivot-shaft 1096 is supported at one end in the bearing 1094 of the packing-box frame and at the other rests in the hollow end of the endless carrier shaft or stud 965, which stud is fixed in the bearing 1095, as shown in Fig. 97, by set-screw 1097ᵃ. The pivot-shaft 1096 is similarly fixed by set-screw 1097 in its bearing 1094. The connecting-rod 1098 is attached to the first packing-plate 1086 by means of the eccentric-stud 1110, said stud being provided with the nut 1112. The opposite end of said rod 1098 is attached to the first packing-plate arm 1113, said arm being provided with the stud 1114 and the nut 1115 for that purpose. The rod 1098 has formed thereon the hook 1116 for the purpose of carrying one end of a spring corresponding to the spring 1133, whose other end is connected to another part of the machine. The arm 1113 is carried on the shaft or stud 1117, said shaft being clamped in the hub 155 of the right-hand bearing 154 of the second rock-shaft 153 by the clamp-screw 156. The arm 1113 (see Figs. 99 and 100) has at its lower end the cam-roll stud 1118, which is provided with the bushing 1119, carrying the cam-roll 1120, which bears on the face 178 of the single packing-plate cam 177, (said cam is provided with the hub 177ª, bored to fit the second rock-shaft 153, to which it is secured by the pin 177ᵇ,) and also carrying the cam-roll 1121, which bears on the face 172 of the double packing-plate cam 171, said double cam having a hub 171ª, bored to fit loosely on the second rock-shaft 153. A nut 1122 is provided for the stud 1118. The connecting-rod 1099 is attached to the second packing-plate 1090 by means of the eccentric-stud 1111, said stud being provided with the nut 1123. The opposite end of said rod 1099 is attached to the second packing-plate arm 1124, said arm being provided with the stud 1125 and the stud-nut 1126 for that purpose. The rod 1099 has formed thereon the hook 1127 for the purpose of carrying one end of the spring 1133. The second packing-plate arm 1124 is also carried on the shaft 1117, the screw and washer 1128 holding the parts in place on said shaft. The arm 1124 has at its lower end the stud 1129, carrying the cam-roll 1130, which bears on the face 173 of the said double cam 171. A nut 1131 is provided to hold in place the stud 1129 in the arm 1124. The double packing-plate cam 171 and the single packing-plate cam 177 are shown in detail in Figs. 17 and 18. (See also Figs. 16, 99, and 100.) The hub 171ª of the cam 171 has formed thereon an arm 174, which is provided with the stud 175, secured in place by the stud-nut 175ª, said stud 175 carrying one end of the eccentric-rod 176 of the packing-plate eccentric 105 on the main cam-shaft 70. The mode of operation of these details is hereinafter described. The aforesaid springs are provided to normally hold the cam-rolls 1120, 1121, and 1130 always on the faces of the cams 171 and 177, the inner ends of said springs being carried on the hooks 1116 and 1127, respectively. The outer ends of said springs are carried by the tension-hooks 1134 and 1135, said hooks being provided with the adjusting thumb-nuts 1141 and 1142. The bracket 395, which is screwed fast to the gum-plate brackt 391, is provided to carry the said hooks 1134 and 1135. (See Figs. 2, 3, 36, and 100.) The packing-box upper hook 1136 is secured by holding-screws 1137 to the upper hook-arm 1138, said arm being carried on the upper hook-arm shaft 1139 and secured thereto by the set-screw 1140. The packing-box lower hook 1143 is secured by holding-screws 1144 to the lower hook-arm 1145, said arm being carried on the lower hook-arm shaft 1146 and secured thereto by the set-screws 1147. The packing-box-hook spring 1148 is held in place by the holding-screws 1149. (See Fig. 98.) The packing-box-hook cam-arm 1151 is fixed to the shaft 1146. The packing-box-hook let-off or latch-cam 1152 is pivoted to the arm 1153 by the pin 1154 and is provided with the spring 1155, said arm 1153 being pivoted to the packing-box frame by the pivot-screw 1156. The connecting-rod 1157 is connected to the arm 1153 by the screw-stud 1158 and by stud 1159 to the ear 170, which is formed on the arm 159ª of the end-fold rocker 167, that is carried on the second rock-shaft 153. The packing-box retaining-hook 1166, Fig. 97, is carried on the pin 1167 and is provided with the spring 1168. The upper guide-block 1160 is secured to the packing-box frame by the screws 1161, and the lower guide-block 1162 is secured to said frame by the screws 1163. The packing-box front plate 1075 is secured to said box by the screw 1075ª, said plate being backed up by the upper and lower blocking-pieces or envelope-stops 1076 and 1076ª. The said front plate has the projection 1077 formed thereon. (See Figs. 90 to 98, inclusive.) The envelope-supporting plate 1100 of the packing-box is secured to the frame 1072 by the screws 1101. The packing-box end plate 1104 is secured to the packing-box frame by the screws 1105. The bunch-plunger proper 1179 is provided with the upper guide-shoe 1180 and the lower guide-shoe 1181, loosely fitted to the stud 1182, said stud being fixed in the hub 1183 of the said plunger 1179. The right-hand face or plate 1171 and the left-hand face or plate 1172 of said plunger are provided with the face-spring 1173 and are hinged together and pivoted by the pin 1174 to the inclined arm 1175. (See Figs. 101, 102, 103, and 104 for detail views of the said plunger.) The bunch-plunger arm 1175 reaches rearwardly and upward through the inclined slot or passage-way between the back plates 1160 and 1162, as will be understood by comparison of Figs. 91, 98, 103, 105, 106, and 107. Said arm being thus upwardly inclined into said box, the passing of any oil through the plunger-guides along said arm into the packing-box is effectually prevented, it being necessary in practice to secure the envelopes in the packing-box from contact with oil used for lubricating the machinery. The bunch-plunger stop-hook 1185 is pivoted to the plunger 1179 by the pin 1186 and is provided with the spring 1187, which is secured to the plunger 1179 by the screw 1188. The bunch-plunger 1179 has at its outer end the hub 1184, said hub being bored to fit the bunch-plunger eccentric-stud 1193, said stud being fixed in the outer end of the bunch-plunger arm 1194 by the nut 1195. The said stud is for the purpose of adjusting the position of the plunger 1179. The arm 1194 is carried on the shaft or stud 1199, it being secured thereto by the clamp-screw 1196. Said shaft has its bearing 25 in the main bed A. (See Fig. 5.) The shaft 1199 has securely clamped to its lower end the arm 1203, carrying the cam-roll 1204, which bears on the cam 111, that is carried on the main cam-shaft 70. (See Fig. 85.) The arm 1203 has formed thereon the ear 1205, provided with the pin 1206, which carries the spring-bail 1208, said bail supporting one end of the spring 1207, which actuates forwardly the shaft 1199. The opposite end of said spring is or may be secured to the front wall 3 of the main bed A. The bunch-plunger arm 1194 has secured thereto by the nut 1201 the stud 1200, carrying the cam-roll 1202, which bears on the band-knock-off cam 1383, which is hereinafter described in connection with the banding mechanism.

*Mode of operation.*—The completed envelopes having been delivered to the endless carrier or chain, said carrier being operated by the endless-carrier-driving mechanism, as hereinbefore described, said envelopes are carried upward in the direction indicated by the arrow in Fig. 78 over an ordinary supporting-pulley (not shown) and down on the opposite side between the right-hand and left-hand guides 982 and 983 and forward of the outer or rear guide 981. The envelope-placer 986, which is operated as before described, pushes the said envelopes one by one slightly forward to their proper position on the envelope-way 985, the upper edges of said envelopes resting against the projection 1077 of the front plate 1075, as shown in Fig. 78. From this point the said envelopes after being counted, as hereinbefore set forth, are pushed by the envelope-plunger 1025 into the packing-box and rest with their edges on the supporting-plate 1100. The operation of the packing-plates and of the course of an envelope entering said box is best shown in Figs. 87, 88, and 89, which views show said box in horizontal section. Fig. 87 shows a number of envelopes 1102 in the packing-box, the first packing-plate 1086 being fully closed and holding said envelopes in place. The second packing-plate 1090 is fully open, and the envelope-plunger 1025 is pushing an envelope 306 into said box. The first packing-plate now opens to admit of the full entrance of envelope 306, as in the next figure. In Fig. 88 both packing-plates are shown fully open, and the plunger 1025 has pushed the envelope 306 into the packing-box and against the end plate 1104, said plate thus acting as a stop for the envelope. In Fig. 89 both the first and second packing-plates are shown fully closed, they having carried the last-entered envelope to place, and the plunger 1025 is shown returning to its position preparatory to bringing forward another envelope. The first and second packing-plates are operated by the packing-plate cams 171 and 177, hereinbefore described, said cams being constructed and timed suitably therefor. The above operations are repeated until twenty-five envelopes have been packed in the said packing-box, when the bunch-plunger 1179 pushes the said bunch of envelopes out of the packing-box and into the bunch-trough 1575, a band being placed thereon as the bunch passes from the packing-box to said trough, the said banding operation being accomplished in a manner hereinafter described. The packing-box having two packing-plates side by side and operated to open in succession, substantially as set forth, the movements of said plates and also of the envelope-plunger are permitted to be much slower than would be the case if a single packing-plate were used, as shown, for instance, in the prior Letters Patent of the United States, No. 340,243, granted to me April 20, 1886. According to my present improvements, and as above described, the first packing-plate is opened before the bunch passes entirely out of the packing-box, and the envelope enters the packing-box part of its length before the second packing-plate is fully opened. Thus the normal movements of the said parts "overlap" in point of time, so as to save much time in the operation of the machine, it being understood, of course, that in practice the packing operation limits the speed at which the antecedent operations may be carried on. The packing-plate being made duplex and the two parts thereof being operated to be opened in succession, the suction due to the packing-plate movements is materially reduced, the presence of air in the packing-box being in practice and at the speeds at which the machinery is run one of the most troublesome obstacles to be overcome.

The operation of the bunch-plunger 1179 is as follows: The pull-spring 1207 operates to turn the shaft 1199 in its bearing through the cam-roll arm 1203, the turning of said shaft giving a forward movement to the said plunger 1179 through the bunch-plunger arm 1194. Each time an envelope is taken by the placer 986 and is placed upon the envelope-way 985 in the manner above described the ratchet-plate 1020 (which is fixed to or formed on the ratchet 1019) is turned on the stud 1022 (by means of said ratchet and the connections hereinbefore described) through the one-twenty-fifth part of a complete revolution. The form and timing of the cam 111 are such as to allow the plunger 1179 to be thrown forward (by the means above described) on the completion of each movement of the plate 1020. The stop-hook 1185 coming in contact with the plate 1020 prevents the further forward movement of said plunger, which is immediately returned to its position by the cam 111 (the forward movement of the plunger in this case being very slight, usually about the one thirty-second part of an inch) on the completion of the twenty-fifth movement or one complete revolution of said ratchet-plate 1020, at which time twenty-five envelopes have been placed in the packing-box by the envelope-plunger 1025, the plate 1020 is in the position shown in Figs. 101 and 104, the notch 1021, formed in the plate 1020, has been brought into line with the stop-hook 1185, and the plunger 1179 is thrown forward by the means above described, pushing the twenty-five envelopes out of the packing-box and into the bunch-trough 1575, the bunch-plunger 1179 being immediately returned to its original position by means of the cam 111, as before.

*The banding mechanism.*—For convenience of description this mechanism or envelope-bander may be considered in two divisions, consisting of the band-placing apparatus and the band-making apparatus. The latter, which is also termed the "band-maker," takes a previously-prepared tub of band material, feeds the same to the shears, cuts off the band, and delivers this to the band-placing apparatus. Said placing apparatus or band-holder receives the band thus made and carries it to and holds the same expanded in position to be placed at the proper time on the bunch of envelopes. The construction of this portion of the banding mechanism will be best understood from Figs. 126 to 131, inclusive. The movable band-carrying finger 1307 is riveted to the band-carrier slide 1308. The opposite and shorter band-carrying fingers 1309 and 1310 are riveted to the band-carrier arm 1325. Said carrier-slide 1308 is provided with the spring 1311, said spring being connected at one end by the pin 1312, which is fixed in the slide 1308, the opposite end being connected to the pin 1313, that is fixed in the slide-cap 1314. Said slide-cap is secured to the band-carrier arm 1325 by the holding-screws 1315, which arm is provided with the stop-screws 1326 and 1327, the holding-screw 1328, and the washer 1329, said holding-screws serving to adjustably secure said carrier-arm to the arm 1331, whose hub 1331ᵃ is bored to turn freely on the fixed band-carrier shaft or stud 1338, it being held in place on said shaft by the collars 1339 and 1340, said collars being fixed on the shaft 1338 by the set-screws 1341 and 1342, respectively. The ears 1332, formed on the hub 1331ᵃ, are provided with the chain-pin 1333, carrying the chain 1334, said chain having at its lower end the pin 1335, which carries one end of the band-carrier spring 1336, whose opposite end is held by the spring-hook 1337, that is fixed in the main bed A near the base thereof. (See Fig. 3.) The band-pusher 1351 is provided with the holding-screw 1352 and the washer 1353, by which it is adjustably secured to the band-pusher arm 1354, whose hub 1354ᵃ is fitted freely on the shaft 1338. Said pusher is moved in one direction by the spring 1355, that is connected at one end to pin 1357 in hub 1331ᵃ and at the other end to the pin 1356 in the hub 1354ᵃ. A leather washer 1343 is usually provided to cushion the blow of the hub 1354ᵃ as the same is thrown forward toward the left hand in Fig. 126. The arm 1354 has formed thereon the lug 1368, which stands forward of the point of the outside let-off arm 1365, as best shown in Fig. 129. The arm 1365 is fixed by its hub 1366 and pin 1367 to the let-off shaft 1363. (See Figs. 126 and 127.) The inside let-off arm 1361 (see Fig. 131) has a hub 1362 fixed on the shaft 1363 by the set-screw 1364, said shaft 1363 having its bearing in the bed 1345 of the banding mechanism. Said arm 1361 engages with the stop-arm 1413, which is formed on the banding-cam-shaft sleeve 1412. The band-knock-off connecting-rod 1371 is pivoted to the arm 1365 by the screw stud or pin 1372, and said rod is connected by the stud or pin 1373, Fig. 84, to the lower knock-off arm 1375, said stud being held in place by the nut 1374. The said arm 1375 passes through the opening 32, which is formed for that purpose in the rear wall 4 of the bed A, and is fixed by the pin 1376 or otherwise to the lower end of the band-knock-off shaft or stud 1382, Fig. 85. Said shaft 1382 has its bearing 1041, Fig. 85ᵇ, in the bed-plate 1070 of the packing mechanism, but passes freely through the hole 29, formed in the shelf 27 of the main bed A. (See Fig. 5.) The band-knock-off cam-lever 1381 is fixed or formed on the upper end of said shaft 1382 and has adjustably secured thereto (by screws and washers 1384) the band-knock-off cam 1383, which cam is adjusted on said arm by the adjusting-screw 1385, usually having a check-nut 1386. The knock-off cam is actuated by the roll 1202 on the bunch-plunger lever 1194, as shown in Figs. 108 and 109 and hereinbefore referred to. The band-carrier shaft or stud 1338 is supported in the hole 1348, Figs. 116 and 117, formed in the bed or frame 1345, being fixed therein by the set-screw 1346, Fig. 126. Said bed 1345 rests on the ledge or shelf 27 and against the wall 28 at the rear side of the bed A, (see Fig. 7,) and is shown in detail in said Figs. 116 and 117 with the bracket 1495 attached thereto by screws 1496. The hub 1331ᵃ of the band-carrier arm 1331 has formed thereon the connecting-rod arm 1331ᵇ, provided with the stud 1391 (held in place by nut 1392) for the band-carrier connecting-rod 1393, which rod passes through the opening 34, formed in the wall 4 of the bed A, and is connected by the stud 1394 (held in place by the nut 1395) to the band-carrier rock arm 1396, whose hub 1397 is fitted to turn freely on the band-carrier rock-shaft 1398, this shaft being carried in the bearings 1399 and 1400, that are supported within the main bed A by screws 1405, one of which is shown by dotted lines in Fig. 125. Said hub 1397 has formed thereon another arm 1401, provided with the stud 1402, (held in place by nut 1403,) carrying the cam-roll 1404, that bears on the banding-cam 1411. (See Figs. 115 and 125 to 131.) The banding-cam shaft 1421 is carried in the right-hand bearing 1422 and the left-hand bearing 1423, which bearings are secured to the main bed A by screws. (Not shown.) The bearing 1422 has a set-screw 1424 for holding in place therein the said shaft 1421. The banding-cam 1411 is formed on the banding-cam sleeve 1412, (shown in detail in Fig.

125ª,) on which are also formed various other cams and parts hereinafter mentioned. The banding-cam gear 1429 is carried on the sleeve 1412 between the leather friction-washers 1430 and 1431, which are clamped between the fixed friction plate or surface 1526, Fig. 125ª, and the movable friction-plate 1432, that is forced against said washer 1430 by the friction spring-plate 1433 and the friction adjusting-nut 1434. (See Fig. 130.) The banding-pinion-shaft bearing 1443 is secured to the wall 5 of the main bed or frame A by the holding-screws 1444, the hub of said bearing passing through the hole 38, formed in the said wall. The pinion-shaft 1445 is carried in the bearing 1443 and has on its inner end the banding-pinion 1446, fixed thereto by the pin 1447. The shaft 1445 carries at its outer end the hand-wheel 1452, having the handle 1453. The banding-mechanism-driving pulley 1454 is fitted to turn freely on shaft 1445, and its hub 1454ª is bored to receive the pawl 1455 and the spring 1456 for actuating said pawl, said pawl engaging with the ratchet-teeth 1457, formed on the hub 1458 of said hand-wheel 1452. The pulley 1454 is driven by an ordinary band or belt 781, Fig. 65, from the pulley-face 779, Fig. 1, on the sleeve 780, which sleeve extends inwardly from the pulley 777, that is fixed on shaft 775. (See Figs. 1, 63, 65, and 65ª.) Said shaft 775 is driven by the band 778 from the pulley 75, as hereinbefore stated in connection with the inking mechanism. The arrangement of driving mechanism here described permits the banding mechanism to be operated forwardly by hand whether or not the pulley 1454 is revolving, the pawl 1455 yielding whenever the hand-wheel 1452 is turned faster than said pulley 1454.

*The band-making apparatus.*—The band-tube feed-roll bracket 1495 is secured, as before stated, to the bed 1345 by the holding-screws 1496. The band-tube upper feed-roll shaft 1486 is provided with the knob 1487, pinned to said shaft by a pin 1488. Said shaft is carried by the bearings 1489 and 1490, which are fitted to slide vertically in the rectangular slots 1497 and 1498, respectively formed in the said bracket 1495, and are provided with the bearing-springs 1499 and 1499ª, the bearing-spring washers 1500 and 1500ª, and the bearing-spring tension-screws 1501 and 1501ª, which screws are carried in the bearing-caps 1502 and 1503, that are fixed on the bracket 1495 by the cap-screws 1504. (See Figs. 114 to 120 and 125.) The shaft 1486 carries the sleeve 1491, fixed thereon by the pin 1491ª, which sleeve has formed or assembled thereon the band-feed rolls 1491ᵇ, the shuttle-guide flanges 1492, and the gear 1493. The band-tube lower feed-roll shaft 1519 has its bearings in the bed 1345 and in the bracket 1495 and passes freely through the opening 36 in the wall 4 of the main bed A. Said shaft 1519 carries freely thereon the sleeve 1506, which has formed thereon the band-tube lower feed-rolls 1507, the gear 1508, meshing with and driving the gear 1493, and also the ratchet-wheel 1509, whereby said sleeve and feed-rolls are driven. The band-tube feed-pawl 1510, which engages with the ratchet 1509, is carried on the pawl-stud 1511, that is fixed by the nut 1512 in the feed-pawl arm 1513. A spring 1525, Fig. 119, is secured to the arm 1513 and bears on a flattened part of the pawl 1510, so as to hold said pawl in engagement with the ratchet 1509. Said arm 1513 is secured to shaft 1519 by the pin 1514, and is actuated backward by the pawl-arm spring 1515, that is connected at one end to the hook 1516 on said arm and at the other end to a hook on bracket 1495. The movement of the pawl-arm is regulated by a stop 1517, that is adjustably fixed on the bracket 1495 by the screw 1518. (See Fig. 118.) The shaft 1519 has secured at its inner end the band-feed arm 1520, which has a stud 1521, (fixed therein by nut 1522,) that carries cam-roll 1523, which roll bears on the band-feed cam 1524, that is formed on the banding-cam-shaft sleeve 1412. The rotation of cam 1524 imparts a forward movement to arm 1520 and through shaft 1519 and through the pawl-arm, pawl, and ratchet to the feed-rolls 1491ᵇ and 1507, the return movement being made by the spring 1515, as aforesaid.

*Operation of the banding mechanism:* A diagram or "time-chart" of the cam movements of this mechanism is shown in Fig. 15. A rocking movement is imparted to the band-carrier by the cam 1411 through the arms and connections hereinbefore described. When the bunch-plunger arm 1194 is allowed, as before described, to throw forward the bunch-plunger 1179, it also operates through the cam-roll 1202, the cam 1383, and lever 1381 to turn the shaft 1382 in its bearing, and the turning of said shaft operates through the arm 1375, the connecting-rod 1371, the arm 1365, and the shaft 1363 to disengage the let-off arm 1361 from the stop-arm 1413, Figs. 130 and 131, on sleeve 1412. As soon as this disengagement takes place the sleeve 1412 and the cams thereon are revolved on the shaft 1421 by the frictional driving apparatus hereinbefore described through one full revolution and until said let-off arm again strikes said stop-arm and thus arrests said movement. During said revolution said cams on sleeve 1412 severally perform the work for which they are designed. Said sleeve is allowed to make but one revolution each time it is started, since the arm 1361 is immediately returned to place in the path of said stop-arm 1413. The cam 1411, formed on the sleeve 1412, operates through the cam-roll 1404 and the connections before described to turn the band-carrier arm 1331 on the shaft 1338 down to one side, as in Figs. 118 and 120. At the lower part of said movement the slide 1308 strikes the stop 1316, as shown in said figures, and thus closes the band-carrier finger 1307 against or nearly to the band-carrier fingers 1309 and 1310. The band-tube 1485 is now fed forward in a manner hereinafter described, the band-carrier fingers receiving the end of the said tube. The band-shears are next operated by the shear-cam 1554 through the connections described to cut off a band, which is deposited on the said band-carrier fingers. As the band-carrier arm now returns to its first or upright position, as in Figs. 126 and 127, the spring 1311 operates to separate the said band-carrier fingers, which thus expand the said band 1476 thereon, as illustrated by dotted lines in Fig. 105. The operation of placing a band on a bunch of envelopes is best illustrated in Figs. 105, 106, and 107. The desired number of envelopes having been placed in the packing-box by the envelope-plunger 1025, the bunch-plunger 1179 pushes said envelopes out of said box in the manner hereinbefore described. At the same time that the bunch-plunger moves forward the arm 1365 engages with the lug 1368, formed on the hub 1354$^a$ of the band-pusher arm 1354. This causes the said hub to slide on the shaft 1338, carrying with it the band-pusher 1351, which pushes the band 1476 off from the band-carrier fingers and places it on the bunch of envelopes as they leave the packing-box, as shown in Fig. 106. In Fig. 107 the bunch is shown pushed fully out of the packing-box and having a band in place thereon. In Fig. 114 said bunch is shown deposited in the bunch-trough 1575 forward of the bunch-pusher 1572. The operation of feeding the band-tube onto the band-carrier fingers is best shown in Fig. 120. The tube is slipped by hand over the tube-opener 1484 of the band-shuttle and between the band-shuttle rolls 1469 and the upper and lower feed-rolls 1491$^b$ and 1507, the paper-guides 1478 and 1479 serving to prevent the band-tube from passing between the two front shuttle-rolls, as it might sometimes do in the absence of said guides. The tube material is held firmly between said rolls by reason of the springs 1499 and 1499$^a$, hereinbefore described. The band-tube is now ready to be automatically fed forward, this being accomplished by the band-tube feed-cam 1524 and its connections hereinbefore described. The rocking of the shaft 1519 operates through the feed-pawl arm 1513 and the feed-pawl 1510, which engages with the ratchet 1509 to intermittently revolve the band-feed rolls. The four small band-shuttle rolls being fitted to freely turn on the pivot-screws 1471, (see Fig. 121,) and the feed-rolls being firmly pressed against the tube material by said springs, the turning of said feed-rolls acts to draw forward the band-tube over the shuttle, leaving this always in the same position. The pressure of the said feed-rolls on the band-tube is regulated by the thumb-screws 1501 and 1501$^a$. The normal longitudinal position of the shuttle between the feed-rolls is maintained by reason of the entering of said feed-rolls between the small shuttle-rolls, as well shown in Fig. 120. The upper band-shear blade 1528 is screwed to the upper band-shear arm 1530 by the upper blade-screws 1529. The arm 1530 is carried on the upper shear-arm bushing 1531, which is secured to the bracket 1495 by the screw-stud 1532. (See Figs. 114 and 115 and 118 to 120.) The lower band-shear blade 1533 is screwed to the lower band-shear arm 1535 by the lower blade-screws 1534. The arm 1535 is carried on the lower shear-arm bushing 1536, which is screwed to the bracket 1495 by the screw-stud 1537. The upper shear-arm 1530 has formed thereon the upper shear-segment 1538, whose teeth mesh with those of the segment 1539, which is formed on the lower shear-arm 1535, as will be understood from Figs. 119 and 120. The shear-guard 1540 is provided with the band-tube guide-arms 1541 and 1542, and is secured to the bracket 1495 by the guard-holding screws 1543. The shears are operated by a connecting-rod 1547, which is connected to arm 1544, that is formed on the lower shear and has the stud 1545 fixed therein by the nut 1546. Said rod passes through the opening 35, formed in the wall 4 of the main bed, and at its inner end is connected by stud 1548 and nut 1549 to the shear-cam-roll arm 1550. (See Figs. 130 and 131.) Said arm carries on the stud 1551 (held therein by nut 1552) the cam-roll 1553, which bears on the shear-cam 1554, that is formed on the banding-cam sleeve 1412. The arm 1550 is fixed by its hub 1555 and pin 1556 to the band-carrier rock-shaft 1398, which shaft is thus turned forwardly by said arm 1550. The opposite movement of said shaft 1398 and arm 1550 is effected by the pull-spring 1564, which is connected by chain 1563 to the bunch-pusher arm that is also fixed on said shaft, as shown in Figs. 125 and 130 and hereinafter again referred to.

*The band-tube shuttle.*—This part (see Figs. 120 to 123) consists of the shuttle-frame 1463; four band-shuttle rolls 1469, which are carried on the points of the roll-carrying screws 1471, that are screwed into the frame 1463; one upper shuttle-spring 1480, secured to the frame 1463 by two holding-screws 1481; one lower shuttle-spring 1482, secured to the frame 1463 by two holding-screws 1483; the upper and lower paper-guides 1478 and 1479, and the band-tube opener 1484. Said opener serves to separate the upper and lower sides of the band-tube 1485, Fig. 120, as this tube comes from the roll 1475 of previously-prepared tubing, which roll is supported by an arbor or reel in a well-known manner. The shuttle is supported by and between the feed-rolls 1491$^b$ and 1507, being guided as to its lateral position by the flanges 1492, as best indicated in Fig. 125.

*The bunch-delivery apparatus.*—The bunch-pusher arm 1560 is secured by means of the clamp-screw 1561 to the band-carrier rock-shaft 1398, and is provided with the pin 1562, to which is connected one end of the chain 1563, which chain passes through the opening 37 in the main bed A, and at its opposite end is connected to the pusher-actuating spring 1564, that is connected to the pin 1565, fixed in the bed 1345. The bunch pusher or plate 1562 is carried by the arm 1570, having the slot 1573 formed therein for the bottom plate 1574 of the bunch-trough 1575. The arm 1570 is carried by the pusher-slide 1569, which is fitted to slide on the bed 1345 and in a recess or channel formed in the under side of said trough 1575. Said slide has in the end thereof a notch 1571 to receive the head of the pusher-arm 1560. The bunch-trough 1575 rests at the right-hand side of the machine on the top plate 7 of the main bed A, to which it is secured by screws (not shown) in a well-known manner. Said trough is provided with the bunch-stop hooks or catches 1576 and 1577, having the retaining-springs 1580 and 1581, respectively. Said springs are carried by the spring-hooks 1582 and 1583 in the side walls of the said trough 1575. (See Figs. 114, 115, and 125.) In Fig. 114 a bunch of envelopes 1584 is shown in the delivery-trough forward of the bunch-pusher 1572. The operation of this apparatus is as follows: The shaft 1398 is oscillated in one direction by the cam 1554, (on the sleeve 1412,) acting through the connections hereinbefore described, and in the other direction by said spring 1564. (Shown in dotted lines in Fig. 125.) The bunch of envelopes 1584 having been deposited in the bunch-receiving trough 1575, as shown in Fig. 114, the bunch-pusher is moved forward, as above described, and carries said bunch forward against the stop-hooks 1576 and 1577. The said hooks recede under the pressure of said bunch and allow it to pass, and then return to place close behind the bunch, preventing this from falling back, and thus leaving the space behind said hooks for the reception of the next succeeding bunch, when the operation as above outlined is repeated. The operator takes the bunches from the trough and packs them in boxes for shipment.

*The automatic stop-motion.*—This mechanism comprises two portions, one being for the envelope-plunger and the other for the bunch-plunger, and they will be described in this order. The stop-motion arm 1211 is fixed by pin 1212 on the envelope-plunger rock-shaft 1050. A stud 1213 in the end of said arm 1211 carries one end of the connecting-rod 1214, the opposite end of said rod being connected by the stud 1215, which is held therein by nut 1216 and the washer 1217, (see Figs. 111 and 112,) to the pawl-arm 1221, whose hub 1222 is fitted to turn freely on hub 1242 of the friction plate or disk 1240. The stop-motion pawl 1223 is carried on the stud 1215 and is provided with the pawl-spring 1224, said spring being carried on the spring-hooks 1225 and 1226. The outer end of the envelope-stop-motion shaft 1228 is supported by the bracket 1229, which is secured to the main bed A by the bracket-screws 1230. The inner end of shaft 1228 has its bearing 125 formed on the flange 123 of the left-hand bearing 122 of the first rock-shaft 119. The shaft 1228 has secured to its inner edge the miter-gear 1231 by a pin in the usual manner. The stop-motion guard disk or plate 1236 is fixed by its hub 1237 and pin 1238 to the shaft 1228. Said disk 1236 has formed in its edge the notch 1239. The envelope-stop-motion friction-disk 1240 has the similar notch 1241 formed in the edge thereof and has two contact-pins 1249 1250, which are or may be formed integral with said disk, its hub 1242 being fitted freely on the said shaft 1228. The friction-clamps 1243 are provided with the leathers 1244, which bear on the laterally-projecting hub 1242 of the friction-disk 1240. Said clamps are also provided with the clamp-screw 1245, the clamp screw-nut 1246, the friction clamp-spring 1247, and the friction clamp-stud 1248, which stud is fixed in the bracket 1229. The stop-motion latch-arm 1251 is fixed on the shaft 1228 by a pin in the usual manner. Said arm 1251 is provided with the stud 1252 and the stud-nut 1253 for carrying the stop-motion latch 1255. This latch has a lower bearing 1256, formed on the flange 1264 of the left-hand bearing 1263 of the stop or shipper rod 1261. A spring 1254, one end of which is carried on the stud 1252 and the opposite end by a hook fixed in the bearing 1256, is provided to impart a downward pressure to the said latch 1255. The stop-rod 1261 has a right-hand bearing 1262 and a left-hand bearing 1263, fixed in the walls 5 and 6, respectively, of the main bed A. (See Fig. 68.) The said stop-rod is provided with the stop-rod collar 1265, pinned to said rod, and the stop-rod spring 1266. Said rod has near its left-hand end the notch 1267, formed therein to receive the point of said latch 1255. The operation of this stop-motion apparatus is as follows: The envelope-plunger 1025 receives its backward and forward motion from the shaft 1050, as hereinbefore described, the office of said plunger being to push the completed envelopes one by one out of the endless carrier and into the packing-box. The machine is set in operation by throwing the pulley 72 into engagement with the friction-cone 74 by means of either of the shipper-handles 92 and 93. This at the same time, through the arm 94, (see Figs. 65 and 68,) pushes back the stop-rod 1261 until the latch 1255 drops into the notch 1267, formed in the said rod. The machine being now in operation and having pushed an envelope into the said packing-box, the plunger immediately starts on its backward movement. The connecting-rod 1214 simultaneously moving forward, (being carried by the arm 1211,) the pawl-arm 1221 strikes the contact-pin 1249, causing the friction-disk 1240 to turn on the shaft 1228 until the notch 1241 of said disk 1240 is brought into line with the notch 1239, formed in the edge of the shaft-disk 1236. (See Fig. 113.) The plunger is now fully back and immediately starts on its next forward movement, the rod 1214 at the same time moving in the opposite direction. The pawl-arm 1221 strikes the contact-pin 1250, thus returning the disk 1240 to place. This return is thus accomplished, provided that the plunger 1025 moves fully forward; but should the movement of said plunger be obstructed in any manner—as, for instance, by disarranged envelopes—then the plunger does not move fully forward, the arm 1221 is not thrown back far enough to strike the contact-pin 1250, the disk 1240 remains in its position, and the notches 1241 and 1239 are still in line, as shown in Fig. 113. As the plunger now moves backward the rod 1214 moves forward, causing the pawl 1223 to slide on the edge of the disks. The notches 1241 and 1239 being in line, the point of said pawl drops into said notches. The pawl 1223 cannot engage with the notches 1239 and 1241 until these are brought into line. At any other time said pawl may pass over said notches, the edge of one disk acting as a bridge to carry the pawl over the notch in the other disk. When the said notches are in line, the rod 1214 on continuing its forward movement turns the disks by means of the said pawl. As the disk 1236 is fixed to the shaft 1228 by pin 1238, said shaft is turned in connection therewith, causing the arm 1251 to lift the latch 1255 out of said notch 1267, and thus release the said stop-rod, which is then thrown forward by the spring 1266. This movement of said stop-rod operates through the arm 94 to turn the shaft 87, and said shaft, through the arms 88 and 89, disengages the pulley 72 from the friction-cone 74 in a manner hereinbefore described, thereby stopping the machine.

*The automatic bunch-plunger stop-motion.*—This mechanism is similar in construction and operation to the envelope-plunger stop-motion above described. The stud 1271 is fixed in the bunch-plunger arm 1194 and carries one end of the connecting-rod 1272, whose opposite end is connected to the stud 1273, that is fixed by the nut 1274 in the pawl-arm 1278. This arm is carried on the hub 1295 of the friction-disk 1294. The stop-motion pawl 1279 is carried on the stud 1273 and is held by the pawl-spring 1280 against the edges of the stop-motion disk. The bunch-plunger stop-motion shaft 1285 has its upper bearing in the bracket 1286, which is secured to the top plate 7 of the main bed A by the bracket-screws 1287. The lower bearing 126 of said shaft 1285 is formed on the flange 125 of the left-hand bearing 122 of the first rock-shaft 119. At the lower end of the shaft 1285 is secured the miter-gear 1288, which meshes with the gear 1231, that is fixed on the shaft 1228. The bunch-plunger stop-motion disk 1293 is pinned to the shaft 1285, and has formed in the edge thereof a notch similar to notch 1239, formed in the disk 1236. The friction-disk 1294 is provided with the hub 1295, bored to fit the shaft 1285, and has formed in the edge thereof a notch similar to notch 1241, formed in the edge of disk 1240. Said disk is also provided with contact-pins similar to pins 1249 and 1250. The friction-clamps 1299 are provided with the leather friction-washers 1300, which bear on the hub 1295 of the friction-disk 1294. The clamps 1299 are provided with the clamp-screw 1301, the nut 1302, and the spring 1303. Said clamps are also provided with the stud 1304, fixed in the bracket 1286. The operation of this mechanism will be understood without further explanation, it being the same as that of the envelope stop-motion hereinbefore described. Any obstruction preventing the full forward movement of the plunger causes the notches formed in the disks 1293 and 1294 (which are similar to notches 1239 and 1241, but are not shown in the drawings) to be brought into line, so that on the return-stroke the pawl catches in said notches and thus turns shaft 1285 to release the rod 1261, and thus allow the spring 1266 to stop the machine, as heretofore more fully pointed out in connection with the envelope-plunger stop-motion.

Figure 135:
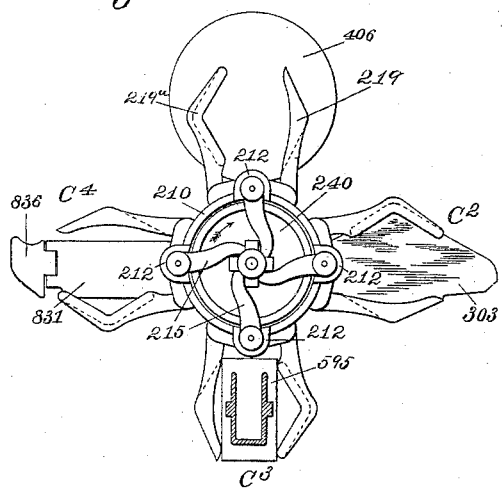
Figure 136:
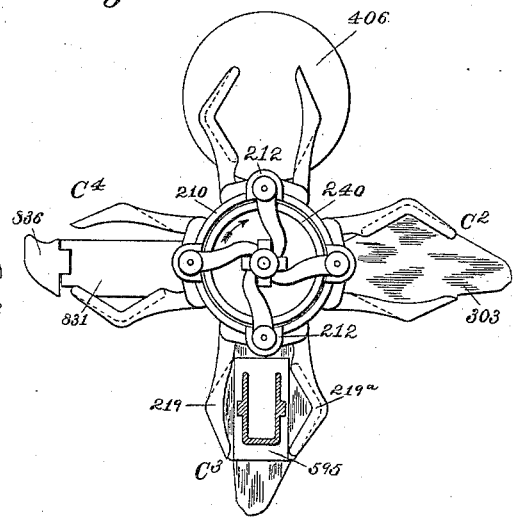
Figure 137:
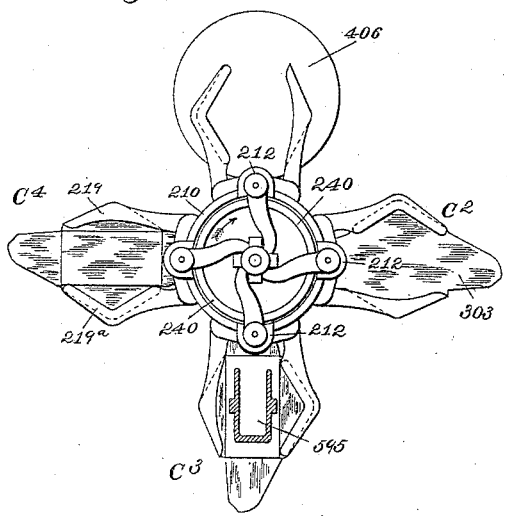
Figure 138:
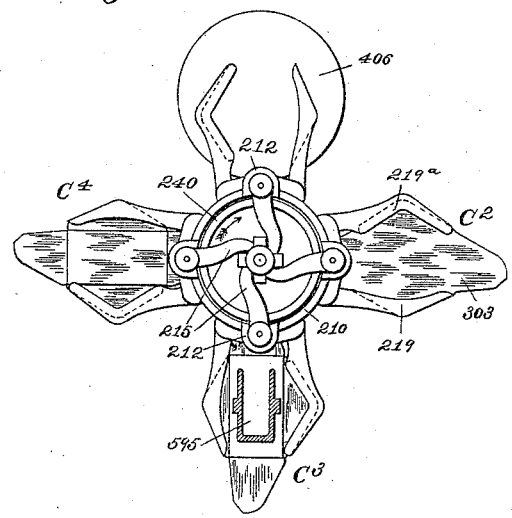

Figs. 135, 136, 137, and 138 are views illustrating the operation of the machine by showing the progress of the pickers in their course from station to station and the manner of carrying an envelope-blank through some of the steps of its manufacture into a complete envelope. The several stations are designated by $C'$, $C^2$, $C^3$, and $C^4$, as in the diagrammatic view, Fig. 134. The picker-turret 210 has an intermitted rotary motion in the direction indicated by the arrow and turns ninety degrees at each movement thereof. It carries the four picker-frames 212, each frame carrying a stem or spindle 213, which spindles each carry a pair of picker-arms 219 and $219^a$ (see also Fig. 24, Sheet 9,) that are respectively the seal-picker and the back-picker of the several pairs of them. When referred to collectively, said pickers are generally called "pickers 219," or separately without choice "picker 219." The pickers are arranged in pairs which are set substantially radial to the axis of turret 210. The picker-faces or pickers proper are formed of india-rubber properly vulcanized. (See Figs. 21 and 22, Sheet 8.) 406 designates a gum-delivering plate made to revolve simultaneously and uniformly with the pickers. 303 designates a pile of blanks as placed upon the blank-feed plate 270. (See Fig. 24, Sheet 9.) When in the operation of the machine one pair of pickers has taken the required supply of gum from plate 406, said pickers move one station in the direction indicated by the arrow, as shown in Fig. 135. The gum on the picker-faces causes the topmost blank of the pile 303 to adhere thereto. When the first pair of pickers is taking up a blank, the second is taking gum from plate 406. The pickers again move in the direction indicated by the arrow and come to the position shown in Fig. 136, the first pair of pickers having carried the aforementioned blank to the creasing-station, as shown. The second pair of pickers is now taking up a blank from pile 303 and the third pair taking gum from plate 406. In the group of figures now under consideration 595 designates the creaser-slide carrying the upper creaser-die, the upper portion of said slide being broken away. The blank carried by the first pair of pickers having been creased, the pickers move again, always in the direction of the arrow, the first pair of pickers delivering the blank carried thereby onto the folding-plate 831, the second pair carrying its blank to the creaser, while the third pair of pickers is taking up another blank and the fourth pair is taking gum from the gum-plate 406. Each pair of pickers goes in turn to each station, and at the same station each operates in the same manner.

*General operation.*—The general operation of my improved envelope-machine is as follows: A pile of blanks 303, which have been previously cut to the required shape and size, are placed upon the blank-supporting plate 270 between the guides 260, 260ª, 261, and 261ª, and the blank-feeding devices are then set to properly feed up said plate to bring the uppermost blank to the separators. The gum-box 441 is next supplied with a suitable solution of gum and the gum-spreading appliances suitably adjusted to properly spread the gum on the gum-plate 406, and this plate is elevated by means of the handle 434 and the devices hereinbefore described to bring its upper surface to the proper plane for the descending rearward picker to strike thereon. The ink-fountain 686 is also supplied with ink, the machine being run idle for a few moments to properly distribute the ink over the several rollers of the inking apparatus.
The machine now being started by means of one of the handles 92 and 93 and connections described for that purpose, the picker-turret 210, carrying the picker-arms 219 and 219ª, is intermittently revolved in the manner and by the means set forth in the description of the picker mechanism. On the first downward movement of the pickers (said movement being governed by the picker-cam 240) one pair of pickers is lowered onto the gum-plate 406, receiving a coat of gum therefrom. These pickers are now raised by the said cam 240 and the turret is turned forward one-quarter of a revolution, thereby carrying the pickers that have just taken gum to a position immediately above the said pile of blanks 303. One end flap of the topmost blank of the said pile of blanks having been gummed by the end-gumming mechanism, as hereinbefore set forth, the return movement of the cam 240 now allows the pickers to be again lowered, the gummed pair onto the pile of blanks 303 and the second pair onto the gum-plate 406. This done, the said pickers are immediately lifted by cam 240, the first-mentioned pair carrying with it a blank from the said pile, which the gum has caused to adhere thereto. The picker-turret 210 is again turned forward one-quarter of a revolution, carrying the blank on the first pair of pickers to a position immediately between the upper and lower creasing-dies. The cam 240 again allowing the pickers to be lowered, the blank carried by the first pair is lowered onto the upper side spring-plates 632 and the upper end spring-plates 634 of the lower creasing-die, as shown in Fig. 51. At the same time the second pair of pickers is lowered onto the pile of blanks and the third pair onto the gum-plate 406. The upper creaser-die 605 is now brought down in the manner and by the means hereinbefore described, and the aforementioned blank is creased without removing it from the pickers by which it is carried. While the first-mentioned blank is firmly held between the upper and lower creasing-dies the type (having been previously inked by the inking-roller 788 in the manner hereinbefore fully described and by means of the inking-cam 108 and its connections) is brought up against the said blank by means of the printing-cam 102, (and the arms and connecting mechanism hereinbefore described therefor,) thus printing the blank and being immediately withdrawn therefrom. As soon as the blank has been printed the upper creasing-die 605 is raised and releases the blank. The cam 240 now raises again the pickers and the turret is turned forward one-quarter of a revolution, carrying the first blank to the folding-station, the second blank to the creasing-station, the third pair of pickers to the blank-station, and the fourth pair of pickers to the gumming-station. Cam 240 now allowing the pickers to again be lowered, the first blank rests on one of the folding-plates 831, the second blank on the lower creasing-die, the third pair of pickers on the pile of blanks 303, and the fourth pair of pickers on the gum-plate 406. (See Figs. 135 to 138, inclusive.) The end-fold wings 836 and 837 are now operated by means of the end-fold cams 843 and 844 to fold down the end flaps of the first blank, wing 836 operating a little in advance of wing 837, so that the outermost flap (which has been previously gummed, as before stated) shall overlap the innermost flap. While this operation is being performed the second blank is being creased and printed in the manner before described. The pickers being again raised as before and the end-fold wings holding the first blank firmly to the folding-plate 831, the upward movement of the pickers detaches the blank from said pickers. The said turret is now revolved one-quarter of a turn in the direction indicated by the arrows in Figs. 70 to 73 by means of the gearing hereinbefore described. (See Fig. 69.) This brings the back flap of the envelope against the upper edge of the back-flap folder, and thus partially folds over the said flap. The back-fold cam 110 now operates, through the arm 858 and its connections, to press the back-fold wing 856 firmly against the back flap of the first blank, sticking the gummed edge of said flap firmly to the end flaps. (See Figs. 71 and 75.) While the last-mentioned operation is being performed the end flaps of the second blank are being folded and a third blank is being creased and printed, all in the manner above described. The fold-turret is again turned one-quarter of a revolution in the same direction, and the seal-folder is operated by the seal-fold cam 106 and the connections described (see Figs. 71 and 73) to turn or fold over the seal-flap of the first blank on its creased line without pressing the gummed edge thereof to the back flap of the said blank, this being prevented by the edges of the end-fold wings, which are shaped therefor in a well-known manner. During the performance of the last-mentioned operation the back flap of the second blank is being folded over and closed down, the end flaps of the third blank are being folded, and a fourth blank is being creased and printed. The fold-turret spider now makes another quarter-turn in the direction of the arrow. This movement having been completed, the seal-flap of the first blank (which has now been completely folded and should therefore be designated as an "envelope") is grasped by the upper nipper 886 and the lower nipper 891 of the transfer mechanism. At the same time the end-fold cams 843 and 844 operate to raise the end-fold wings and release the said envelope from the plate 831 of the fold-turret. The said transfer mechanism now operates, as hereinbefore described, to transfer the envelope that has just been folded from the fold-turret to the transfer-trough 938. (See Figs. 75 to 78, inclusive.) The nippers or fingers 886 and 891, having transferred one envelope from the folding-turret to the transfer-trough 938, return immediately for a second envelope, and as this is delivered to the said trough 938 the transfer-fingers 920 and 921 push the first envelope into the endless carrier or apron 955, said envelope resting on one of the fingers 956 of said carrier. As hereinbefore described, said endless carrier is carried on a supporting-pulley suspended overhead in a well-known manner and is operated by the endless-carrier driving apparatus to carry the envelopes up and over said pulley and down on the opposite side thereof, this circuit taking a sufficient time to allow the gum on said envelopes to thoroughly dry. As the envelopes are brought one by one by the carrier to the counting apparatus they are placed by the placer 986 onto the envelope-way 985 and are there counted, as hereinbefore particularly described. The envelope-plunger 1025 operates to push the envelopes one by one along said envelope-way into the packing-box; and, as hereinbefore stated in the detailed description of the said packing-box, when twenty-five envelopes have been packed in said box the bunch-plunger 1179 is operated to push the said envelopes out of said packing-box and into the bunch-trough 1575, the band 1476 being placed on the said bunch as it passes through the band-carrier, on which carrier the band has previously been placed, as explained in the detailed description of the banding mechanism. Thus the bunches of completed envelopes are banded and delivered to the bunch-trough forward of the bunch-pusher 1572, which operates, as hereinbefore described, to push the said bunches along the said trough between and past the bunch hooks or catches 1576 and 1577 to the front of the machine, where they are taken by the operator and packed into boxes for shipment.

Having thus described my invention, I claim—

1. In an envelope-machine, the combination and organization, substantially as described, with the blank-supporter and with the bunch-receiving trough, of the intermittently-advancing picker-turret having pickers vertically movable for taking blanks from the blank-supporting mechanism and carrying the same from station to station in the picker-circuit, the blank-creaser located forward in the picker-circuit from the blank-station, the blank-folder located forward in the picker-circuit from the creasing-station, the picker-gummer intermediate to the folding and blank stations for regumming the pickers, the packing-box located adjacent to the bunch-trough, the bunch-plunger operating to eject the bunch from said box into the bunch-trough, the envelope-bander banding the bunch between the packing-box and the bunch-trough, the counter, connected substantially as described, for limiting the bunch-plunger movements, the envelope-carrier intermediate to the folding mechanism and the packing-box, envelope-transferrer taking the envelopes from the blank-folder and delivering them to the carrier, and a placer and plunger coacting to deliver the envelopes from the carrier into the packing-box, whereby the blank is gummed and picked up, creased, folded, transferred, and carried to be dried, and the completed envelopes packed, banded, and delivered in bunches.

2. In an envelope-machine, the combination and organization, substantially as described, with blank-supporter and with a bunch-receiving trough, of the intermittently-advancing picker-turret having outreaching pickers vertically movable for taking blanks from the blank-supporter and carrying the same from station to station in the picker-circuit, the creaser and printer located forward in the picker-circuit from the blank-station, a blank-folder located forward in the picker-circuit from the printing and creasing station, a picker-gummer intermediate to the folding and blank stations for regumming the pickers, the packing-box located adjacent to the bunch-trough, the plunger operating to eject the bunch from said box into the bunch-trough, the envelope-bander banding the bunch between the packing-box and the bunch-trough, the envelope-counter connected for limiting the bunch-plunger movements, the envelope-carrier intermediate to the blank-folder and the packing-box, the transferrer taking the envelopes from the blank-folder and delivering them to the carrier, and a placer and plunger coacting to deliver the envelopes from the carrier into the packing-box, whereby the blank is gummed and picked up, creased and printed, folded, transferred, and carried to be dried, and the printed envelopes packed, banded, and delivered in bunches.

3. In an envelope-machine, the combination and organization, substantially as described, with the blank-supporting mechanism, substantially as described, and with the bunch-receiving trough, of the intermittently-advancing picker-turret having outreaching pickers vertically movable for taking the blanks from the blank-supporting mechanism and carrying the same from station to station in the picker-circuit, the blank-creaser located forward in the picker-circuit from the blank-station, the folding-turret set radially to the picker-turret shaft and located forward in the picker-circuit from the creasing-station, a back-flap folder and a seal-flap folder coacting with said turret to fold the creased blank into an envelope, the envelope-carrier, the transferrer taking the envelope from the folding-turret and delivering the same to said carrier, the packing-box located adjacent to the bunch-trough, the bunch-plunger operating to eject the bunch from said box into said trough, and a placer and plunger coacting to deliver the envelopes from the carrier into the packing-box, whereby the blank is gummed and picked up, creased, folded, transferred, and carried to be dried, and the completed envelopes packed and delivered one bunch at a time.

4. In an envelope-machine, the combination and organization, substantially as described, with the blank-supporter and with the packing-box, of the intermittently-advancing picker-turret having pickers vertically movable for taking the blanks from the blank-supporter and carrying the same from station to station in the picker-circuit, the blank-creaser located forward in the picker-circuit from the blank-station, the folding-turret located forward in the picker-circuit from the creasing-station, a back-flap folder and a seal-flap folder coacting with said turret to fold the creased blank into an envelope, the envelope-carrier, the transferrer taking the envelope from the folding-turret and delivering the same to said carrier, the envelope-way leading from the carrier to the packing-box, the envelope-placer bringing the envelope into position on said way, and the plunger coacting with said placer to deliver the envelopes from the carrier into the packing-box, whereby the blank is gummed and picked up, creased, folded, transferred, and carried to be dried, and the completed envelopes packed into bunches.

5. In an envelope-machine, the combination and organization, substantially as described, with the blank-supporter and with the bunch-receiving trough, of the intermittently-advancing picker-turret having outreaching pickers vertically movable for taking the blanks from the blank-supporter and carrying the same from station to station in the picker-circuit, the creaser and printer located forward in the picker-circuit from the blank-station, the folding-turret set radially to the picker-turret shaft and located forward in the picker-circuit from the creasing and printing station, a back-flap folder and a seal-flap folder coacting with said turret to fold, crease, and print the blank into an envelope, the envelope-carrier, transfer apparatus, substantially as described, taking the envelope from the folding-turret and delivering the same to said carrier, the packing-box located adjacent to the bunch-trough, the plunger operating to eject the bunch from said box into said trough, and a placer and plunger coacting to deliver envelopes from the carrier into the packing-box, whereby the blank is gummed and picked up, creased and printed, folded, transferred, and carried to be dried, and the printed envelopes packed, banded, and delivered one bunch at a time.

6. In an envelope-machine, the combination and organization, substantially as described, with a central picker-shaft, of the picker-turret carried on said shaft and carrying vertically-movable picker-stems each having a pair of radially-projecting pickers, picker-actuating mechanism, substantially as described, carrying said pickers in succession to stations in the picker-circuit, a blank-supporter located at one of said stations, and blank-creasing mechanism, substantially as described, located at a succeeding station, whereby the blanks are taken up at one station and carried to and operated upon a succeeding station in the picker-circuit.

7. In an envelope-machine, the combination and organization, substantially as described, with a central picker-shaft, of the picker-turret carried on said shaft and carrying one or more vertically-movable picker-stems each having a pair of radially-projecting pickers, picker-actuating mechanism, substantially as described, carrying said pickers to successive stations in the picker-circuit, a blank-supporting mechanism, substantially as described, located at one said station, a combined creasing and printing mechanism, substantially as described, located at a second station, and a folding-turret, substantially as described, set radially to the picker-shaft and located at a third station in the picker-circuit, whereby the blanks are taken up at one station, creased and printed at a second station, and folded at a third station.

8. In an envelope-machine, the combination and organization, substantially as described, with a central picker-shaft, of the picker-turret carried on said shaft and carrying one or more vertically-movable picker-stems each having a pair of radially-projecting pickers, picker-actuating mechanism, substantially as described, carrying said pickers to successive stations in the picker-circuit, a blank-supporting mechanism, substantially as described, located at one said station, a blank-creasing mechanism, substantially as described, located at a second station, a blank-folding-turret mechanism, substantially as described, set radially to the picker-shaft and located at a third station, and a picker-gumming mechanism, substantially as described, located at a fourth station, whereby the blanks are taken up at one station, creased at a second station, delivered to the folding-turret at a third station, and the picker regummed at the fourth station.

9. In an envelope-machine, the combination and organization, substantially as described, with a central column and with the picker-shaft carried by said column, of the picker-turret carried on said shaft over said column, vertically-movable picker-stems carried on said turret and each having a pair of radially-projecting pickers, picker-actuating mechanism, substantially as described, carrying said pickers in succession to stations in the picker-circuit, and a series of mechanism, substantially as described, for supporting blanks, blank-creasing, blank-folding, and for gumming the pickers, said mechanisms being carried on said column at the stations in said circuit.

10. In an envelope-machine, the combination, with the column B, carrying the picker-shaft, of the picker-turret carried on said shaft over said column, the vertically-movable picker-stems carried by said turret and each having a pair of radially-projecting pickers, the blank-supporter and a folding-turret carried on opposite sides, respectively, of said column, and a creasing mechanism, substantially as described, carried by said column intermediate to said blank-supporter and said folding-turret, said creasing mechanism having its upper die carried by the outwardly-curved creaser-upright 566, so that the said pickers may pass between the creasing-dies, substantially as described.

11. In an envelope-machine, the combination of the picker-shaft, a series of vertically-movable pickers carried on said picker-shaft, and a horizontal folding-turret having its axis substantially radial to the picker-shaft and geared to have simultaneous movements therewith, all substantially as described.

12. In an envelope-machine, the combination, with the folding-turret having end-fold wings and with means operating said wings, of the picker-turret carrying pickers vertically movable thereon, the axis of said fold-turret being substantially radial to the picker-shaft, and the two turrets being geared for simultaneous movement in opposite directions, all substantially as described.

13. In an envelope-machine, the combination, with the intermittently-advancing picker-turret, of a blank-creaser having lower and upper creasing-dies and located at a station in the picker-circuit, a vertically-movable picker-provided stem carried by said turret, outreaching picker-arms carried by said stem and arranged to pass between said dies from one side thereof, and picker-actuating mechanism, substantially as described, operating said stem to lower the same for presenting the blank onto the lower die, all substantially as described.

14. In an envelope-machine, the combination, with the intermittently-advancing picker-turret supported on the hollow picker-turret shaft, of a blank-creaser having lower and upper creasing-dies and located at a station in the picker-circuit, the vertically-movable picker-provided stem carried by said turret and having outreaching picker-arms arranged to pass between said dies from one side thereof, the reciprocating cam-shaft carried in the picker-turret shaft, and the picker-cam fixed on said cam-shaft and operatively connected to actuate said picker at the creasing-station during the pauses in the picker-turret movement, whereby the blank is first presented between the creasing-dies and then lowered to the lower creasing-die, all substantially as described.

15. In an envelope-machine, the combination, with the fixed lower creasing-die, of a turret carrying outreaching pickers arranged to pass over said lower die, the upper creasing-die carried by the creasing-slide, a block adjustably fixed in said slide, and toggle levers or links operated to actuate said slide through said block and during the pauses in the picker-turret movement, all combined and operating substantially as described.

16. In an envelope-machine, the combination, with the intermittently-advancing blank-carrying pickers and with the fixed lower creasing-die, of a frame carrying the creasing-slide, the upper die on said slide above the lower die, and the lever 576, pivoted to said frame at a fixed point thereof and having a reciprocatory movement, said lever constituting one part of the slide-actuating toggle and being connected, substantially as described, to actuate said slide, all substantially as described.

17. In an envelope-machine, the combination, with intermittently-advancing blank-carrying pickers and with the fixed lower creasing-die and with the frame carrying the upper-die slide 595, of the shaft 571, having arm 568, lever 576, actuated by a rod from said arm, and connections, substantially as described, from said lever to said slide, the lever 576 constituting one part of one toggle and the arm 568 constituting one part of another toggle, said toggles working in opposition, all substantially as described.

18. In an envelope-machine, the combination, with the creasing mechanism, of the slide 595, lever 576, pivoted to the frame, block 581, carried clamped to the slide, link 578, connecting the lever and block, and the adjusting-screw connecting the slide and block for regulating the position of the slide on the frame, all substantially as described.

19. In an envelope-machine, the combination, with the picker-turret and with the folding-turret set radial to the picker-turret shaft and located at one of the stations of the picker-circuit, said picker and folding turrets being geared for movement in opposite directions, of the vertically-sliding picker-provided stem carried by said picker-turret, and the rotary reciprocating cam moving with said picker-turret during the forward movement thereof and imparting to said stem a vertical movement over the folding-turret while the picker-turret is at rest, all substantially as described.

20. In an envelope-machine, the combination, with the intermittently-advancing revolving picker-turret, of the gum-plate located at one station of the picker-circuit, blank-supporting apparatus located at a station forward of said plate, the vertically-sliding picker-provided stem carried by said picker-turret first to the gum-plate and afterward to the blank-station, and a picker-actuating cam operating to lower the picker onto the gum-plate at the one station and afterward onto the blank at the blank-station, all substantially as described.

21. In an envelope-machine, the combination, with the intermittently-advancing picker-turret provided with the picker-stem-carrying frame, of blank-supporting apparatus located at one station of the picker-circuit, blank-creasing mechanism located at a station forward of said apparatus and having the upper die carried by the overreaching frame, the vertically-sliding picker-stem provided with the outreaching pickers and carried by said frame first to the blank-station and afterward to the creasing-station, and a picker-actuating cam operating the picker-stem in said frame to lower the picker onto the blank at the blank-station and afterward to present the blank thus taken up onto the lower creasing-die, all substantially as described.

22. In an envelope-machine, the combination, with the intermittently-advancing picker-turret provided with a picker-stem-carrying frame, of creasing mechanism located at one station of the picker-circuit, the folding-turret set radially to the picker-turret shaft and located at a station forward of said creasing-station, the vertically-sliding picker-stem provided with the outreaching pickers and carried by the picker-turret first to the creasing-station and afterward to the folding-turret, and a picker-actuating cam operating said stem to first lift the blank from the lower creasing-die and afterward to lower the same to the folding-turret, all substantially as described.

23. In an envelope-machine, the combination, with the picker-turret and with the folding-turret, said turrets being geared and operating substantially as described, of the gum-plate located forward in the picker-circuit from the folding-turret, a vertically-sliding blank-carrying picker carried by the picker-turret first to the folding-turret and afterward to the gum-plate, and a picker-actuating cam operating the picker-stem first to deliver the blank to the folding-turret and afterward to lower the picker onto the gum-plate, all substantially as described.

24. In an envelope-machine, the combination, with the intermittently-advancing picker-turret and with the gum-plate, blank-supporting apparatus, and blank-creasing mechanism located in the order named at stations in the picker-circuit, of the vertically-sliding picker carried by said picker-turret to each said station successively and picker-actuating mechanism operating the picker, substantially as described, first to take gum from said plate, next to take up a blank at the blank-station, and afterward to present the blank onto the lower creasing-die, all substantially as described.

25. In an envelope-machine, the combination, with the intermittently-advancing picker-turret provided with the picker-stem-carrying frame and with blank-supporting apparatus, blank-creasing mechanism, and the folding-turret set radially to the picker-turret shaft and located in the order named at stations in the picker-circuit, of the vertically-sliding picker carried by said picker-turret to each said station successively and picker-actuating mechanism operating the picker, substantially as described, first to take up a blank, next to present the blank onto the lower creasing-die, and afterward to lower the blank to the folding-turret, all substantially as described.

26. In an envelope-machine, the combination, with the intermittently-advancing picker-turret provided with the picker-stem carrying frame, of creasing mechanism located at one station of the picker-circuit and having upper and lower creasing-dies, folding-turret mechanism set radially to the picker-shaft and located at a station in the picker-circuit forward of said creasing-station, a vertically-sliding picker-stem provided with the outreaching pair of pickers and carried by said picker-turret to said stations successively, and the reciprocating cam 240, supported and actuated substantially as described and operatively connected to actuate said picker-stem, all organized and coacting to first lower the picker at the creasing-station, then raise said picker and carry the same to the folding-station, and next lower said picker at the folding-station, all substantially as described.

27. In an envelope-machine, the combination, with the intermittently-advancing picker-turret and with blank-creasing mechanism, the folding-turret, and the gum-plate, located in the order named at stations in the picker-circuit, of the vertically-sliding picker carried by the picker-turret to each said station successively and picker-actuating mechanism operating the picker, substantially as described, first to take the blank from the lower creasing-die, next to lower the blank to the folding-turret, and afterward to lower the picker onto said gum-plate, all substantially as described.

28. In an envelope-machine, the combination, with the intermittently-advancing picker-turret and with the folding-turret, the gum-plate, and the blank-supporting apparatus, located in the order named at stations in the picker-circuit, of the vertically-sliding picker carried by the picker-turret to each said station successively and picker-actuating mechanism operating the picker, substantially as described, first to deliver one blank to the folding-turret, next to regum the picker by lowering the same onto the gum-plate, and afterward to take up a second blank at the blank-station, all substantially as described.

29. In an envelope-machine, the combination, with the intermittently-advancing picker-turret and with the gum-plate, blank-supporting apparatus, and blank-creasing mechanism, located in the order named at stations in the picker-circuit, of the vertically-sliding picker carried by said picker-turret to each said station successively, the rotary reciprocating picker-cam, and cam-actuating mechanism operating said cam, substantially as described, first to gum the picker by lowering the same onto said gum-plate, next to take up a blank at the blank-station, and afterward to present the blank to the creasing mechanism, all substantially as described.

30. In an envelope-machine, the combination with the intermittently-advancing picker-turret and with blank-supporting apparatus, blank-creasing mechanism, and the folding-turret set radially to the picker-turret shaft and located in the order named at stations in the picker-circuit, of the vertically-sliding picker carried by said picker-turret to each said station successively, the rotary reciprocating picker-cam, and cam-actuating mechanism operating said cam, substantially as described, first to take up a blank by lowering the picker at the blank-station, next to present the blank to the blank-creasing mechanism, and afterward to lower the blank to the folding-turret, all substantially as described.

31. In an envelope-machine, the combination, with the intermittently-advancing picker-turret and with blank-creasing mechanism, the folding-turret, and the gum-plate, located in the order named at stations in the picker-circuit, of the vertically-sliding picker carried by the picker-turret to each said station successively, the rotary reciprocating picker-cam, and cam-actuating mechanism operating said cam, substantially as described, first to take the blank from the creasing mechanism, next to deliver the blank to the folding-turret, and afterward to regum the picker by lowering the same onto the gum-plate, all substantially as described.

32. In an envelope-machine, the combination, with the intermittently-advancing picker-turret and with the folding-turret, the gum-plate, and the blank-supporting apparatus, located in the order named at stations in the picker-circuit, of the vertically-sliding picker carried by the picker-turret to each said station successively, the rotary reciprocating picker-cam, and cam-actuating mechanism operating said cam, substantially as described, first to deliver one blank to the folding-turret by lowering the picker at said station, next to regum the picker, and afterward to take up a second blank at the blank-station, all substantially as described.

33. In an envelope-machine, the combination, with the intermittently-advancing picker-turret and with the gum-plate, blank-supporting apparatus, creasing mechanism, and folding mechanism, located in the order named at stations in the picker-circuit, of the vertically-sliding picker carried by the picker-turret to each said station successively, and picker-actuating mechanism operating the picker, substantially as described, first to gum the picker-face by lowering the picker onto said plate, next to take up a blank at the blank-station, then to present the blank to the creasing mechanism, and afterward to the folding mechanism, all substantially as described.

34. In an envelope-machine, the combination, with the intermittently-advancing picker-turret and with the gum-plate, blank-supporting apparatus, creasing mechanism, and folding mechanism, located in the order named at stations in the picker-circuit, of the vertically-sliding picker carried by the picker-turret to each said station successively, the rotary reciprocating picker-cam, and cam-actuating mechanism operating said cam, substantially as described, first to gum the picker-face by lowering the picker onto said plate, next to take up a blank at the blank-station, then to present the blank to the creasing mechanism, and afterward to the folding mechanism, all substantially as described.

35. In an envelope-machine, the combination, with the intermittently-advancing picker-turret and with the gum-plate, blank-supporting apparatus, creasing mechanism, and folding mechanism, located in the order named at stations in the picker-circuit, of the series of vertically-sliding pickers carried by said picker-turret and picker-actuating mechanism operating the pickers, substantially as described, to successively gum each picker by lowering the same onto the gum-plate, to take up a blank with each picker successively, and to present the blank carried by each picker first to the creasing mechanism and afterward to the folding mechanism, all substantially as described.

36. In an envelope-machine, the combination, with the intermittently-advancing picker-turret and with the gum-plate, blank-supporting apparatus, creasing mechanism, and folding mechanism, located in the order named at stations in the picker-circuit, of the series of vertically-sliding pickers carried by the picker-turret, the rotary reciprocating picker-cam, and cam-actuating mechanism operating the pickers, substantially as described, to successively gum each picker by lowering the same onto the gum-plate, to take up a blank with each picker successively, and to present the blank carried by each picker first to the creasing mechanism and afterward to the folding mechanism, all substantially as described.

37. In an envelope-machine, the combination, with the folding-turret and its end-fold wings and end-fold cams and with the packing-box, of the envelope-carrier intermediate to the folding-turret and the packing-box, intermittently-acting transfer apparatus, substantially as described, intermediate to the folding-turret and carrier, the envelope-plunger arranged and operating to deliver envelopes from the carrier to the packing-box, the rock-shaft 119, operatively connected to actuate said plunger, rock-shaft 153, operatively connected to actuate said end-fold cams and to actuate said transfer apparatus, and connections actuating shaft 153 from shaft 119, all organized and coacting to take the envelope from the folding-turret to the carrier and afterward from the carrier into the packing-box, subtnstaially as described.

38. In an envelope-machine, the combination, with the folding-turret and its end-fold wings and end-fold cams and with a packing-box mechanism, substantially as described, of the envelope-carrier intermediate to the folding-turret and the packing-box, intermittently-acting transfer apparatus, substantially as described, intermediate to the folding turret and carrier, an envelope-plunger arranged and operating to deliver envelopes from the carrier to the packing mechanism, and the rock-shaft 153, connected to actuate the end-fold cams and the transfer apparatus and connected to actuate the packing-plate of the packing mechanism, said shaft having rotary reciprocating movements substantially in unison with the movements of said envelope-plunger, all organized and coacting to take the envelope from the folding-turret to the carrier and afterward from the carrier into the packing-box, substantially as described.

39. In an envelope-machine, the combination, with the picker-shaft and with the folding-turret set radially to the picker-turret shaft and geared to have simultaneous movements with said shaft, of the picker-turret carried by said shaft and carrying a series of vertically-sliding picker-stems carrying outreaching pairs of pickers, and picker-actuating mechanism, substantially as described, imparting to said stems successively a vertical movement in the picker-turret over said folding-turret, substantially as described.

40. In an envelope-machine, the combination, with the intermittently-advancing picker-turret, of the gum-plate located at a station in the picker-circuit, a series of vertically-sliding picker-provided stems carried by said turret, and picker-actuating mechanism, substantially as described, operating each picker-stem successively to lower the same in the picker-turret and onto said plate during the pauses in the turret movement, substantially as described.

41. In an envelope-machine, the combination, with the intermittently-advancing picker-turret, of the gum-plate located at a station in the picker-circuit, a series of vertically-sliding picker-provided stems carried by said turret, the rotary reciprocating picker-cam, and cam-actuating mechanism operating each picker successively to lower the same in the picker-turret and onto said plate during the pauses in the turret movement, all substantially as described.

42. In an envelope-machine, the combination, with the intermittently-advancing picker-turret, of the gum-plate geared to said turret to have simultaneous rotary movements therewith, a series of vertically-sliding pickers carried by said turret, and picker-actuating mechanism operating said pickers successively to lower the same onto said plate during the pauses in the movement thereof, all substantially as described.

43. In an envelope-machine, the combination, with the intermittently-advancing picker-turret, of the vertically-movable picker-stem having thereon two pickers set at a distance apart, the revoluble gum-plate located at a station in the picker-circuit, and a gum-box extending over said plate between the descending pickers, all substantially as described.

44. In an envelope-machine, the combination, with the picker-turret, of the gum-plate bed vertically movable, substantially as described, the revoluble gum-plate on said bed, gum-spreading devices, substantially as described, over said plate, and gum-plate-bed-elevating devices arranged for raising said bed to bring the plate into contact with the descending pickers and to lower the same, substantially as described.

45. In an envelope-machine, the combination, with the picker-shaft and the picker-turret, of the gum-plate bed vertically movable, substantially as described, the revoluble gum-plate on said bed, gum-spreading devices, substantially as described, over said plate, gearing connecting said shaft and plate for simultaneous rotary movements, and elevating devices, substantially as described, raising and lowering said plate, substantially as described.

46. In an envelope-machine, the combination, with the picker-shaft and with the gum-plate bed vertically movable, substantially as described, of the revoluble gum-plate on said bed, the shaft 399, carried in said bed and engaging said plate, the spur-wheel 410 on said shaft, and gearing actuating said wheel from the picker-shaft, whereby the meshing of said wheels is unaffected by the movement of said bed, all substantially as described.

47. In an envelope-machine, the combination, with the bracket bored to receive the stem 398, of the bed 396, carrying the gum-plate and having the tubular stem 398 fitting said bore, the shaft extending through said stem and driving the gum-plate, means preventing the bed from rotating, and gum-plate-bed-elevating devices raising and lowering the bed and gum-plate on the bracket, substantially as described.

48. In an envelope-machine, the combination, with the gumming-mechanism bracket bored substantially as described, of the bed 396, carrying the gum-plate and having stem 398 fitting the bore in said bracket, and the crank engaging a notch in said stem for raising and lowering said bed and gum-plate, substantially as shown and described.

49. In an envelope-machine, the combination, with the bracket bored to receive stem 398, of the bed 396, carrying the gum-plate and having the stem 398 fitting said bore, the shaft 431, having a crank engaging said stem to slide the same, and the detent operating to detain said crank and thereby to detain the gum-plate in its upper or lower position, all substantially as described.

50. In an envelope machine, the combination, with the revolving gum-plate and the gum-box thereon, of the scraper and guard 445, fitting the outer edge of said plate on the side thereof moving toward the gum-box, substantially as described.

51. In an envelope-machine, the combination, with the revolving gum-plate and the gum-box thereover, of the gum-gage fitted to move on an incline, substantially as described, and gage-adjusting means arranged to raise or lower said gage by imparting a longitudinal movement thereto, substantially as described.

52. In an envelope-machine, the combination, with the gum-plate bed, the revoluble gum-plate, and the gum-box, of the stop 401, fixed on said bed and engaging one end of said box, and a locking device, substantially as described, engaging the other end of said box, said locking device being hand-actuated, substantially as described.

53. In an envelope-machine, the combination, with the revoluble gum-plate and the gum-box thereover, of two adjustable gum-scrapers, one at each side of and at opposite ends of said box, whereby the gum on one exposed side of said plate may be regulated independently of the other said side, all substantially as described.

54. In an envelope-machine, the combination, with the gum-plate and with the gum-box over said plate and having the inclines thereon, of the scraper fitting said inclines and the adjusting-screw journaled in the box and engaging said scraper for longitudinally moving the same, substantially as described.

55. In an envelope-machine, the combination, with the gum-plate and with the gum-box fixable thereover and having the passage 484, of the bottle-supporting devices supporting the gum-bottle in position over the receptacle 483, communicating with said passage, substantially as shown and described.

56. In an envelope-machine, the combination, with the picker shaft and turret carrying outreaching pairs of pickers and with the intermittently-revolving folding-turret set radially to the picker-shaft and geared for movement in a direction opposite to the picker movement and having folding-plates provided with the end-fold wings, of the rotary reciprocating cams operated forwardly during the movement of said turret and backwardly while the turret is at rest, said cams having grooves engaging the roller-provided arms of the end-fold wings and said turret being operated independently of said cams, all substantially as described.

57. In an envelope-machine, the combination, with the intermittently-revolving picker-shaft and the folding-turret driven by gearing therefrom, of the end-fold wings, the end-fold cams, and cam-reciprocating devices imparting rotary reciprocating movements to said cams, all combined and operating substantially as described.

58. In an envelope-machine, the combination, with the intermittently-revolving picker-shaft and with the fixed turret-supporting sleeve, of the turret-shaft in said sleeve and geared to be driven from the picker-shaft, the turret on said sleeve and connected to its said shaft, the end-fold wings on the turret, the end-fold cams operatively connected with said wings, and cam-reciprocating devices, substantially as described.

59. In an envelope-machine, the combination, with the picker-shaft and with the fixed folding-turret-supporting sleeve set radially to the picker-shaft, of the folding-turret shaft carried in said sleeve and actuated from the picker-shaft by gears, substantially as described, the sleeve 827, carried on said fixed sleeve and operatively connected to the outer end of the folding-turret shaft, the folding-turret fixed to the inner end of said sleeve 827 and having the end-fold wings, and the oppositely-disposed cams, one carried on said fixed sleeve and the other carried on said sleeve 827, said cams being connected for rotary reciprocating movement and engaging the end-fold wings, all substantially as described.

60. In an envelope-machine having revolving pickers and folding-turrets, the combination, with the picker-turret shaft, of the fixed sleeve 826, set radially to said picker-shaft, the folding-turret-actuating shaft carried in said fixed sleeve, the gear 824, fixed on said folding-turret shaft, the adjustable gear 816 on the picker-shaft below the folding-turret shaft and meshing with said gear 824, and means adjusting the picker-shaft gear, substantially as described.

61. In an envelope-machine, the combination, with the folding-turret and the end-fold wings, of the end-fold cam and the adjustable eccentric-stud in said wing, whereby the pressure of said wing when closed may be regulated, all combined and operating substantially as described.

62. In an envelope-machine, the combination, with the folding-turret and the end-fold wing, of the end-fold cam, the eccentric-stud 841, adjustably fixed in the wing and carrying a roller engaging the cam, and the clamp-screw in the wing-arm for holding in place said stud, substantially as shown and described.

63. In an envelope-machine, the combination, with the main shaft and with the rock-shaft 119, actuated therefrom, of the intermittently-revolving picker-shaft actuated from the main shaft and carrying a picker vertically movable on said shaft, picker-actuating mechanism, substantially as described, operating to raise and lower the picker, the folding-turret set radially to the picker-shaft and actuated substantially as described and having end-fold wings, the end-fold cams, and connections from shaft 119 to operate said cams forwardly during the movement of said picker-shaft and backwardly during the pauses in the turret movement, whereby the blank is clamped to the folding-turret while carried by the picker, all substantially as described.

64. In an envelope-machine, the combination, with the main shaft and with the rock-shaft 119, actuated therefrom, of the intermittently-revolving picker-shaft actuated from the main shaft and carrying a vertically-movable picker, picker-actuating mechanism, substantially as described, operating to raise and lower said picker over the folding-turret, the folding-turret set radially to the picker-shaft and actuated substantially as described and having end-fold wings, the end-fold cams, rocker 167, actuated from shaft 119 and having arms 159, and connections 848 and 849, all substantially as described.

65. In an envelope-machine, the combination, with the main shaft and with the rock-shaft 119, actuated therefrom, of the intermittently-revolving folding-turret positively geared, substantially as described, to the picker-shaft and carrying end-fold wings, the end-fold cams, the end-fold rocker, connecting-rods from said rocker to said cams, arm 140 on shaft 119, and connecting-rod 160, all substantially as described.

66. In an envelope-machine, the combination, with the main shaft, of the intermittently-revolving picker-shaft actuated therefrom and carrying a vertically-movable outreaching picker, an eccentric on the main shaft connected by picker-actuating mechanism, substantially as described, to raise and lower said picker independently of the picker-shaft movements, the folding-turret set radially to the picker-shaft and geared thereto and carrying end-fold wings, and connections, substantially as described, operating said wings, whereby the picker is first lowered to deliver a blank onto the turret and the said wings then operated to clamp the blank onto the turret, all substantially as described.

67. In an envelope-machine, the combination, with the intermittently-rotating folding-turret having folding-plates and end wings on said plates for clamping the envelope-blank thereto, of the lever 875, the seal-fold carrier pivoted to the upper end of said lever and provided with a seal-folder 867, the seal-folder arm 878, the spring 871, and cams, substantially as described, operating said lever and seal-folder arm, substantially as described.

68. In an envelope-machine, the combination, with a picker-turret frame 210, fixedly carried on the hollow picker-shaft, of the picker-frame, the roller-provided picker-stem fitted to slide in bearings in said picker-frame, the picker-cam and its shaft, and an outreaching guide-arm, substantially as described, preventing said stem from turning in its bearings, all substantially as described.

69. In an envelope-machine, the combination, with the picker-frame and picker-stem carried substantially as described, of the cam 240, the arm 215, fixed on said stem and furnished for bearing on said cam, and a guide engaging the inner end of said arm, all combined and operating substantially as described.

70. In an envelope-machine, the combination, with the picker-frame and picker-stem carried substantially as described, of the shaft 241 and cam 240, arm 215, having ear 215$^a$, carrying stud 218 and roll 217, and a guide engaging the inner end of said arm, all combined and operating substantially as described.

71. In an envelope-machine, the combination, with the picker-frame and the hollow picker-stem carried substantially as described in said frame, of the cam 240, the spring in said stem, and the spring-adjustment, substantially as described.

72. In an envelope-machine, the combination, with the picker-frame and the picker-stem carried substantially as described, of the cam 240, the arm 215, the guide-sleeve 243, carried substantially as set forth, and the guide-cap 244, said guide-arm being fitted to slide between said sleeve and cap, substantially as described.

73. In an envelope-machine, the combination, with the picker-turret frame, the picker-frames carried thereby, and the picker-stems, of the cam 240, the guide-sleeve carried substantially as set forth, a guide-arm 215, one for each stem, and a guide-cap for each said arm, all substantially as described.

74. In an envelope-machine, the combination, with the picker mechanism thereof and with the picker-stem having formed thereon the plate 214, of the oppositely-disposed outreaching picker-arms adjustably fixed on the opposite ends of said plate, said arms being each provided with picker-faces yieldingly carried thereon, substantially as described.

75. In an envelope-machine, the combination, with the main cam-shaft and with the picker-turret shaft carrying a series of picker-frames having upper and lower bearings, of the picker-stems carried in said bearings and having guides preventing rotation thereof in said bearings, the cam and roll-turret intermittently actuating said turret-shaft, the picker-cam shaft furnished and connected to actuate said picker-stems, and a rock-shaft connected to be actuated from said main cam-shaft and connected to actuate said picker-cam shaft, all substantially as decribed.

76. In an envelope-machine, the combination, with the main cam-shaft and with the picker-turret shaft carrying a series of picker-frames having upper and lower bearings, of the picker-stems carried in said bearings and having guides preventing rotation thereof in said bearings, picker-shaft-actuating devices, substantially as described, intermittently actuating said picker-turret shaft, the picker-cam shaft within said turret-shaft and furnished and connected, substantially as described, to actuate said stems, the rock-shaft 119, actuated substantially as described, the segment 135 on said rock-shaft, and the gear 250, fixed on said picker-cam shaft and meshing with said segment, all substantially as described.

77. In a printing envelope-machine, the combination, with the printing-slide and with the cam 102, of the rocker having arms 649 and 654 and carried on shaft 652, a spring connected to retract said slide, and the link 655, connected to an eccentric carried on the slide, said eccentric being fitted for operation by hand and having the spring-actuated index-pin 669 for locking said eccentric in its respective positions, all substantially as described.

78. In an envelope-machine, the combination, with the folding-turret and the envelope-carrier belt, of the transfer-trough leading from said turret to said belt and reciprocating transfer devices, substantially as described, constructed to first grasp and then take the envelopes from the turret and to pass the envelopes first to the trough and then from the trough to between the fingers of the carrier, substantially as described.

79. In an envelope-machine, the combination, with the folding-turret and the envelope-carrier, of the transfer-trough leading from said turret to said carrier, the detent-latches 946 and 946ᵉ, and reciprocating transfer devices, substantially as described, constructed to convey the envelopes along said trough by successive steps, substantially as described.

80. In an envelope-machine, the combination, with the folding-turret and the transfer-trough, of reciprocating transfer devices having the gripper-fingers 886 and 891 operated to take the envelope from said turret and to deliver the same into said trough, all substantially as described.

81. In an envelope-machine, the combination, with the folding-turret and the transfer-trough, of reciprocating transfer devices, substantially as described, having gripper-fingers taking the envelope from the turret to the trough, and pushers 920, pushing the envelope along in the trough, all substantially as described.

82. In an envelope-machine, the combination, with the folding-turret and the transfer-trough, of reciprocating transfer devices, substantially as described, having the gripper-fingers 891, and the upper gripper 886, pivoted at 887 and spring-held against a stop carried by the transfer-arm, all substantially as described.

83. In an envelope-machine, the combination, with the folding-turret and the transfer-trough, of reciprocating transfer devices, substantially as described, having the gripper-finger 891, carried by the rock-shaft 917, and a friction-clamp 904, connected to actuate said rock-shaft in its bearing on the reciprocatory movement of the transfer-arm carrying said shaft, all substantially as described.

84. In an envelope-machine, the combination, in the creasing mechanism thereof, of an upper die and a lower die consisting of separate movably-supported sides, each having a lower creaser-blade and an upper spring-plate, said sides being constructed to close toward the upper die on the downward movement thereof, substantially as described.

85. In an envelope-machine, the combination, in the creasing mechanism thereof, of an upper die and a lower die consisting of separate parts yieldingly held, substantially as described, and each having a creasing-groove formed between two spring-plates, all substantially as described.

86. In an envelope-machine, the combination, in the creasing mechanism thereof, of the upper die and the lower die consisting of separate parts yieldingly held, substantially as described, and each having a creasing-groove formed between a lower blade and an upper spring-plate divided by cuts distributed along the edge thereof, substantially as described.

87. In an envelope-machine, the combination, in the creasing mechanism thereof, of the upper die and the lower die consisting of separate parts yieldingly held, substantially as described, and each having a creasing-groove formed between two spring-plates, each divided by cuts distributed along the edges thereof, substantially as described.

88. In an envelope-machine, the combination, in the creasing mechanism thereof, of the upper die and the lower die consisting of separate parts yieldingly held, substantially as described, and each having a creasing-groove formed between two spring-plates, each divided by cuts distributed along the edge thereof, the cuts in one said blade being located between the cuts of the other blade, substantially as described.

89. In an envelope-machine, the combination, with the envelope-way and guides leading to said way, of the intermittently-acting carrier bringing the envelope approximately to said way, the placer operating to bring the envelope to position on said way, and a reciprocating plunger pushing the envelope along said way, all combined and operating substantially as described.

90. In an envelope-machine, the combination, with the envelope-way and guides leading to said way, of the intermittently-acting carrier bringing the envelope approximately to said way, the placer operating to bring the envelope to position on said way, an envelope-plunger, substantially as described, and a counting-arm, substantially as described, operating in connection with the placer and constructed to be pushed forward by the envelope when this is brought to place, all combined and operating substantially as described.

91. In an envelope-machine, the combination, with the envelope-way, of the intermittently-acting carrier bringing the envelope approximately to said way, the reciprocating placer operating to bring the envelope to position on said way, the counting-arm operating in connection with the placer and constructed to be pushed forward by the envelope when this is brought to place, and a cam, substantially as described, engaging said arm to farther throw forward the same when the counting-arm has first been operated by the envelope, all combined and operated substantially as described.

92. In an envelope-machine, the combination, with the reciprocating placer and the counting-arm constructed to be partially operated by the envelope carried forward by said placer, of the cam 1009, carried by the placer and engaging said arm to complete the forward movement thereof, and the cam 1008, constructed and arranged to retract the counting-arm on the return movement of the placer.

93. In an envelope-machine, the combination, with the reciprocating placer and the counting-arm constructed to be partially thrown forward by the envelope carried forward by said placer, of the releaser-cam 1011, fixed on said counting-arm, and the cam 1009, located on said placer to pass above said releaser-cam in the absence of an envelope and to engage said releaser-cam when the counting-arm is partially thrown forward, substantially as described.

94. In an envelope-machine, the combination, with the envelope-way and the placer and with the envelope-plunger arranged to slide envelopes longitudinally of said way, of the counting-arm constructed to be partially operated by the envelope carried forward by the placer, and counting-arm-actuating devices, substantially as described, constructed and operating to farther throw back the counting-arm when this has been partially thrown back by the envelope forward of the plunger, whereby the envelope is released from pressure between the placer and the counting-arm prior to being slid along the envelope-way by the plunger, all substantially as described.

95. In an envelope-machine, the combination, with the envelope-way, the placer, and the counting-wheel, and with a counting-arm, substantially as described, connected to actuate the counting-wheel and arranged to be operated by an envelope forward of said placer and having the cam 1011 and the stud or roller 1001, of the cam 1009, located on the placer to engage said cam 1011 when the placer moves forward after the counting-arm has been thrown partially forward by the envelope, and the cam 1008, carried on the placer and constructed to engage said stud or roller 1001 on the return movement of the placer, substantially as described.

96. In an envelope-machine, the combination, in counting apparatus, of the notched wheel 1020, the envelope-way, the placer operated, substantially as described, to bring envelopes to said way, the counting-arm operatively connected to actuate said wheel on the return movement of said placer, and cams, substantially as described, operating said arm from the placer.

97. In an envelope-machine, the combination, with the envelope-way, of the placer-slide intermittently actuated to bring envelopes to said way and having slots 988, of the counting-arm 998, having the fingers 1000 located to enter said slots in the absence of an envelope, substantially as described, and for the purpose specified.

98. In an envelope-machine, the combination, with the envelope-way and with the reciprocating placer-slide, of the main cam-shaft 70, a cam on said shaft connected to actuate said slide, the envelope-plunger operatively connected to be actuated by the rock-shaft 1050, and an eccentric on said shaft 70, operatively connected to actuate said shaft 1050, all being organized and coacting, substantially as described, to throw forward said plunger while the placer stands at rest in its forward position, substantially as set forth.

99. In an envelope-machine, the combination, with the envelope-way and the endless carrier intermittently actuated and having carrier-fingers 956, of the side guides 982 and 983, the rear guide 981, and the envelope-placer 986, supported and operated, substantially as described, to engage and move forward the lower edge of an envelope resting on said rear guide near to said way, substantially as described, and for the purpose specified.

100. In an envelope-machine, the combination, with the packing-box and the envelope-plunger, of two packing-plates operating to open one in advance of the other, substantially as described, and for the purpose specified.

101. In an envelope-machine, the combination, with the packing-box, of the bunch-plunger and two packing-plates operating to open, the one prior to and the other after the completion of the forward stroke of the bunch-plunger, whereby an envelope is permitted to enter the box before the bunch entirely leaves the same, substantially as described.

102. In an envelope-machine, the combination, with the packing-box frame, of the pivot-shaft over said frame and the two packing-plates located side by side and together closing the front of said box, said plates being adapted for independent operation.

103. In an envelope-machine, the combination, with the packing-box, of the envelope-way leading to said box, the envelope-plunger delivering envelopes from said way into said box, a bunch-plunger arranged to eject the bunch of envelopes out of said box, a notched stop-wheel holding the bunch-plunger retracted, and counting apparatus, substantially as described, connected to turn said wheel on the delivery of an envelope to said way, whereby the envelopes are driven from the packing-box at each revolution of said stop-wheel, substantially as described.

104. In an envelope-machine, the combination, with the packing-box and with the two packing-plates located side by side and together closing the front of said box, of the envelope-plunger operated to deliver envelopes into said box when the plates are opened and a bunch-plunger operated to drive the envelopes out of said box when the plates are closed, substantially as described.

105. In an envelope-machine, the combination, with the packing-box and with the envelope-way leading to said box, of the two packing-plates located side by side and together closing the front of said box, the envelope-plunger operated to deliver envelopes from said way into said box when the plates are opened, and packing-plate-operating cams and connections, substantially as described, constructed to open one plate in advance of the other plate, whereby the envelope-plunger may slide an envelope into the box behind the first-opened plate before the second plate is opened, all substantially as described.

106. In an envelope-machine, the combination, with the packing-box and with the two packing-plates located side by side and together closing the front of said box, of packing-plate-actuating devices, substantially as described, opening one packing-plate in advance of the other and closing both packing-plates simultaneously.

107. In an envelope-machine, the combination, with the packing-box and with the two packing-plates located side by side and together closing the front of said box, of the oscillating packing-plate-actuating cams operatively connected, substantially as described, to open one plate in advance of the other and to close both plates simultaneously, substantially as described.

108. In an envelope-machine, the combination, with the packing-box having the curved supporting-plate 1100 and with the swinging packing plate or plates thereof, of the hook forward of the lower side of said box, said hook being operated to be retracted just prior to the completion of the closing movement of said plate or plates and to be projected prior to the opening of said plate or plates, whereby the envelopes already in the box are detained therein during the opening of the packing-plate, all substantially as described.

109. In an envelope-machine, the combination, with the packing-box having the curved supporting-plate 1100 and with the swinging packing plate or plates, of the hook 1143, carried by an arm adapted to have a vertical movement, and hook-actuating devices, substantially as described, constructed and arranged to lower said arm during the closing of the said plate or plates.

110. In an envelope-machine, the combination, with the packing-box and the packing plate or plates, of the hooks 1136 and 1143, carried by the arms 1138 and 1145, pivotally supported at the back of the box and connected for simultaneous operation, substantially as described.

111. In an envelope-machine, the combination, with the packing-box and the packing plate or plates, of the upper hook 1136, carried by arm 1138, pivotally supported at 1139 and operated in one direction by spring 1148, the lower hook 1143, carried by arm 1145, pivotally supported at 1146 and constructed to bear at its upper end against the end of arm 1138 in opposition to spring 1148, and a cam located and operating to impart an intermittent movement to arm 1145, whereby said hooks are simultaneously withdrawn by said cam and simultaneously thrown forward by said spring.

112. In an envelope-machine, the combination, with the packing-box and its packing plate or plates, of the hook-provided arms 1138 and 1145, carried by shafts and connected for simultaneous operation, one of said shafts having the dog 1151, and the latch-cam 1152, carried by a reciprocating arm and engaging said dog to operate said hooks, all substantially as described.

113. In an envelope-machine, the combination, with the packing-box and packing-plates, substantially as described, and with the guide-blocks 1160 and 1162, of the bunch-plunger guided between said box and guide-blocks and having an arm extending between said guides into the box and carrying the plunger-plates for ejecting the envelopes.

114. In an envelope-machine, the combination, with the packing-box and with its packing-plates, of the plunger-plates 1171 and 1172, carried by an arm projecting into said box, said plates being spring-actuated to completely fill the thickness of the box, substantially as described, and for the purpose specified.

115. In an envelope-machine, the combination, substantially as described, with the packing-box and with the plunger 1179, guided between the box and the guide-blocks thereof, of the arm 1175, upwardly inclined into said box and carrying on the upper end thereof the plunger-faces 1171 and 1172, whereby the passing of any oil from the plunger-guides along said arm into the box is prevented.

116. In an envelope-machine, the combination, in the packing mechanism thereof, of the packing-box, the bunch-plunger extending into said box, the notched counting-wheel and the stop-hook 1185, pivotally supported in the plunger, and a spring normally holding said stop-hook in position for engaging said wheel, whereby the plunger may be retracted and said stop-hook pass said stop-wheel while the notch is out of alignment therewith, substantially as described.

117. In an envelope-machine, the combination, with the packing-box and the two packing-plates, of one cam operating through connections, substantially as described, to open one plate and two cams having dissimilar movements and operating in succession through the same connections to open the other plate, and springs connected to close the plates, all substantially as described.

118. In an envelope-machine, the combination, in the envelope-packing mechanism thereof, of the packing-plate-actuating devices consisting of the arms 1113 and 1124, connected to said plates, respectively, the rock-shaft 153, the cam 178, carried by said shaft and acting upon arm 1113, and the oscillating double cam 171, having one cam-face 172 operating arm 1113 and having another cam-face 173 operating arm 1124, substantially as described.

119. In an envelope-machine, the combination, in the packing mechanism thereof and with the arms 1113 and 1124, cam-actuated, substantially as described, of the packing-plates 1086 and 1090, having arms 1088 and 1092, respectively, eccentric-studs in each of said packing-plate arms, and connections from said studs to said arms 1113 and 1124, whereby the working positions of said packing-plates may be adjusted relative to the packing-box and to each other, substantially as described.

120. In an envelope-machine, the combination, with the packing-box and one or more packing-plates, substantially as described, of the end plate 1104 and one or more blocking-pieces, as 1076 and 1076ª, closing the opposite end of said box above or below the bunch-plunger faces, and the retaining-hook 1166, located at the other end of said box adjoining said end plate, whereby the envelopes are prevented from longitudinal movement in the box prior to the operation of the bunch-plunger.

121. In an envelope-machine, the combination, in the packing mechanism thereof, of a packing-box substantially as described, having at one side of its envelope-receiving space the plunger-receiving ways, the bunch-plunger comprising the rod 1179, connected to its actuating-arm 1194 and having the rearwardly and upwardly projecting arm extending into said envelope-receiving space, and guides carried on the forward end of said rod and sliding in ways in said box, and carrying the envelope-ejecting spring-opened plates pivotally attached to the end of said arm in the packing-box, substantially as described.

122. In an envelope-machine, the combination, with the packing-box, of the end plate 1104 and two packing-plates located side by side and together closing the front of said box and adapted for independent operation, the packing-plate 1086, having the rib 1089, guarding the passage between the plates when one plate is open and the other closed, substantially as described.

123. In an envelope-machine, the combination, with the packing-box, of the packing-plates 1086 and 1090, a handle for opening the plate 1086 by hand, and the hook on plate 1090 engaging the plate 1086 when this plate is opened, whereby both said plates are simultaneously opened by hand by means of a handle on one of them, all substantially as described.

124. In an envelope-machine, the combination, with the packing-box and with the first packing-plate 1086 and the second packing-plate 1090, each having a stud-provided arm, substantially as described, of the arms 1113 and 1124, connected to said plates, respectively, and the reciprocating cams 172 and 173, operated in unison, and the cam 178, said cam 173 operating the arm 1124 and the two cams 172 and 178 each operating in succession the arm 1113, whereby said packing-plates are opened one in advance of the other and are closed simultaneously, substantially as described.

125. In an envelope-machine, the combination, with a blank-supporting plate and with plate-lifting apparatus, substantially as described, supporting said plate, of the fixed bearing 318, the hook-provided rod 298, laterally movable in said bearing and operatively connected to elevate said plate on the lifting of said rod, the intermittently-advancing picker-turret carrying a vertically-movable picker-provided stem having rising and falling movements over said plate, the spring acting laterally on said rod, and the latch 231, located on said picker-stem to engage said hook on the descent of said stem below a predetermined point, all substantially as described.

126. In an envelope-machine, the combination, with the main shaft and with the driving-wheel and a clutch for engaging said wheel and shaft, of a shipper-rod, as 1261, spring-actuated and connected to unclutch said wheel, a latch engaging said rod to hold the same retracted, the packing-box, the envelope-plunger, and stop-motion devices, substantially as described, operatively connected with said plunger and constructed to unhook said latch on the return of the plunger after a partial stroke, substantially as described.

127. In an envelope-machine, the combination, with the main shaft and with the driving-wheel and a clutch for engaging said wheel and shaft, of a shipper-rod, as 1261, spring-actuated and connected to unclutch said wheel, a latch engaging said rod to hold the same retracted, the packing-box, the bunch-plunger, and stop-motion devices, substantially as described, operatively connected with said plunger and constructed to unhook said latch on the return of the bunch-plunger after a partial stoke, substantially as described.

128. In an envelope-machine, the combination, with the main shaft and with the driving-wheel and a clutch for engaging said wheel and shaft, of a shipper-rod spring-actuated and connected to unclutch said wheel, a latch engaging said rod to hold the same retracted, the packing-box, the envelope-plunger, the bunch-plunger, one set of stop-motion devices operatively connected with the envelope-plunger and constructed to unhook said latch on the return of the envelope-plunger after a partial stroke, and another set of stop motion devices, substantially as described, operatively connected with the bunch-plunger and constructed to unhook said latch on the return of the bunch-plunger after a partial stroke, whereby the failure of either plunger to make a complete forward stroke releases the shipper-rod on the return-stroke of that plunger, substantially as described.

129. In an envelope-machine, the combination, with the main shaft and with the driving-wheel and a clutch for engaging said wheel and shaft, of a shipper-rod spring-actuated and connected to unclutch said wheel, a latch engaging the said rod to hold the same retracted, the packing-box, the envelope-plunger, and stop-motion devices comprising the plate 1236, operatively connected with said latch, the guard-plate 1240, and the arm 1221, operatively connected with said plunger, said arm having a pawl adapted to engage said plate, all combined and operated substantially as described.

130. In an envelope-machine, the combination, in the banding mechanism, of the band-shuttle rolls, substantially as described, carrying said shuttle by engaging between the rollers forming part of the shuttle, said shuttle-supporting rolls, one of them having the enlarged flanges 1492, holding the shuttle in place longitudinally of said supporting-rolls, and means actuating said rolls to feed the band-tube over the shuttle, substantially as shown and described.

131. In an envelope-machine, the combination, in the banding mechanism, of the shuttle and its supporting-rolls geared for simultaneous movement, the shaft 1519, supporting one said roll and carrying the pawl 1510, engaging a ratchet-wheel formed on the roll, spring-pressed bearings carrying the opposite shuttle-supporting roll, and a cam operatively connected, substantially as described, to impart a reciprocating movement to said shaft, all substantially as described.

FRANCIS H. RICHARDS.

Witnesses:
GEO. S. PRINDLE,
CHAS. J. WILLIAMSON.